(12) United States Patent
Ishibashi

(10) Patent No.: US 6,643,227 B2
(45) Date of Patent: Nov. 4, 2003

(54) DISC RECORDING AND/OR REPRODUCING APPARATUS AND DISC EXCHANGING MECHANISM

(75) Inventor: Takayuki Ishibashi, Chiba (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 09/877,671

(22) Filed: Jun. 8, 2001

(65) Prior Publication Data

US 2002/0009021 A1 Jan. 24, 2002

(30) Foreign Application Priority Data

Jun. 9, 2000 (JP) ...................................... 2000-172988

(51) Int. Cl.$^7$ ............................................... G11B 17/22
(52) U.S. Cl. ..................................................... 369/30.77
(58) Field of Search ............................ 369/30.9, 30.32, 369/30.77, 75.1, 75.2, 77.1, 77.2, 191, 192, 262, 264

(56) References Cited

U.S. PATENT DOCUMENTS

| 5,038,337 | A | * | 8/1991 | Muramatsu et al. | 369/77.1 |
| 5,150,349 | A | * | 9/1992 | Takai et al. | 369/75.2 |
| 5,828,641 | A | * | 10/1998 | Abe et al. | 369/77.1 |
| 6,256,280 | B1 | * | 7/2001 | Sakurai et al. | 369/77.1 |
| 6,473,372 | B2 | * | 10/2002 | Yoshida et al. | 369/30.9 |

* cited by examiner

Primary Examiner—Allen Cao
(74) Attorney, Agent, or Firm—Jay H. Maioli

(57) ABSTRACT

Apparatus for pushing out a disc placed on a tray between a pair of rollers, in a stable state including a pair of pushing-out mechanisms actuated by a return spring each provided with a pair of fixed shafts. For turning the pushing-out mechanism a device, such as a lever, operates against a pressing force of the return spring, and the pushing-out mechanism is engaged with a separation cam for controlling the insertion and/or the discharge of the disc.

6 Claims, 44 Drawing Sheets

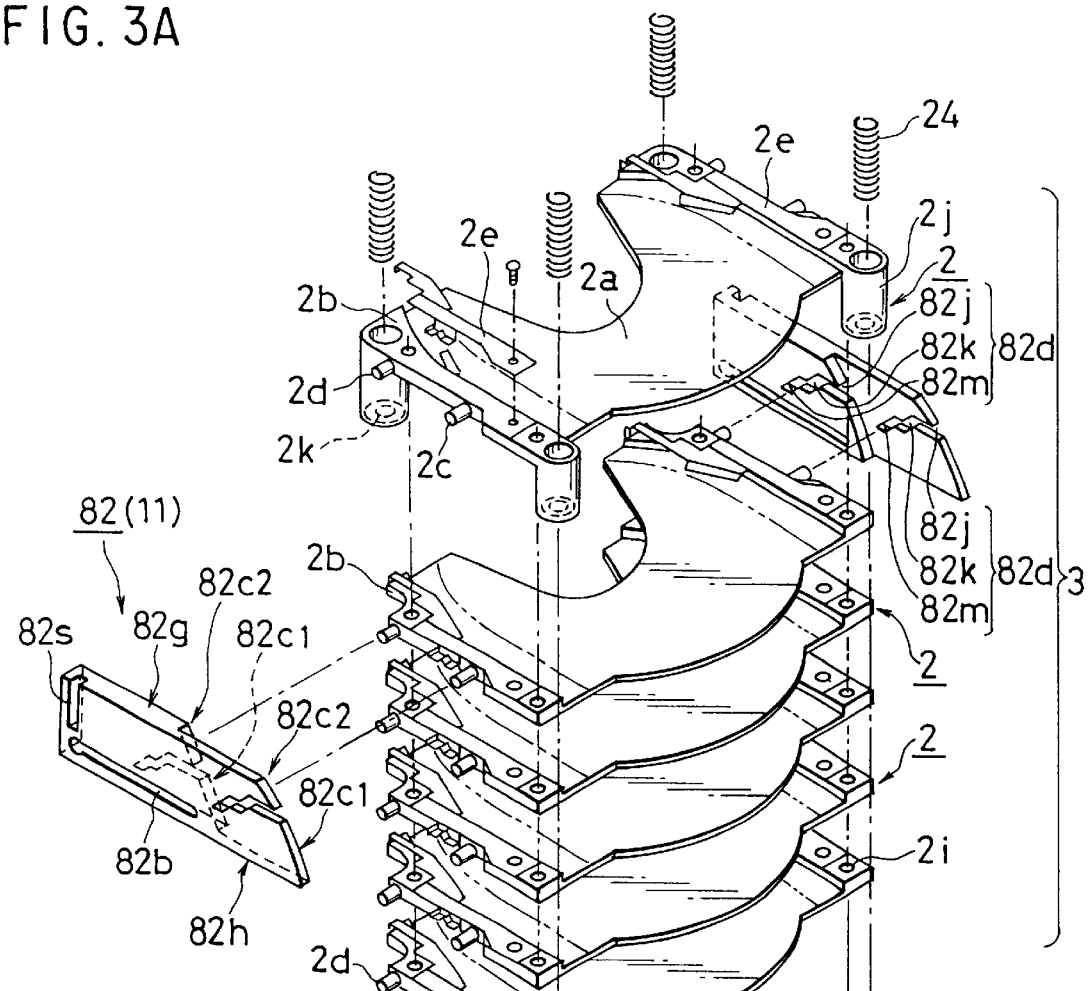
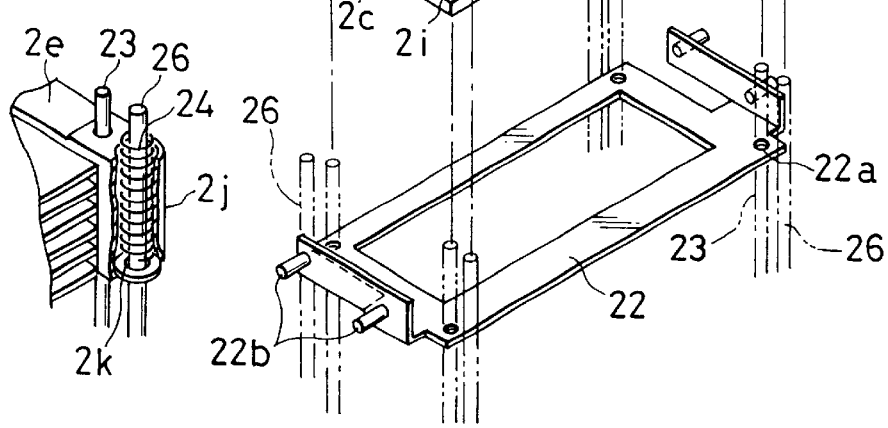
FIG. 3A
FIG. 3B

POSITIONS OF TRAYS TO BE SELECTED

POSITIONS OF TRAYS TO BE SELECTED

MOVING POSITION OF SEPARATED CAM

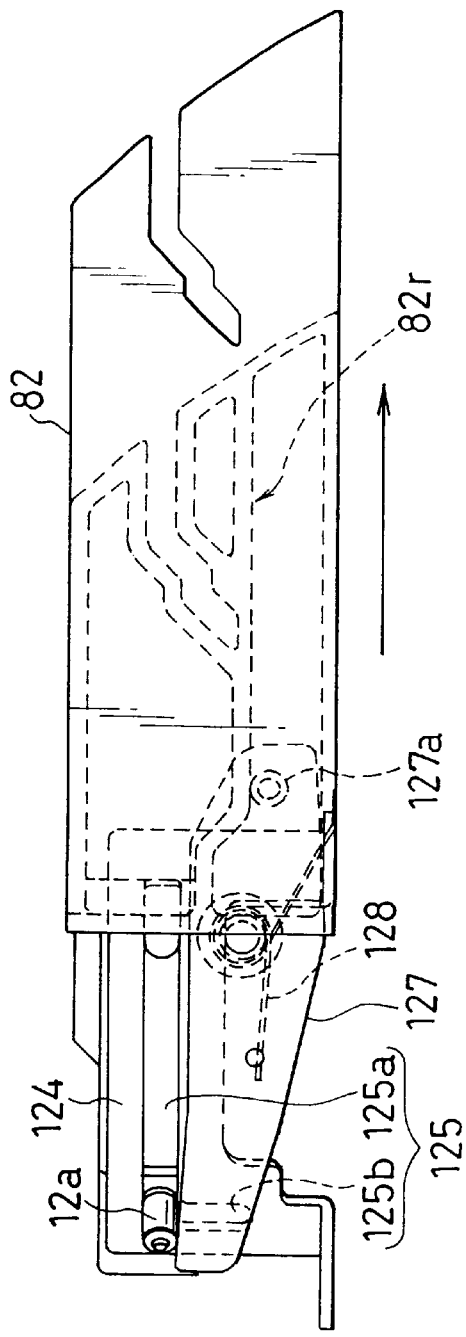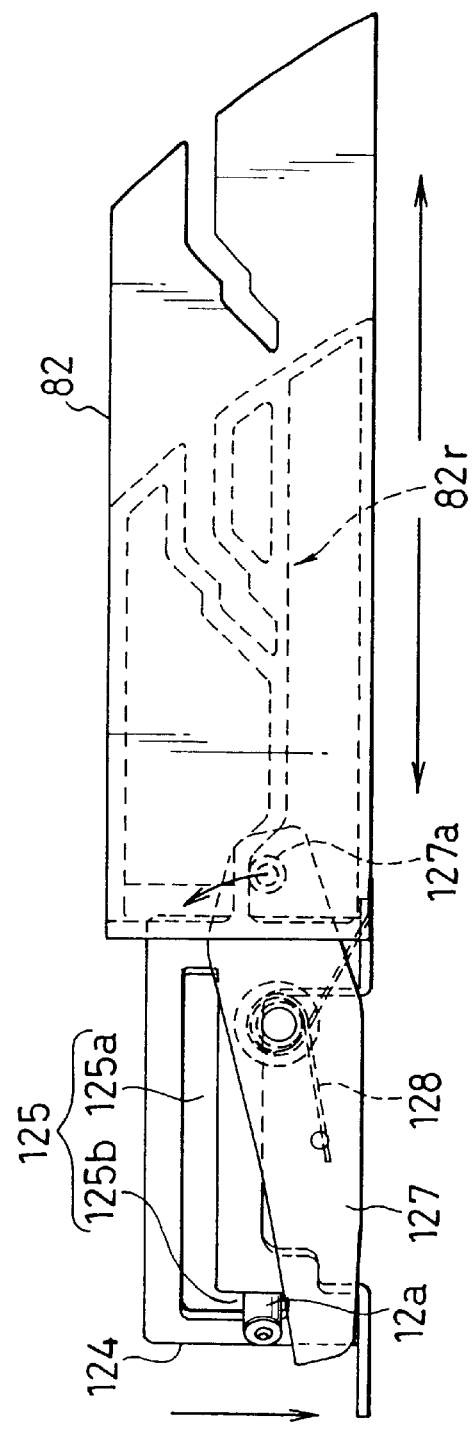
FIG. 43A
FIG. 43B

DISC RECORDING AND/OR REPRODUCING APPARATUS AND DISC EXCHANGING MECHANISM

BACKGROUND OF THE INVENTION

1. Field of the Invention

The present invention relates to a disc recording and/or reproducing apparatus and a disc exchanging mechanism, the apparatus and the mechanism being for performing the recording and/or the reproducing of a plurality of discs housed therein.

2. Description of the Related Art

As an apparatus to be mounted on a vehicle for sound recording and/or reproduction (playback) for recording and/or reproducing a disc, there is a disc player. The disc player adopts a system in which a plurality of compact discs (CD's, Compact Disc is a trademark) are stored in a magazine and the plural CD's are exchanged collectively at once for the magazine as a whole. Accordingly, as the size of the disc player is large, its body portion is housed in the trunk of a vehicle and only the portions necessary for the operation thereof are provided in the cabin of the vehicle. However, in the system, the CD's cannot be exchanged while the vehicle is moving, so it is necessary for the exchange of the CD's to stop the vehicle and open the trunk. Consequently, such exchange of the CD's is troublesome.

As a consequence, in recent years, an on-vehicle disc player for being housed in a cabin has been developed. As the on-vehicle disc player, one that can accommodate a plurality of CD's is required, and the on-vehicle disc player is housed in an in-dash fixed space within the cabin of the vehicle. Consequently, it is an important problem to make the size of the on-vehicle disc player small.

In the on-vehicle disc player, a disc housing section is formed by, for example, six superposed trays for placing a CD thereon in a frame body having a fixed size, for example, the so-called one-DIN size. The on-vehicle disc player is structured so that the six CD's can be inserted or discharged (unloaded) separately and one of the six sheets of CD's can be selected at a time for reproduction (playback) (of sound, image or the like).

For the discharge of a disc in the disc housing portion, a structure for performing the following operation is adopted: moving a tray on which a disc that is required to be unloaded is placed so that the disc is situated at the position of insertion/discharge (unload included), and then pushing out the disc from the disc housing portion to the outside portion of the frame body to make the disc be engaged between a pair of rollers for discharging (unloading) the disc to the outside of the frame body by the pair of rollers.

As pushing-out means for pushing out a disc from the surface of a tray, a structure can be considerable that a single lever is disposed at either of the right and the left sides to the direction in which the disc is pushed out and the disc is pushed out by the turning of such lever. The reason why the lever is disposed at either of the right and the left sides is that it is necessary to engage reproducing means for reproducing the disc with the disc and the lever cannot be disposed at the center.

SUMMARY OF THE INVENTION

However, because the vector of the pushing-out force applied from the lever to the disc does not pass through the center of the disc in the aforesaid single lever structure, the disc escapes to the other side opposite to the lever's disposed side, and the disc is pushed while rotating in a state in which the center of the disc is shifted. For that reason, it is apprehended that the disc is not pushed out to a position where the disc is engaged with the rollers, and that the disc is discharged in the state in which the center of the disc is shifted even if the disc can be pushed out. In such a state, it is apprehended that the disc is caught without being discharged or that the disc is damaged.

It is therefore an object of the present invention to provide a disc recording and/or reproducing apparatus and a disc exchanging mechanism, an apparatus and a mechanism for solving such problems.

According to a first preferred embodiment of the present invention, there is provided a disc recording and/or reproducing apparatus, including: a plurality of stacked disc placing means for placing discs; and a pair of pushing-out means for pushing out a disc at a position of insertion/discharge from disc placing means placing thereon the disc at the position of insertion/discharge.

According to a second preferred embodiment of the present invention, there is provided a disc recording and/or reproducing apparatus, further having: a pair of position controlling means for controlling insertion, discharge and support of the disc, the position controlling means being provided on both sides of the disc placing means, and each of the pushing-out means is engaged with each of the control means.

According to a third preferred embodiment of the present invention, there is provided a disc recording and/or reproducing apparatus, further having: a pressing means for returning the pushing-out means to an original position after the pushing-out means pushed the disc out.

According to a fourth preferred embodiment of the present invention, there is provided a disc exchanging mechanism comprising: a plurality of stacked disc placing means for placing a disc thereon; and a plurality of pushing-out means for pushing out a disc at a position of insertion/discharge from disc placing means placing thereon the disc at the position of insertion/discharge.

According to a fifth preferred embodiment of the present invention, there is provided a disc exchanging mechanism, further comprising: a pair of position controlling means for controlling insertion, discharge and support of the disc, the position controlling means being provided on both sides of the disc placing means, and each of the pushing-out means is engaged with each of the control means.

According to a sixth preferred embodiment of the present invention, there is provided a disc exchanging mechanism, further having: a pressing means for returning the pushing-out means to an original position after the pushing-out means pushed the disc out.

According to the preferred embodiments of the present invention, because a pair of pushing-out means for pushing out a disc from a disc placing means is provided on both sides of the disc placing means, the pushing-out force of the disc becomes twice as large as that in a case in which the pushing-out means is single, and a case in which the center of the disc is shifted, thus a situation in which the disc is pushed out while rotating does not occur.

Moreover, because the pushing-out means is engaged with a pair of control means for controlling the insertion, the discharge and the suspension of a disc, the control means becomes a driving source. Consequently, the riscs of malfunction are reduced.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 3A is an exploded perspective view showing a disc housing section of the disc player according to the preferred embodiment of the present invention;

FIG. 3B is a cut-off perspective view showing a main portionportionportion of a tray of the disc player according to the preferred embodiment of the present invention;

FIG. 43A is a diagrammatic view of an operation of the regulation means in a state of preventing the pinching of the pinching means when the pinching means is situated at the position of playback, in the disc player according to the preferred embodiment of the present invention;

FIG. 43B is an explanatory view of the operation of the regulation means in a state of releasing the state of retention of pinching, in the disc player according to the preferred embodiment of the present invention.

DESCRIPTION OF THE PREFERRED EMBODIMENTS

Figure 1:
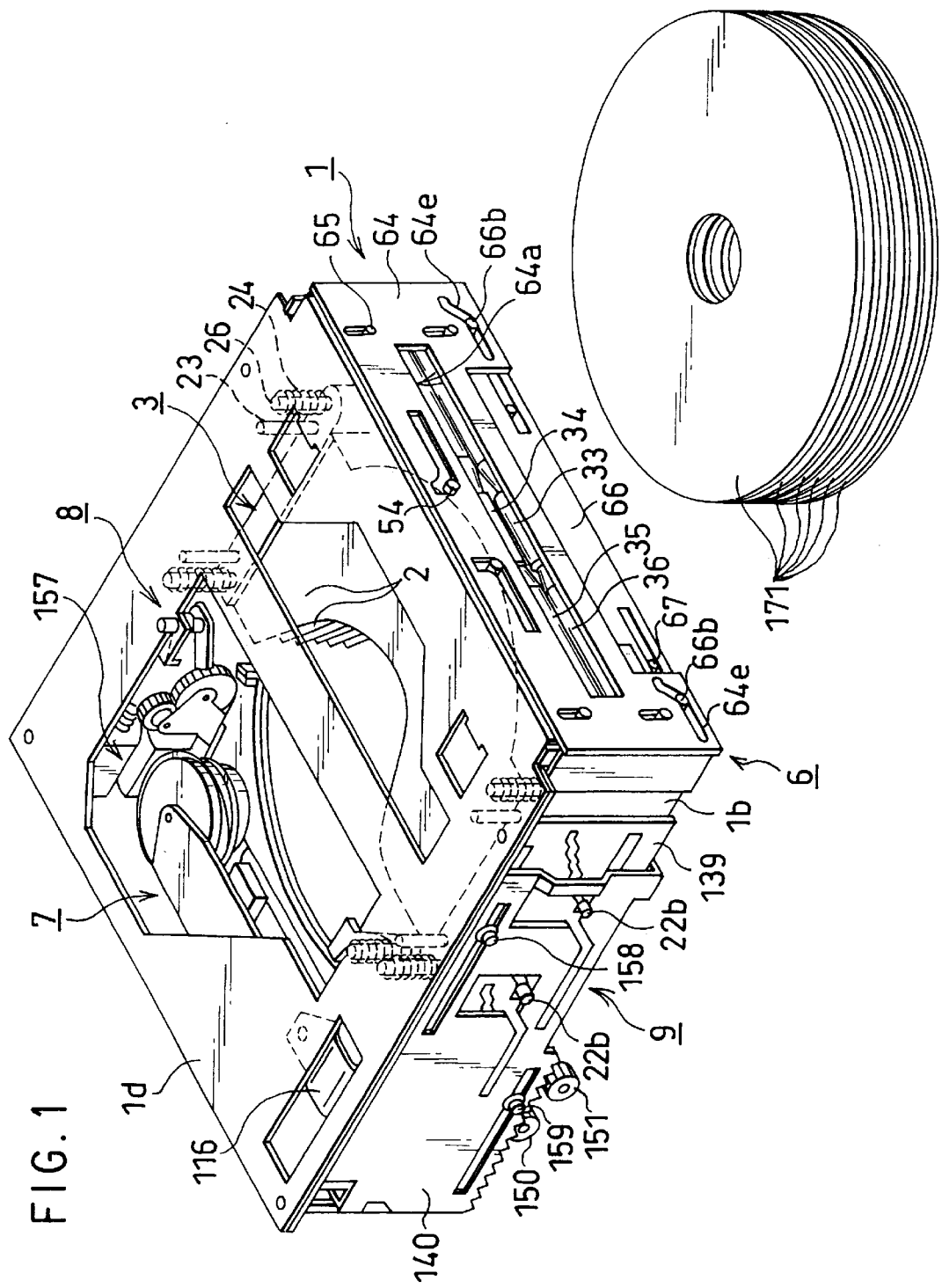
FIG. 1 is an external perspective view showing a disc recording and/or reproducing apparatus according to a preferred embodiment of the present invention.

A preferred embodiment of a disc recording and/or reproducing apparatus according to the present invention will be described in the folowing.

The preferred embodiment of the present invention is applied to a disc player for sound reproduction.

(A) THE WHOLE CONFIGURATION OF THE DISC PLAYER STRUCTURE

As shown in FIG. 1 to FIG. 20, a disc player can be roughly divided in a frame body 1 forming the shape of the exterior thereof, a disc housing section 3 that is disposed on the front side in the frame body 1 and stores CD's, a transferring means 5 that is provided at an insertion/discharge aperture 4 in a front face plate 1a of the frame body 1, an opening and shutting means 6 for the insertion or the discharge of a CD (Compact Disc, a trademark) in the disc housing section 3, that is provided on the front side of the transferring means 5 and opens and shuts the insertion/discharge aperture 4 of the front face plate 1a, a reproducing means 7 that is disposed on the back side in the frame body 1, for selecting and reproducing one of the CD's in the disc housing section 3, a pushing-out means 8 that is disposed on both sides of the back side of the disc housing section 3 and pushes out a CD to be discharged to the transferring means 5, and an operation means 9 that is mainly provided on the outside of the side plates on both sides of the frame body 1 and is for operating the disc housing section 3, the reproducing means 7 and other sections.

The aforesaid reproducing means 7 includes a control means 11 that is disposed on both sides of a pickup raising/lowering stand 10, which moves upward and downward, and forms spaces above and below a selected CD among the plural CD's in the disc housing section 3, a pinching means 14 having a lower arm 13 and an upper arm 12 provided on the pickup raising/lowering stand 10, so as to freely turn and pinch the selected CD by entering into the aforesaid spaces, a disc driving means 15 that is attached to the aforesaid lower arm 13 and providing rotating and driving power to the pinched CD, a picking unit 16 that is provided to the aforesaid lower arm 13 and reads out information from a rotating CD, a rotation force supplying means 17 for rotating the pinching means 14 by transmitting the driving force of the aforesaid transferring means 5 to the pinching means 14 only at the time of a reproducing (playback) mode that is a state for reproducing a CD between an insertion/discharge mode that is a state for the insertion or the discharge of the CD and the reproducing mode, and a regulation means 18 for setting a time when the pinching means 14 pinches a CD.

(B) FRAME BODY

The frame body 1 will be described in first place. The frame body 1 includes a front surface plate 1a, side plates 1b, 1c, a ceiling plate 1d and a bottom plate 1e, and the back surface of the frame body 1 is left open. Then, the side plates 1b, 1c and the bottom plate 1e are integrated to one unit.

(C) DISC HOUSING SECTION

As shown in FIG. 3A, the disc housing section 3 is composed of six units of a tray 2 as a disc placing means and a disc raising/lowering stand 22 for placing the six trays 2 thereon. On the front side of the frame body 1, four guide posts 23 as supporting means are supported in a state in which both the ends of the guide posts are connected with the bottom plate 1e and the ceiling plate 1d in a vertical direction.

Figure 4A:
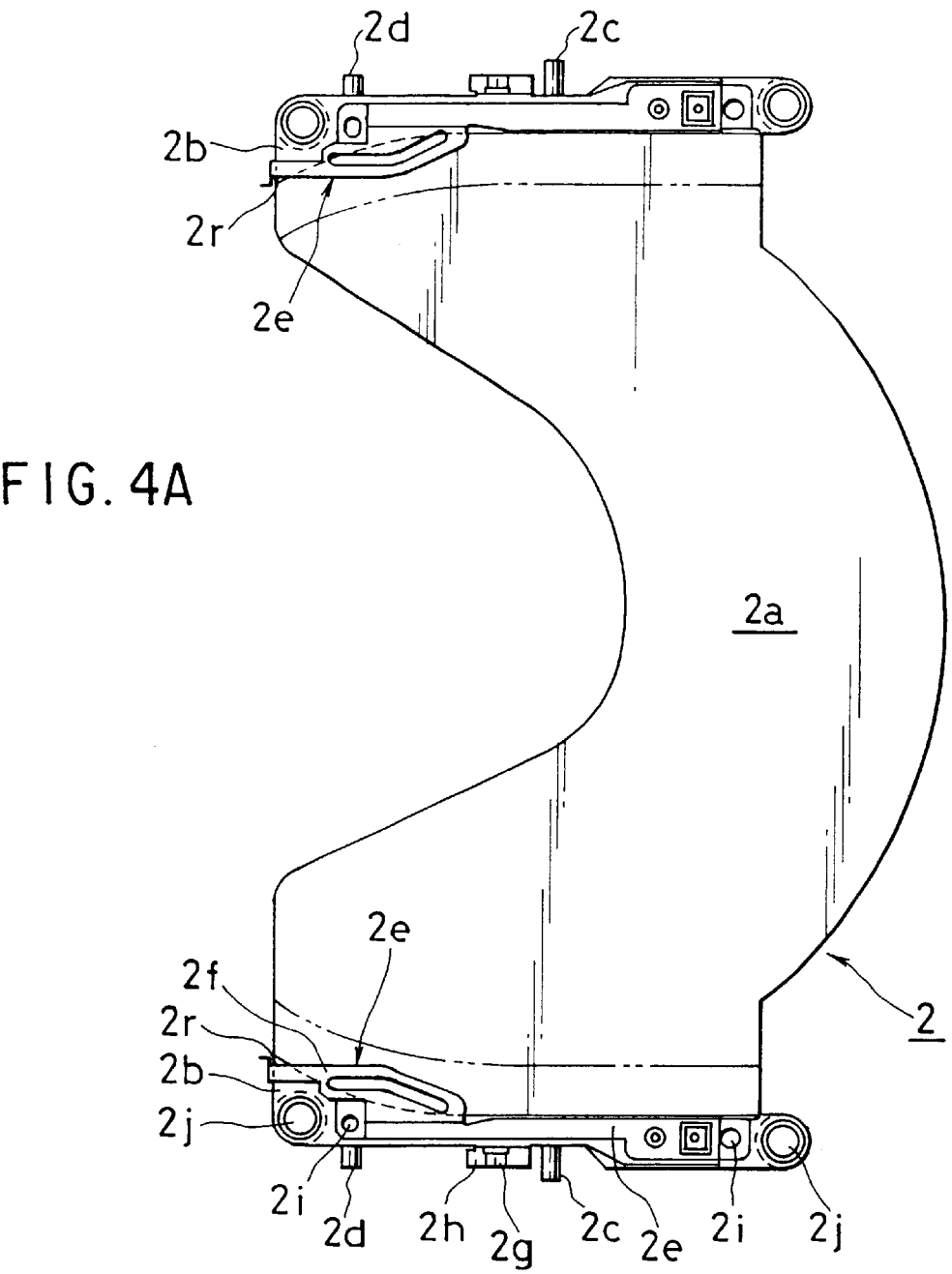
FIG. 4A is a plan view showing a disc housing section of the disc player according to the preferred embodiment of the present invention.

The tray 2 is formed in a way in which two resin pieces 2b as guiding members are affixed on both sides on a thin aluminum plate 2a as shown in FIG. 4A. A pair of pins 2c, 2d projecting to the side direction at the middle portion and at the back side of each resin piece 2b, respectively, is formed, the front side pins 2c are long and the back side pins 2b are short. The heights of the resin pieces 2b are set to be about the same as the thickness of a CD.

On the upper faces of the resin pieces 2b, the front sides of plate springs 2e as spring means are fixed for pinching a CD between the plate springs 2e and the aluminum plate 2a.

Figure 5:
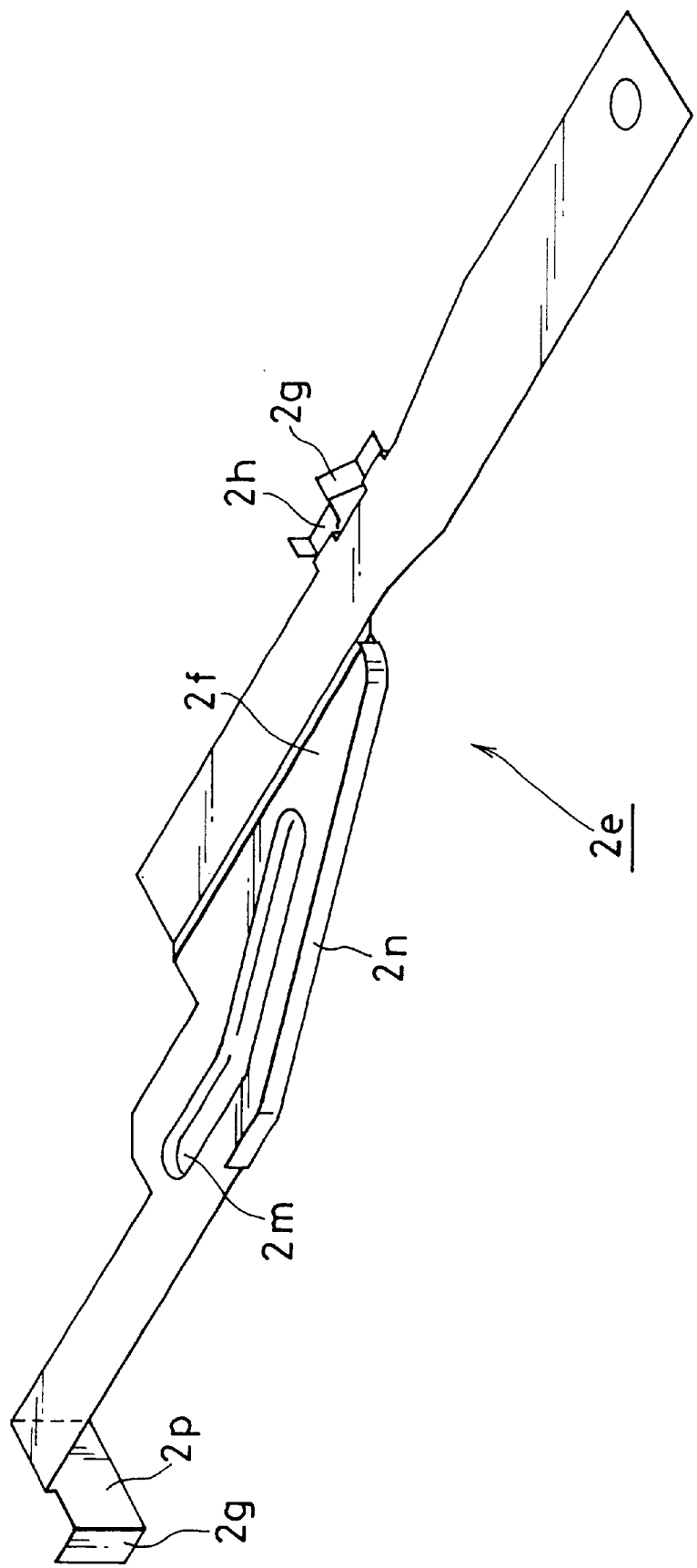
FIG. 5 is a perspective view showing a plate spring of the disc player according to the preferred embodiment of the present invention.
Figure 6:
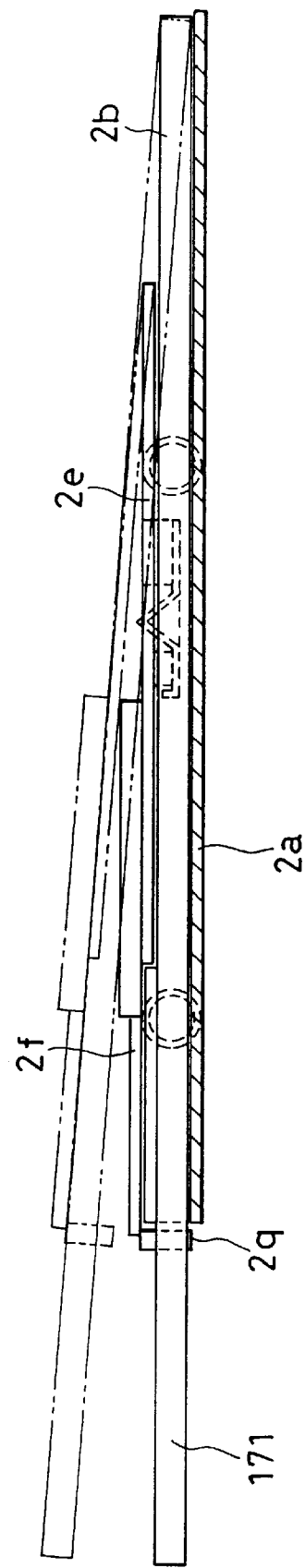
FIG. 6 is an explanatory view showing a state in which the plate spring is raised, in the disc player according to the preferred embodiment of the present invention.

As shown in FIG. 5, a holding portion 2f for holding a CD is formed at the inner portion on the back side of each of the plate springs 2e, and, on the other hand, a receiving portion 2g that is to be pressed downward by the under face of a separation cam 82, which will be described later, and a receiving portion 2h receiving an upward force by the bottom face of an upper stage fitting portion 82j, which will be described later, are formed at the outer portion of the middle portion of each of the plate springs 2e. Next, the structure of the holding portion 2f in the plate spring 2e will be described. The holding portion 2f is formed by being bent so as to be a slightly higher than the other portions, and a projection portion 2m in a shape of a ridge projecting downward is formed at a portion to be touched to the upper face of a CD. A guiding portion 2n for guiding a CD to the lower portion of the holding portion 2f when the CD is stuffed into a tray 2 is formed at the inclined portion of the inner portion of the holding portion 2f so as to stand up. The center of a CD is determined by a pair of positioning sections 2r at the inner portions of the back faces of the pair of resins 2b to which the CD touches. However, if the back sides of the plate springs 2e are raised owing to some cause and a CD 171 is placed on the resin pieces 2b as shown in FIG. 6, the CD can move to the left direction in FIG. 6, and then the positioning of the CD 171 becomes impossible. Accordingly, the back sides of the plate springs 2e are bent downward at the positions of the end faces on the back sides of the resin pieces 2e to form auxiliary positioning sections 2p. A touching section 2q to touch a CD is formed so as to project from each of the auxiliary positioning sections 2p to the back side, and forms a radius portion so that the CD is not damaged.

Guide holes 2i for inserting the aforesaid guide posts 23 are formed on the front side and the back side of each resin piece 2b in a state of piercing the resin piece 2b and the aluminum plate 2a. A not shown buffer medium is affixed to a portion, to which the vicinity of the outer peripheral surface of a CD is touched, of each of both the surfaces of the aluminum plate 2a along the arc of the aluminum plate 2a. As shown in FIG. 3A, cylindrical spring bearings 2j for receiving coil springs 24 as actuating means that are provided between the ceiling plate 1d and the uppermost stage tray 2 are formed integrated to a single body at both ends of the resin pieces 2b of the uppermost stage tray 2. As shown in FIG. 3B, the lower ends of the spring bearings 2j project a little to the inside to form receiving portions 2k that receive the lower ends of the coil springs 24. The structure is for preventing that the loads of the coil springs 24 necessary for their compression become too large even if the compression lengths of the coil springs 24 become long when long springs are used as the coil springs 24.

On the other hand, the disc raising/lowering stand 22 is formed into a shape in which both ends are bent upwards. Guide holes 22a for being inserted by the aforesaid guide posts 23 are formed on the horizontal portion of the disc raising/lowering stand 22, and a pair of pins 22b for raising and lowering the disc raising/lowering stand 22 are fixed to the outer portion of each of the vertical portions on both sides of the disc raising/lowering stand 22 in a state of projecting in the horizontal direction. The pairs of pins 22b are inserted into the two vertical slits 25 formed on the side plates 1b, 1c of the frame body 1 severally to project to the outside of the frame body 1.

The aforesaid disc raising/lowering stand 22 and the six sheets of trays 2 are supported by the insertion of the guide posts 23 into the guide holes 22a, 2i so that the disc raising/lowering stand 22 and the trays 2 can freely move upwards and downwards. Then, the upper ends and the lower ends of four spring guides 26 are fixed to the ceiling plate 1*d* and the bottom plate 1*e* of the frame body 1, respectively, and each spring guide 26 is inserted into each of the spring bearings 2*j*. And, the lower ends of the coil springs 24 as actuating means that are provided so as to surround the spring guides 26 severally are severally touched to the aforesaid receiving portions 2*k* at the lower ends of the spring bearings 2*j*.

(D) TRANSFERRING MEANS

Figure 2:
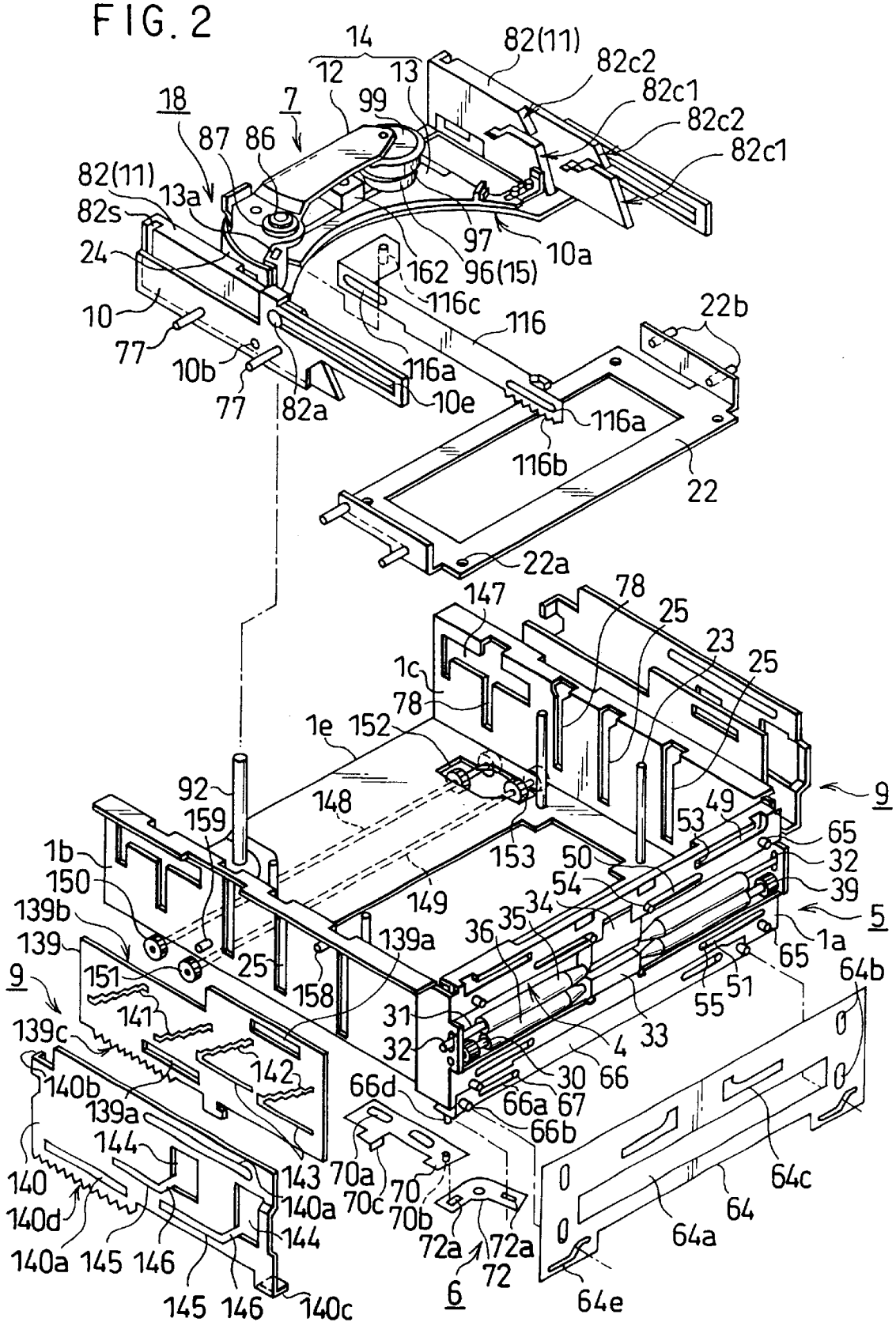
FIG. 2 is an exploded perspective view showing a disc player according to the preferred embodiment of the present invention as shown in FIG. 1.
Figure 7:
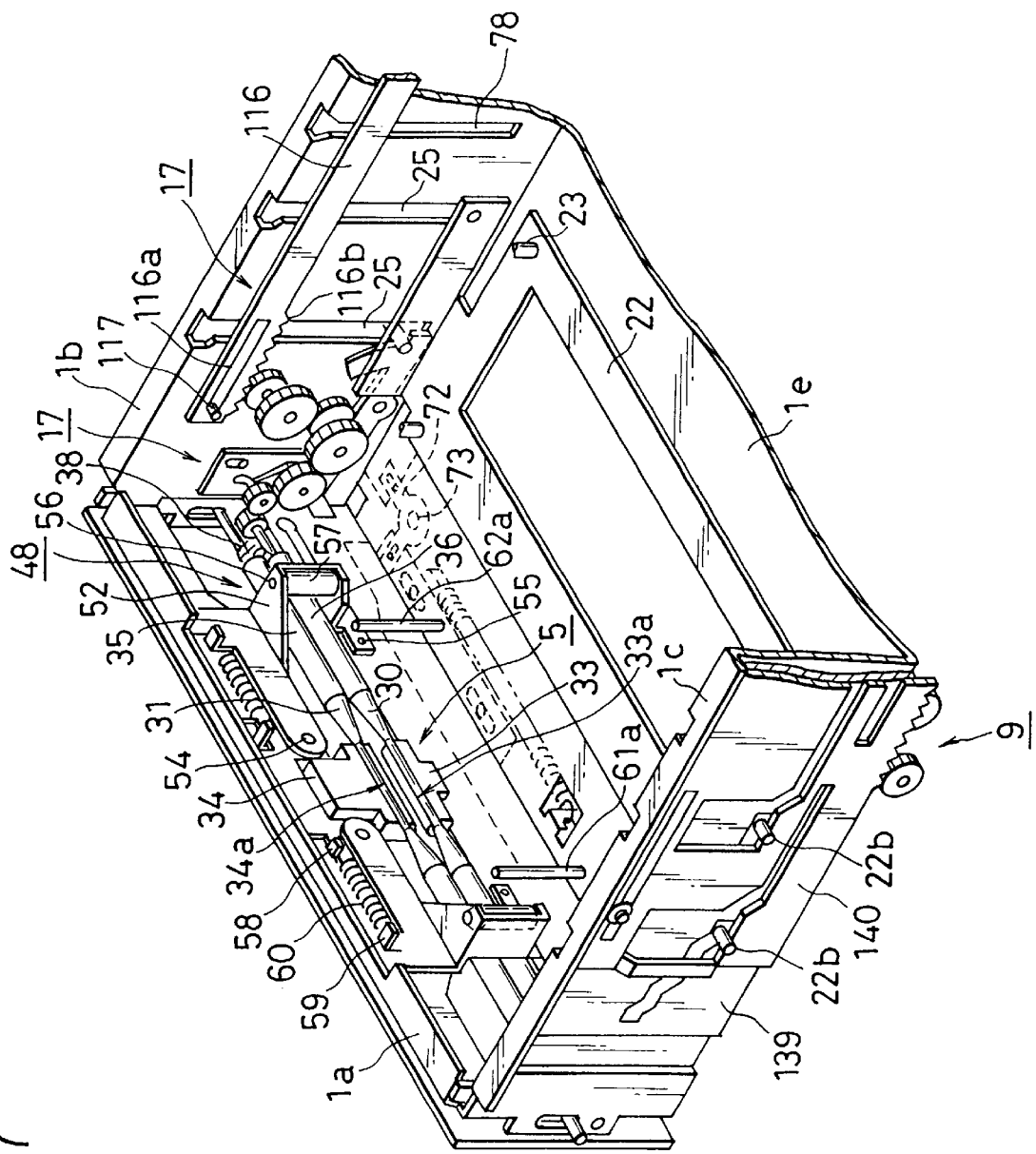
FIG. 7 is a perspective view from back side that shows the structure inside of a frame body on the front side of the disc player according to the preferred embodiment of the present invention.

As shown in FIG. 2, the transferring means 5 is provided to the front surface plate 1*a* of the frame body 1. In the front surface plate 1*a*, an insertion/discharge aperture 4 is formed. At the insertion/discharge aperture 4, the driving shaft 30 and the following shaft 31 are supported so that they can freely rotate. Both the ends of the driving shaft 30 are attached to the front surface plate 1*a* so that both the ends can freely rotate. Both the ends of the following shaft 31 are inserted into elongated holes 32 formed to be long in the vertical direction of the side faces of the front face plate 1*a*. For the support of the middle portions of the driving shaft 30 and the following shaft 31, as shown in FIG. 7, the small diameter portion of the middle portion of the driving shaft 30 is fitted into a groove 33*a* on the back side of a resin bearing 33, the transfer of which to the lower portion is restricted, so that the small diameter portion can freely rotate. On the other hand, the small diameter portion of the middle portion of the following shaft 31 is fitted into a groove 34*a* on the back side of a resin bearing 34 that can freely be raised and lowered by means of a not shown pair of guiding projections and a pair of guiding grooves so that the small diameter portion can freely rotate. A pair of rollers 35 made of resin, for example, is attached to the following shaft 31, and a pair of rollers 36 made of rubber, for example, is attached to the driving shaft 30. The dislocation of all of the rollers 35, 36 to the centers of the shafts 31, 30 are limited by stopping rings that are not shown in the figures.

Figure 10:
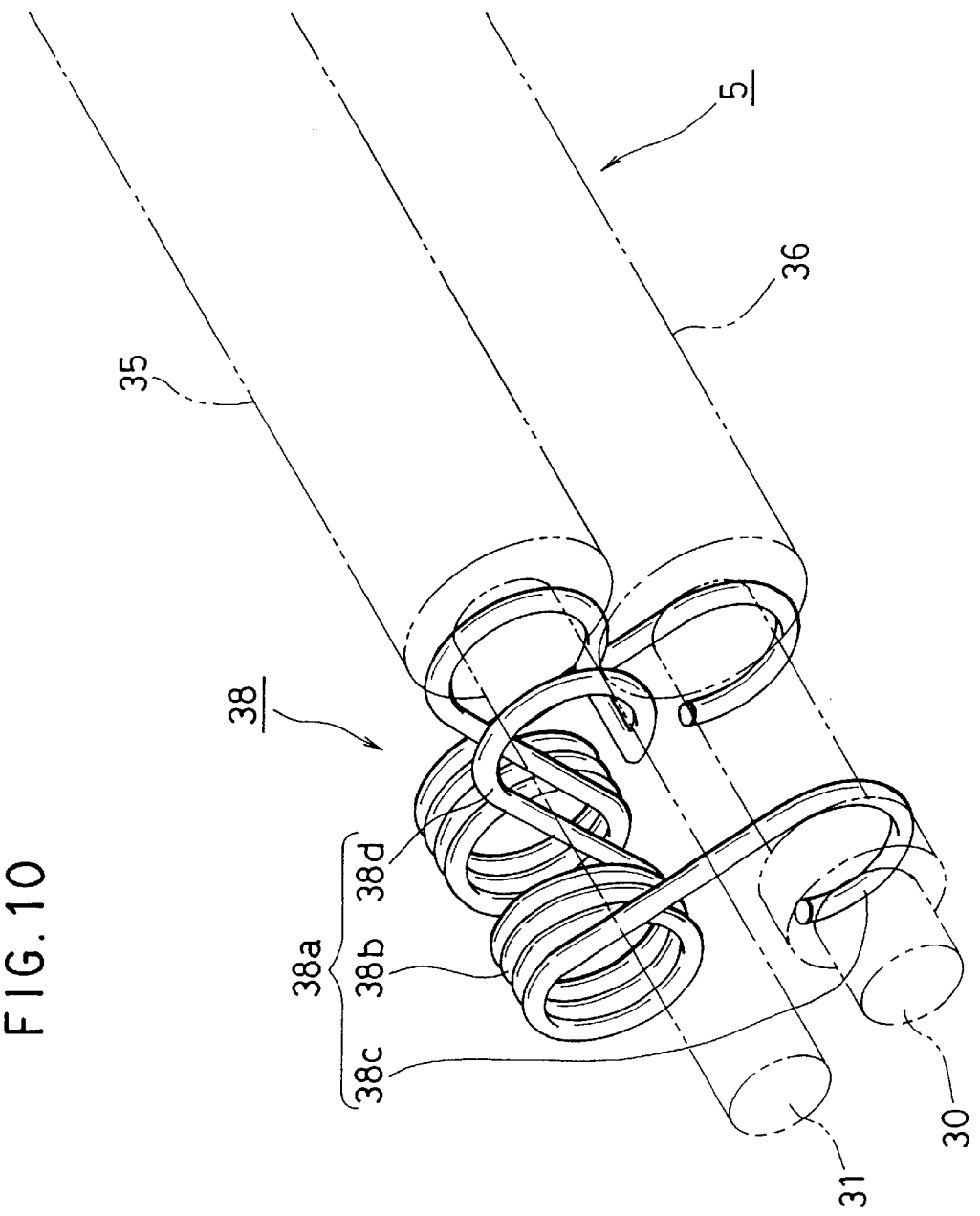
FIG. 10 is a perspective view showing a spring provided between a driving shaft and a following shaft of the disc player according to the preferred embodiment of the present invention.

A pair of springs 38 for actuating the following shaft 31 to the driving shaft 30 is provided between the following shaft 31 and the driving shaft 30. The pair of springs 38 is provided at the places that are the outside of the rollers 35, 36 and the inside of the side plate 1*b* and the side plate 1*c*. As shown in FIG. 10, the spring 38 is formed by a pair of spring fragments 38*a*. The spring fragment 38*a* is composed of twisted coil portions 38*b*, hooking portions 38*c* to which the driving shaft 30 is inserted, and hooking portions 38*d* for hooking the spring fragment 38*a* to the following shaft 31. A pair of spring fragments 38*a* is integrally formed by uniting the hooking portions 38*d*, and thereby the spring 38 is stably installed without inclining. Furthermore, sleeves may be laid between the hooking portions 38*c* and the driving shaft 30 and between the hooking portions 38*d* and the following shaft 31.

Figure 8:
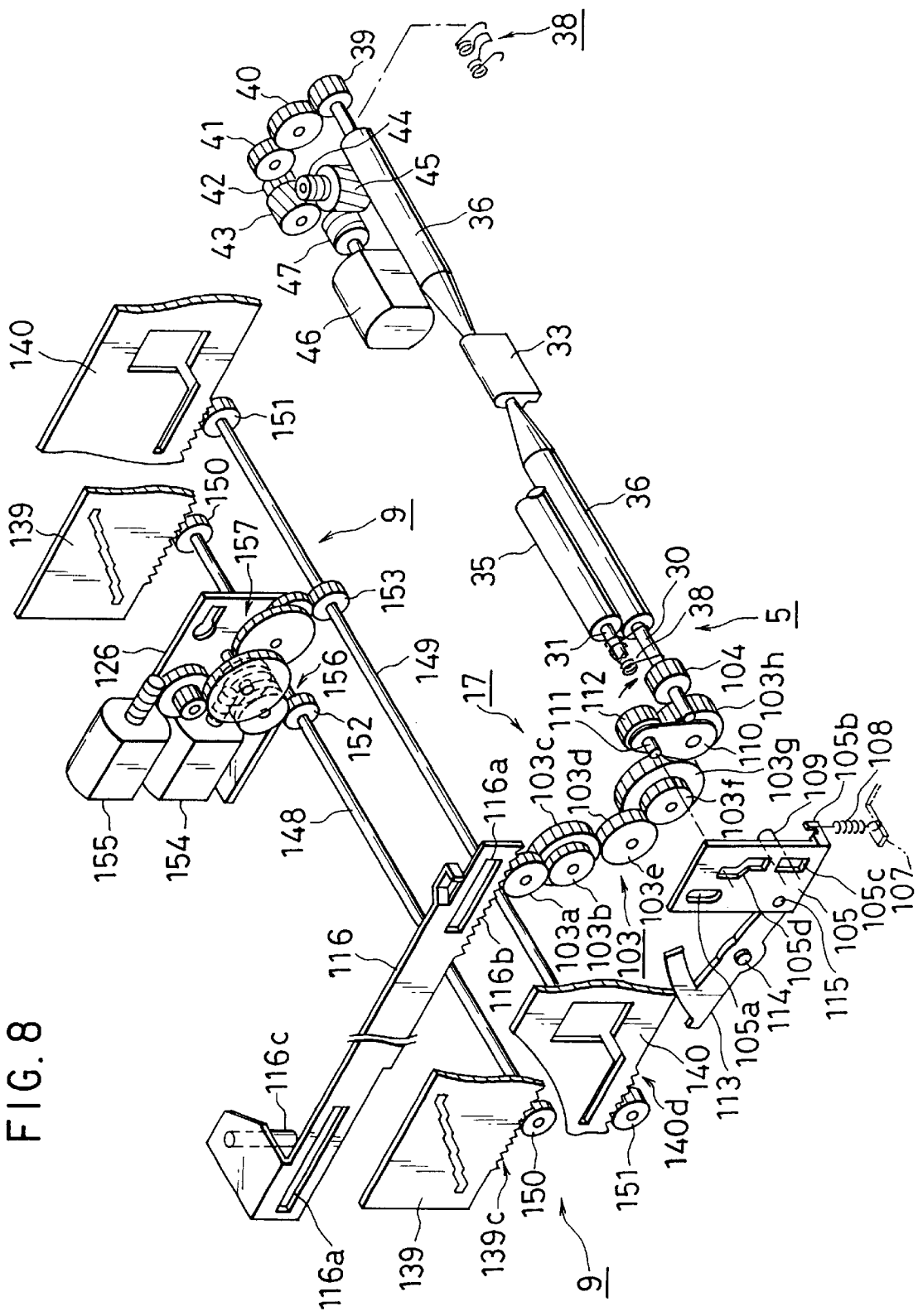
FIG. 8 is an exploded perspective view showing a transferring means, a rotation force supplying means and other means of the disc player according to the preferred embodiment of the present invention.
Figure 9A:
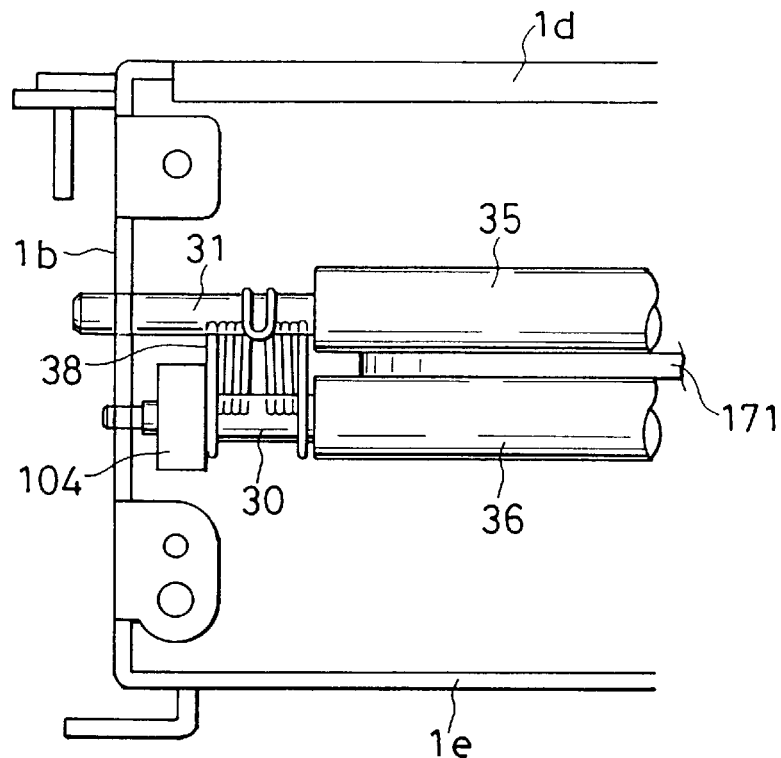
FIG. 9A is a structural view showing a spring provided between a driving shaft and a following shaft of the disc player according to the preferred embodiment of the present invention.
Figure 9B:
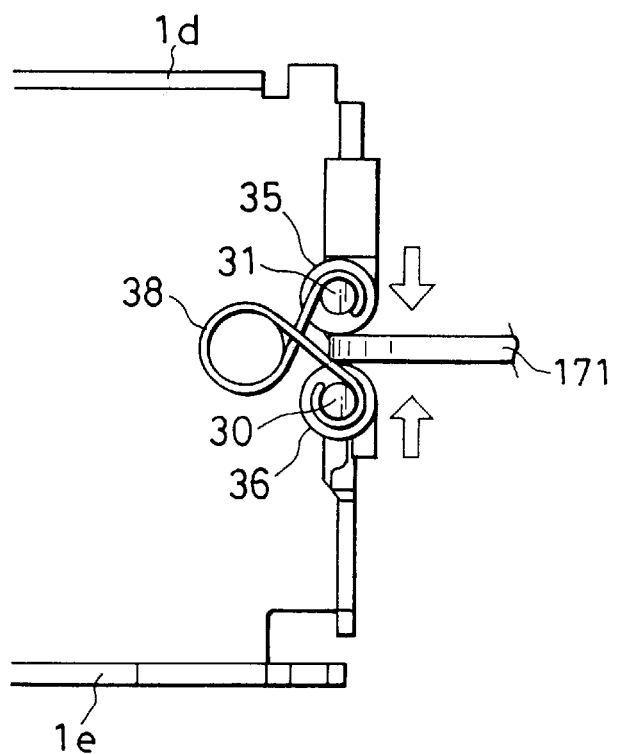
FIG. 9B is a side elevation from a left side view that shows the spring provided between the driving shaft and the following shaft of the disc player according to the preferred embodiment of the present invention.

Next, the means for driving the aforesaid driving shaft 30 will be explained. As shown in FIG. 8, a gear 39 is fixed to the right end of the driving shaft 30, and a gear 40, a gear 41 and gears 42, 43 that are united to each other are supported at the inside of the right side plate 1*c* so that they can rotate freely. A worm 44, which is engaged with the gear 43, and a gear 45 are integrally supported on the bottom plate 1*e* so that the worm 44 and the gear 45 can freely rotate. A worm 47 fixed to the output shaft of a transferring motor 46 attached to the bottom plate 1*e* is engaged with the gear 45.

For performing automatically the pushing-in operation of a CD further by several millimeters after the insertion of the CD by the rollers 35, 36 has been completed, pushing-in means 48 is provided as shown in FIG. 7. Three pairs of guide holes 49, 50, 51 in the shapes of elongated holes are formed in the upper portion and the lower portion of the insertion/discharge aperture 4 in the front surface plate 1*a*. A pair of slide stands 52 are provided on both sides of the back side of the front face plate 1*a*, and three guide pins 53, 54, 55 fixed to the slide stand 52 are inserted into the aforesaid guide holes 49, 50, 51 in a state impossible of being pulled out. A vertical roller 57 made of resin, for example, as a pushing-in member is supported on the back side of each slide stand 52 around a vertical shaft 56 so that the roller 57 can freely rotate. For actuating the pair of slide stands 52 to the direction in which the slide stands 52 approach to each other, a pushing-in spring 60 is provided between each of spring hooking portions 58 formed on the front face plate 1*a* and each of spring hooking portions 59 formed on the slide stands 52.

Figure 11A:
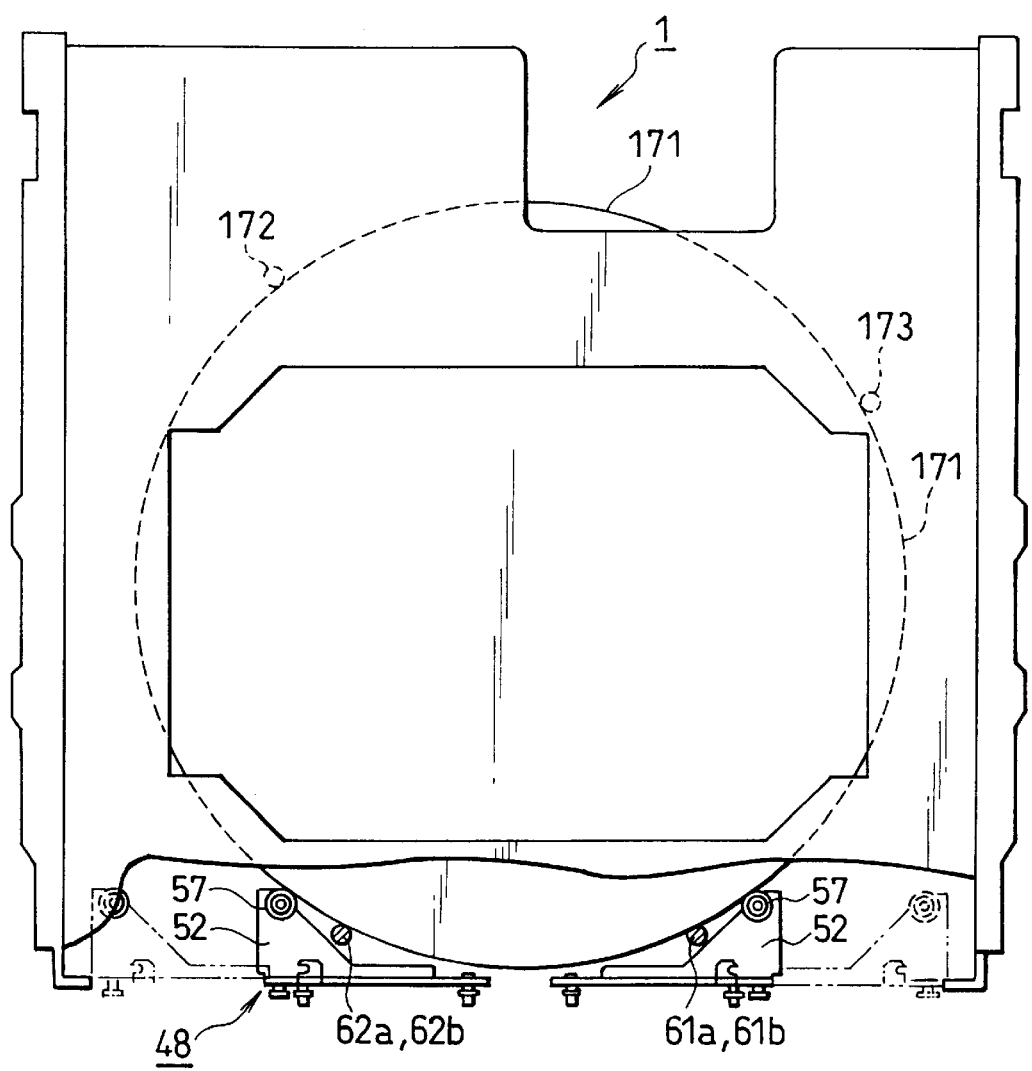
FIG. 11A is a plan view showing a relation between positioning pins and vertical rollers provided inside a frame body of the disc player according to the preferred embodiment of the present invention.
Figure 11B:
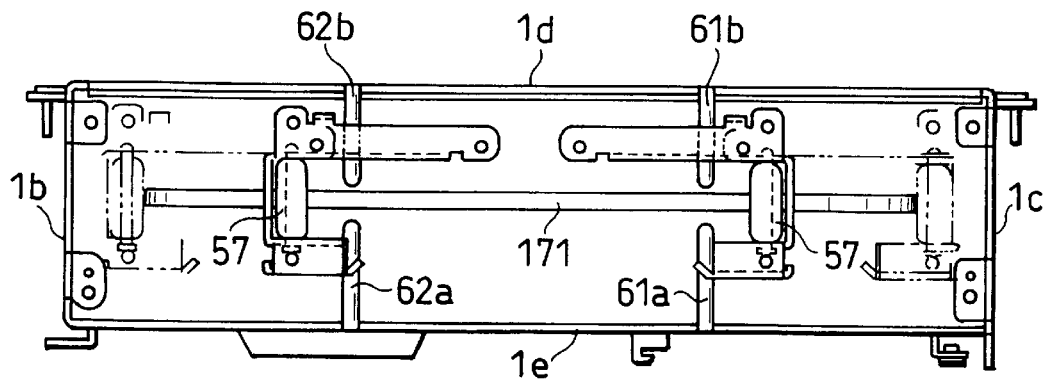
FIG. 11B is a front elevation showing the relation between the positioning pins and the vertical rollers provided inside the frame body of the disc player according to the preferred embodiment of the present invention.

The pair of vertical rollers 57 works not only as the pushing-in means 48 but also as a CD positioning means. As shown in FIG. 11A, two positioning rods 172, 173 are provided on the back side between the bottom plate 1*e* and the ceiling plate 1*d*. On the other hand, as shown in FIG. 7 and FIG. 11B, too, on the front side, positioning rods 61*a*, 62*a* mounted on the bottom plate 1*e* and positioning rods 61*b*, 62*b* disposed on the extension lines of the positioning rods 61*a*, 62*a*, respectively, are provided, and the positioning of a CD is performed at four points on a circumference.

Figure 12:
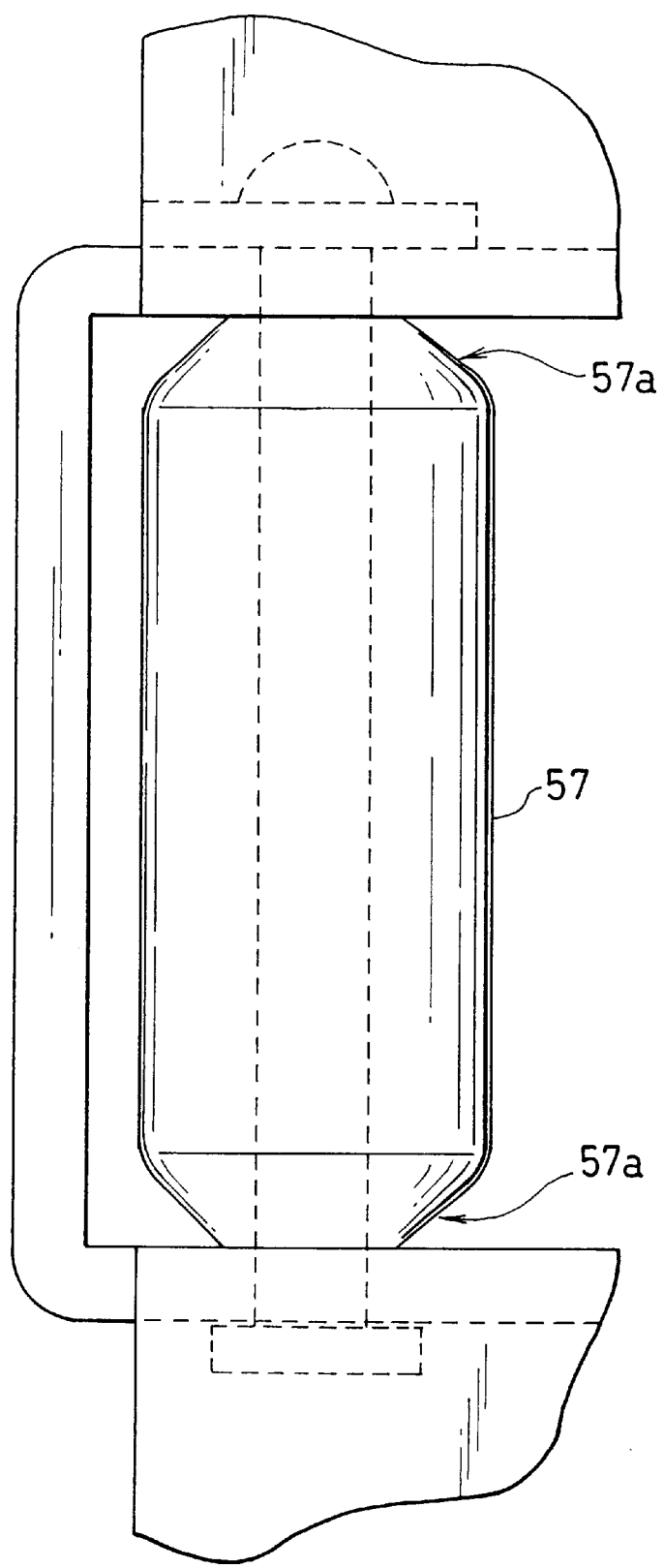
FIG. 12 is an enlarged view of one of the vertical rollers of the disc player according to the preferred embodiment of the present invention.

On the other hand, a disc transfer area is formed at an insertion/discharge height position between the positioning rods 61*a*, 62*a* and the positioning rods 61*b*, 62*b* for the insertion and the discharge of a CD, and the CD positioned at the transfer area is not positioned by the positioning rods 61*a*, 62*a*, 61*b*, 62*b*. Accordingly, a pair of vertical rollers 57 is substituted by the positioning rods 61*a*, 62*a*, 61*b*, 62*b*. For preventing the interference of the CD with the upper and the lower end faces of the vertical rollers 57 owing to the up and down movement of the CD with the disc raising/lowering stand 22, as shown in FIG. 12, tapered surfaces 57*a* are formed at the upper ends and the lower ends of the vertical rollers 57.

(E) OPENING AND/OR SHUTTING MEANS

Next, the opening and/or shutting means 6 for opening and shutting the insertion/discharge aperture 4 of the front faceplate 1*a* will be described. As shown in FIG. 2, a shutter 64 is provided on the front side of the front face plate 1*a* so that the shutter 64 can freely move upward and downward. An opening portion 64*a* for making a CD pass through it is formed in the shutter 64, and the middle height position of the opening portion 64*a* occupies the boundary position (hereinafter, referred to as "insertion/discharge height position") of the rollers 35, 36 to be "open" when the shutter 64 moves upward, and on the other hand, the opening portion 64*a* becomes "shut" when the shutter 64 moves downward.

In other words, on both sides of the front face plate 1*a*, a pair of guide pins 65 are planted at an upper position and a lower position on each side, and a pair of guide holes 64*b* that are elongated in the vertical direction are formed in the shutter 64. A stop ring is fitted into the end of each guide pin 65. For making it possible that the space between the pair of slide stands 52 becomes large only when the shutter 64 moves upward to be "open", the pair of aforesaid guide pins 54 in the vicinity of the center are set to be longer than the other guide pins 53, 55, and "L" shaped guide holes 64*c*, severally, for making the guide pins 54 be inserted into the guide holes 64c are formed in the shutter 64.

Figure 26A:
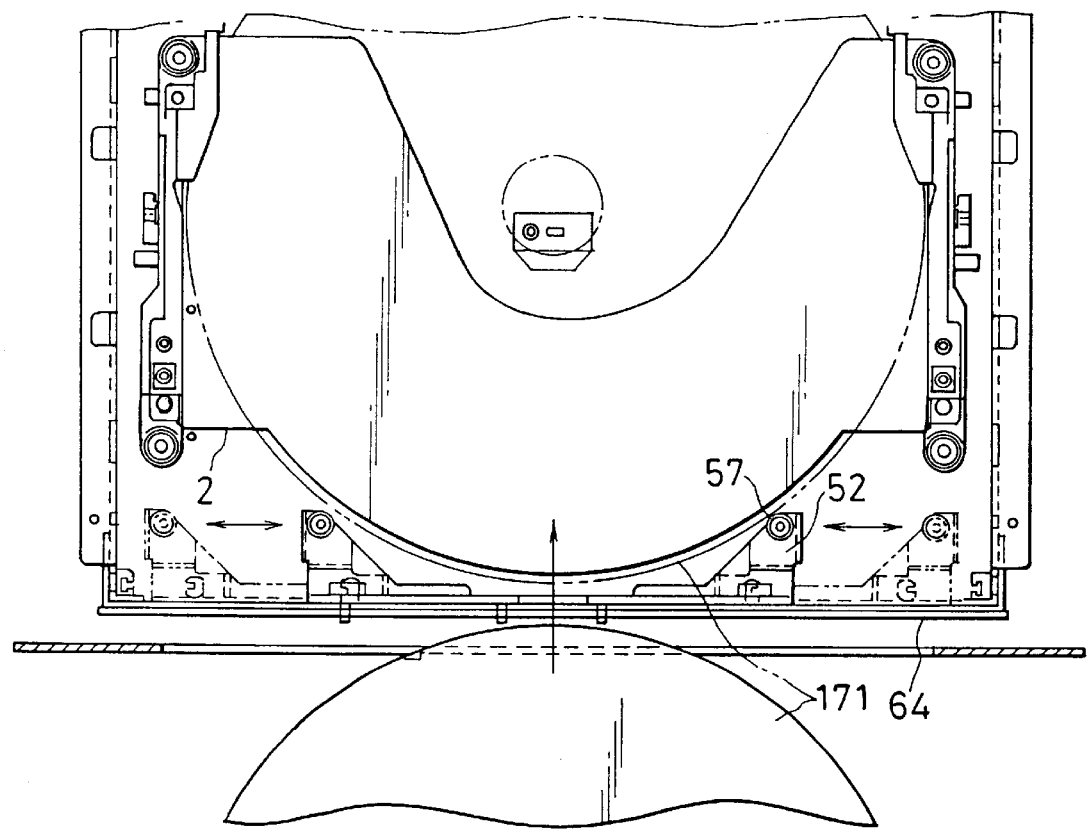
FIG. 26A is a plan view of the disc player when a CD is inserted, according to the preferred embodiment of the present invention.
Figure 26B:
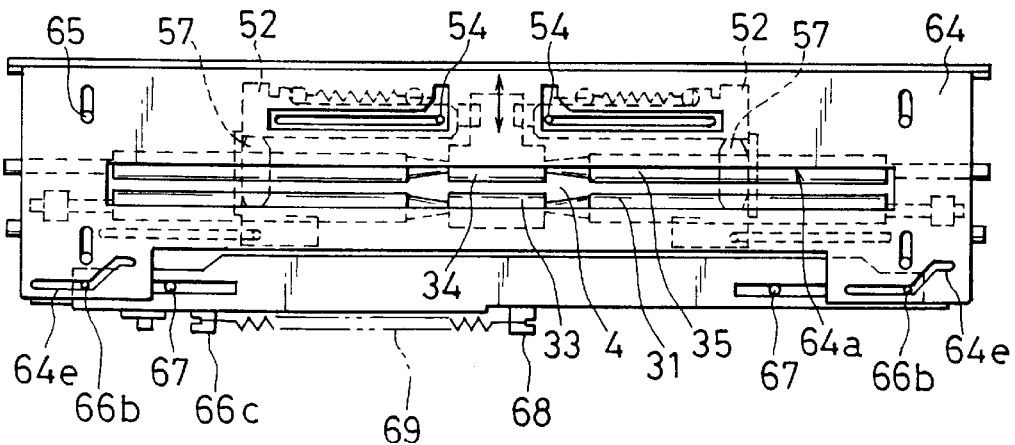
FIG. 26B is a front elevation of the disc player when a CD is inserted according to the preferred embodiment of the present invention.

Next, a link mechanism for opening and shutting the shutter 64 will be described. Guide holes 66a that are elongated in the left and right direction are formed on the front face and the under face of a left and right sliding plate 66 the sectional shape of which is approximately "L" shaped, and guide pins 67 being inserted into the guide holes 66a are fixed to the front face plate 1a and the bottom plate 1e. In the lower portion on both sides of the shutter 64, cam holes 64e are formed, and slide pins 66b are fixed on both edges on the front side of the left and right sliding plate 66, and then the slide pins 66 are inserted into the cam holes 64e. As shown in FIG. 26b, spring hooking portions 66c, 68 projecting downward are formed on the under face of the left and right sliding plate 66 and the under face of the bottom face, and a return spring 69 is hooked between both the hooking portions 66c, 68. A back-and-forth sliding plate 70 is provided on the left under face of the bottom plate 1e so that the sliding plate 70 can freely slide in the back-and-forth direction. That is, a pair of guide holes 70a is formed in the back-and-forth sliding plate 70. On the other hand, not shown pins having heads that are inserted into the guide holes 70a are fixed to the bottom plate 1e. The bent portion of an approximately "L" shaped lever 72 is attached to the under face of the bottom plate 1e so that the lever 72 can freely rotate around a fixed shaft 73 as shown in FIG. 7. On the both ends of the lever 72, elongated holes 72a are severally formed. Then, pins 66d, 70b fixed to the left and right sliding plate 66 and the back-and-forth sliding plate 70, respectively, are inserted into the elongated holes 72a with play, severally. A press portion 70c to be pressed by an outer slider 140, which will be described later, is formed in the back-and-forth sliding plate 70.

(F) REPRODUCING (PLAYBACK) MEANS

The reproducing means 7 is disposed near to the rear of the disc housing section 3 so as to make the size of the depth of the disc player as small as possible. Because the pinching means 14 in the reproducing means 7 is mounted on the pickup raising/lowering stand 10 as shown in FIG. 2, the pickup raising/lowering stand 10 will be described first.

The pickup raising/lowering stand 10 is made by an integral forming of a horizontal plate and vertical plates on both sides of the horizontal plate. A notched portion 10a in the shape of an arc is formed so that CD's are entered into the front side of the horizontal plate. A pair of pins 77 for moving the pickup raising/lowering stand 10 up and down is fixed to each of the vertical plates in a state in which the pins 77 project in the horizontal direction. The pair of pins 77 is arranged at the same height and is shorter than the pair of pins 22b of the above-mentioned disc raising/lowering stand 22. These pins 77 are inserted into a pair of vertical slits 78 formed in the side plates 1b, 1c of the frame body 1 to protrude to the outside of the frame body 1.

① CONTROL MEANS

As shown in FIG. 2, separation cams 82 made of resin, for example, are provided in the inner portions of the vertical plates on both sides of the pickup raising/lowering stand 10 so that the separation cams 82 can freely slide in the back-and-forth direction as the control means 11 for forming spaces above and below a selected CD by being inserted between the trays 2 superimposed on each other in the vertical direction and for controlling the insertion and the discharge of a disc and the support of the disc. That is, guide holes 10e are formed at the upper portions on the front side of the vertical plates of the pickup raising/lowering stand 10, and guide pins having heads 82a being inserted into the guide holes 10e are fixed to the separation cams 82. On the other hand, as shown in FIG. 3A, guide holes 82b are formed at the lower portions of the separation cams 82, and guide pins having heads 10b that are shown in FIG. 2 and are inserted into the guide holes 82b are fixed at middle positions of the vertical plates in the back-and-forth direction.

The separation cams 82 are for insertion to the aforesaid trays 2 to support one of the trays 2 stably by pushing up the four pins 2c, 2d on both sides of the tray 2 and for forming spaces above and below the tray 2 on which a CD to be reproduced is placed. Each of the separation cams 82 has a shape like one formed by the formation of slits in two plates different in length and by the affixing of the two plates. The separation cams 82 are structured so that they are slid into both sides of the tray 2 to move a pair of long pins 2c of the tray 2 upward on the front side and to move a pair of short pins 2d of the tray 2 upward on the back side.

Figure 30A:
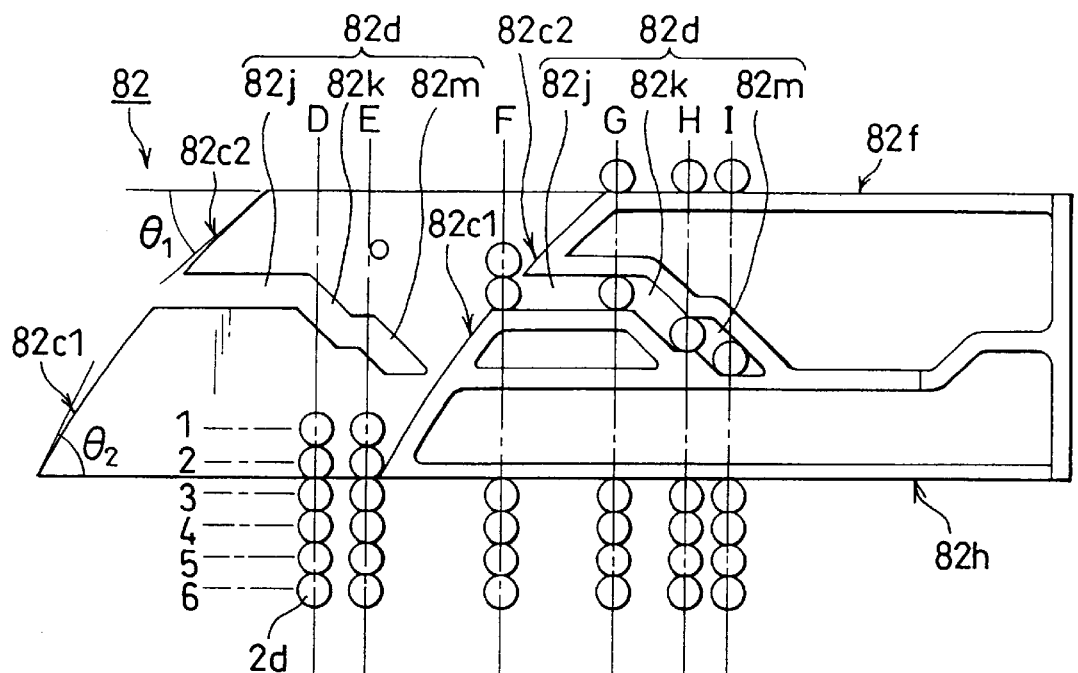
FIG. 30A is an explanatory view showing an operation of a separation cam of a disc player and especially the relation between the separation cam and a movement of the trays, in the disc player according to the preferred embodiment of the present invention.
Figure 30B:
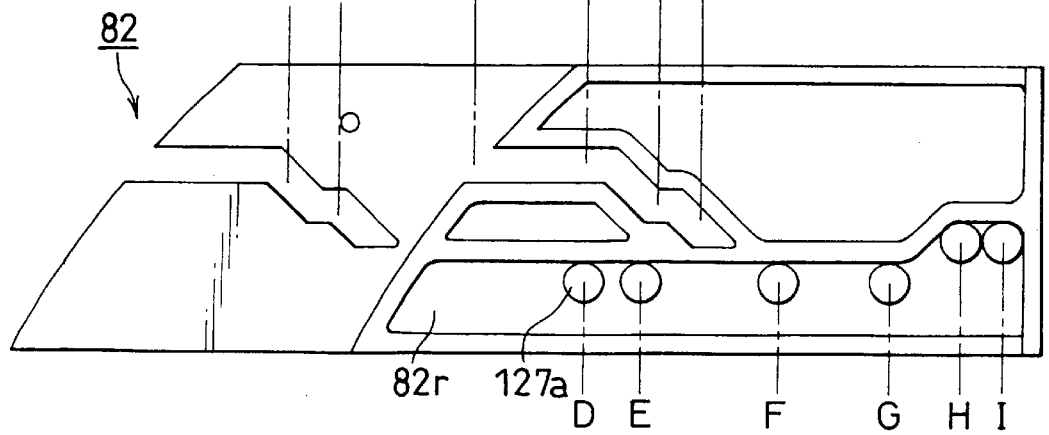
FIG. 30B is an explanatory view showing the operation of the separation cam and especially the relation of the separation cam with a raising and a lowering of an upper arm of the disc player according to the preferred embodiment of the present invention.

In other words, each of the separation cams 82 is structured as shown in FIG. 30A and FIG. 30B. A pair of first separation control portions $82c_1$ is formed for moving the selected tray 2 placing a selected CD thereon and the trays 2 situated upper than the selected tray 2 upward, and second separation control portions $82c_2$ are formed for moving only the trays 2 upper than the selected tray 2 upward at the upper portions of the respective first separation control portions $82c_1$. Then, third separation control portions 82d are severally formed for holding only the selected tray 2 between the first separation control portions $82c_1$ and the second separation control portions $82c_2$, and the first separation control portions $82c_1$, the second separation control portions $82c_2$ and the third separation control portions 82d constitute a separation control portion severally. An upper face 82f for holding the positions of the pins 2c, 2d of the trays 2 at the positions upper than the selected tray 2 and an under face 82h as position control means for holding the positions of the pins 2c, 2d of the trays 2 at the positions lower than the selected tray 2 and for pressing the receiving portion 2g of the plate spring 2e are formed along the direction of the transferring of the separation cams 82.

Because the pins 2c, 2d of the selected tray 2 and the trays 2 situated above the selected tray 2 are pushed up by the forward movements of the first and the second separation control portions $82c_1$, $82c_2$, the inclinations of the separation control portions $82c_1$, $82c_2$ are originally set to have a fixed value, e.g. θ=45. However, in the present preferred embodiment, the trays 2 compress the coil springs 24 while the trays 2 move upward, and then the higher the positions of the trays 2 become, the larger the amount of the compression of the coil springs 24 becomes. Consequently, the loads imposed when the trays 2 are pushed up become larger. In other words, the lords are small at the initial steps of the compression of the coil springs 24. Accordingly, the inclinations of the first and the second separation control portions $82c_1$, $82c_2$ at their upper portions are formed to be, e.g. $θ_1$=45, and on the other hand, the inclinations of the separation control portions $82c_1$, $82c_2$ at their lower portions are formed to be, e.g. $θ_2$=60°. Furthermore, the middle portions of the upper portions and the lower portions are formed as surfaces in a shape of an arc, and thereby, the loads are regulated to be constant.

Next, the third separation control portions 82d will be described. The third separation control portions 82d are composed of the upper stage fitting portions 82j, middle stage fitting portions 82k as descending control portions, and lower stage fitting portions 82m. The upper stage fitting portions 82j are for forming spaces above and below a selected tray 2, and the middle stage fitting portions 82k are for making the selected tray 2 move downward together with a selected CD to place them on a turntable 97 of the lower arm 13, and the lower stage fitting portions 82m are for making only the selected tray 2 move downward again to separate the selected tray 2 from the selected CD.

② PINCHING MEANS

Figure 13:
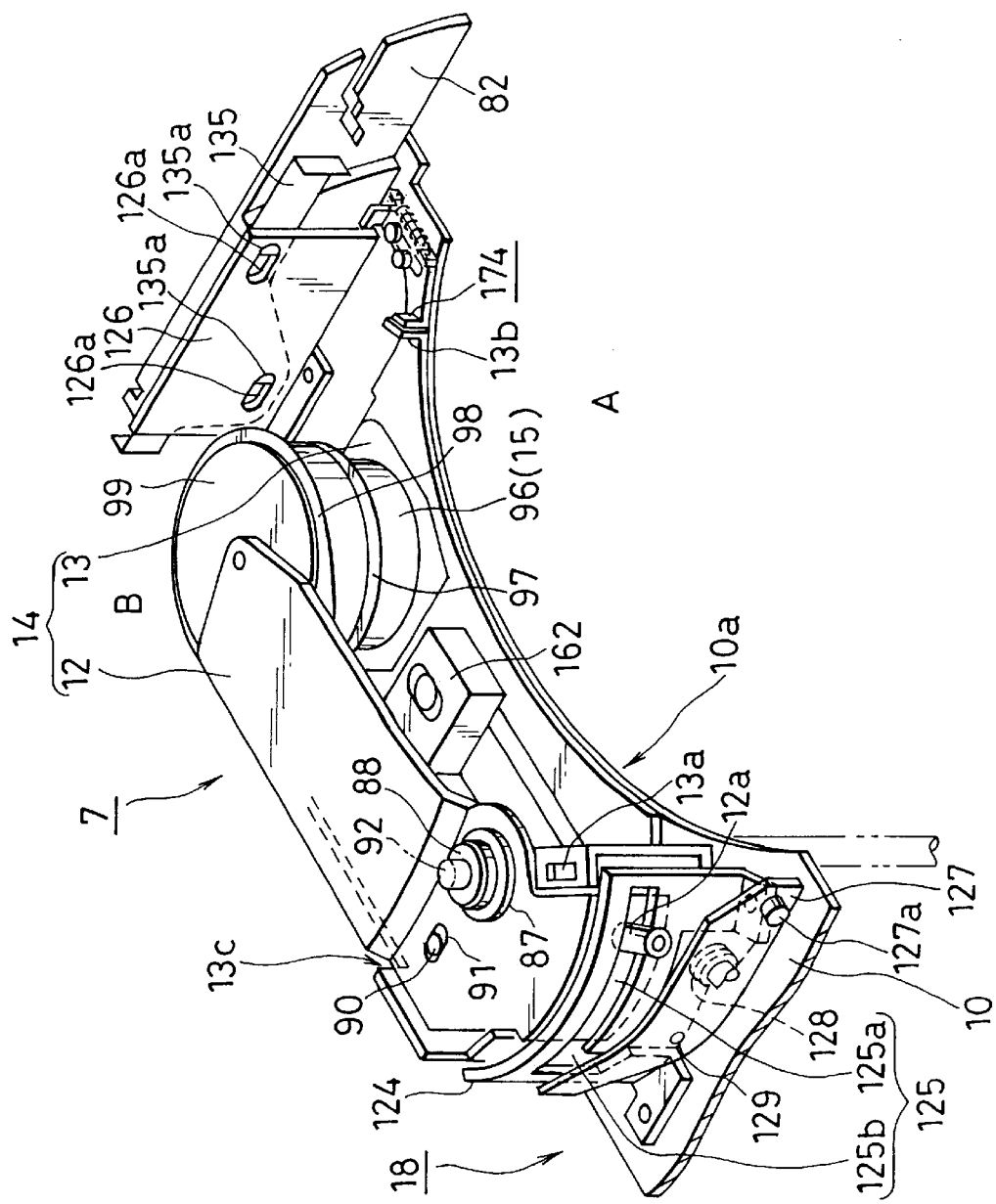
FIG. 13 is a perspective view showing reproducing means of the disc player according to the preferred embodiment of the present invention.
Figure 14:
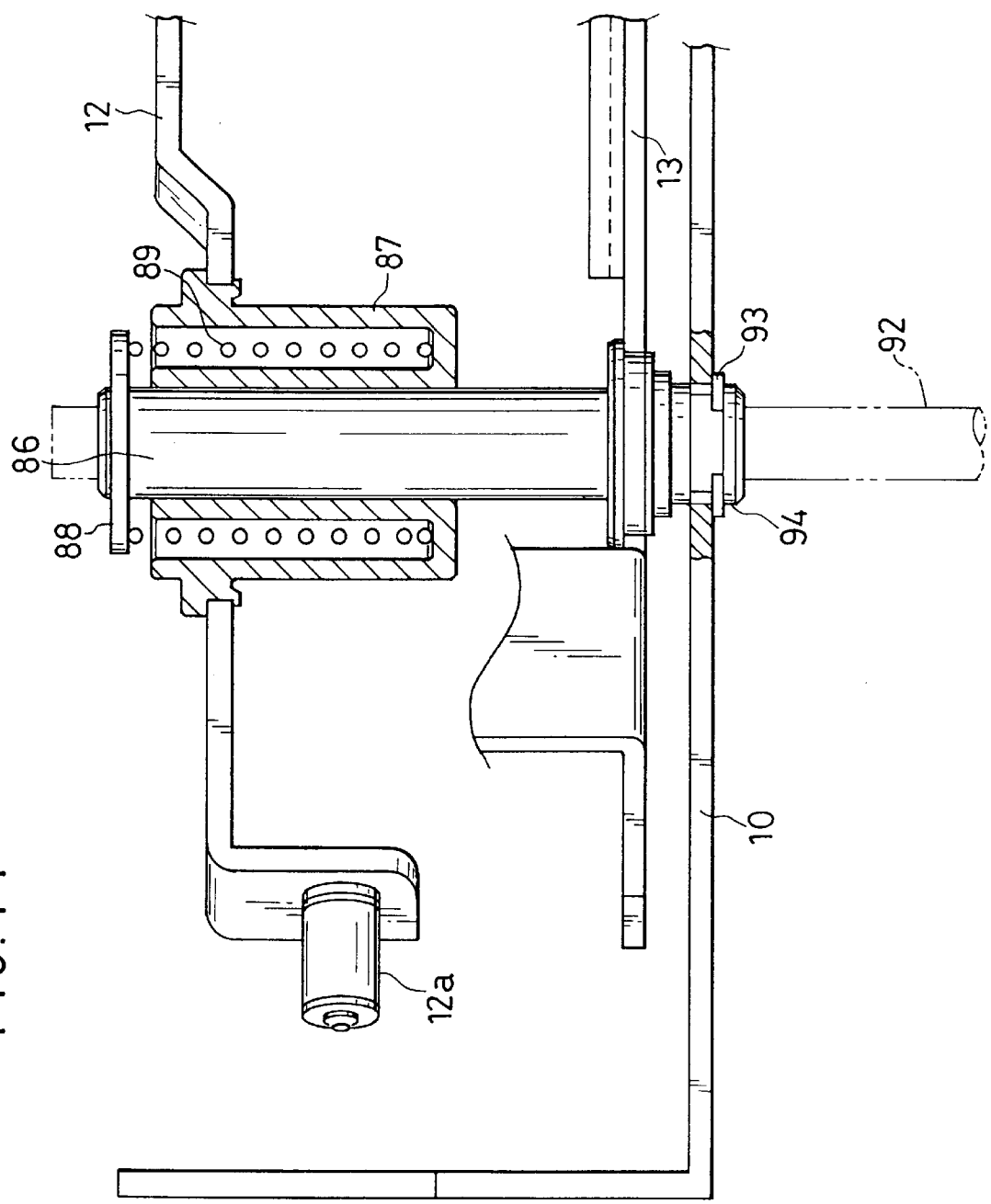
FIG. 14 is a cross sectional view of a main portion of a pinching means of the disc player according to the preferred embodiment of the present invention.

The pinching means 14 for pinching the selected CD by rotating the selected CD to the above and below spaces of selected CD formed by the control means 11 will be described. The base end portions of the lower arm 13 and the upper arm 12 are attached on the left side of the pickup raising/lowering stand 10 so that the lower arm 13 and the upper arm 12 can freely rotate. That is, the structure is as follows. As shown in FIG. 14, the lower arm 13 is fixed in the vicinity of the lower end of a hollow shaft 86, and the lower end of the hollow shaft 86 pierces the pickup raising/lowering stand 10 so that the hollow shaft 86 can freely rotate. For preventing the falling out of the hollow shaft 86, a flat washer 93 and a stop ring 94 are attached to the lower end of the hollow shaft 86. Then, a sleeve 87 made of copper alloy, for example, is fixed to the base end portion of the upper arm 12 by piercing it. The hollow shaft 86 is inserted into the sleeve 87, and thereby the upper arm 12 moves downward in a state in which the upper arm 12 is parallel to the lower arm 13, and then the upper arm 12 and the lower arm 13 pinch the selected CD. The upper end of the hollow shaft 86 is inserted into a flat washer 88, and a stop ring is attached thereto. A pinching spring 89 actuating the upper arm 12 downward is provided between the flat washer 88 and the sleeve 87. Moreover, as shown in FIG. 13, a sliding pin 90 planted on the lower arm 13 is inserted into a hole 91 formed in the upper arm 12 in a state in which the sliding pin 90 can freely slide so that the lower arm 13 and the upper arm 12 do not rotate relatively but rotate synchronously in a body around the hollow shaft 86. A fulcrum 92 planted on the bottom plate 1e is inserted into the hollow shaft 86 for the improvement of the accuracy of positioning between the turntable 97, which will be described later, on the lower arm 13 and the CD when the pinching means 14 rotates.

Figure 15:
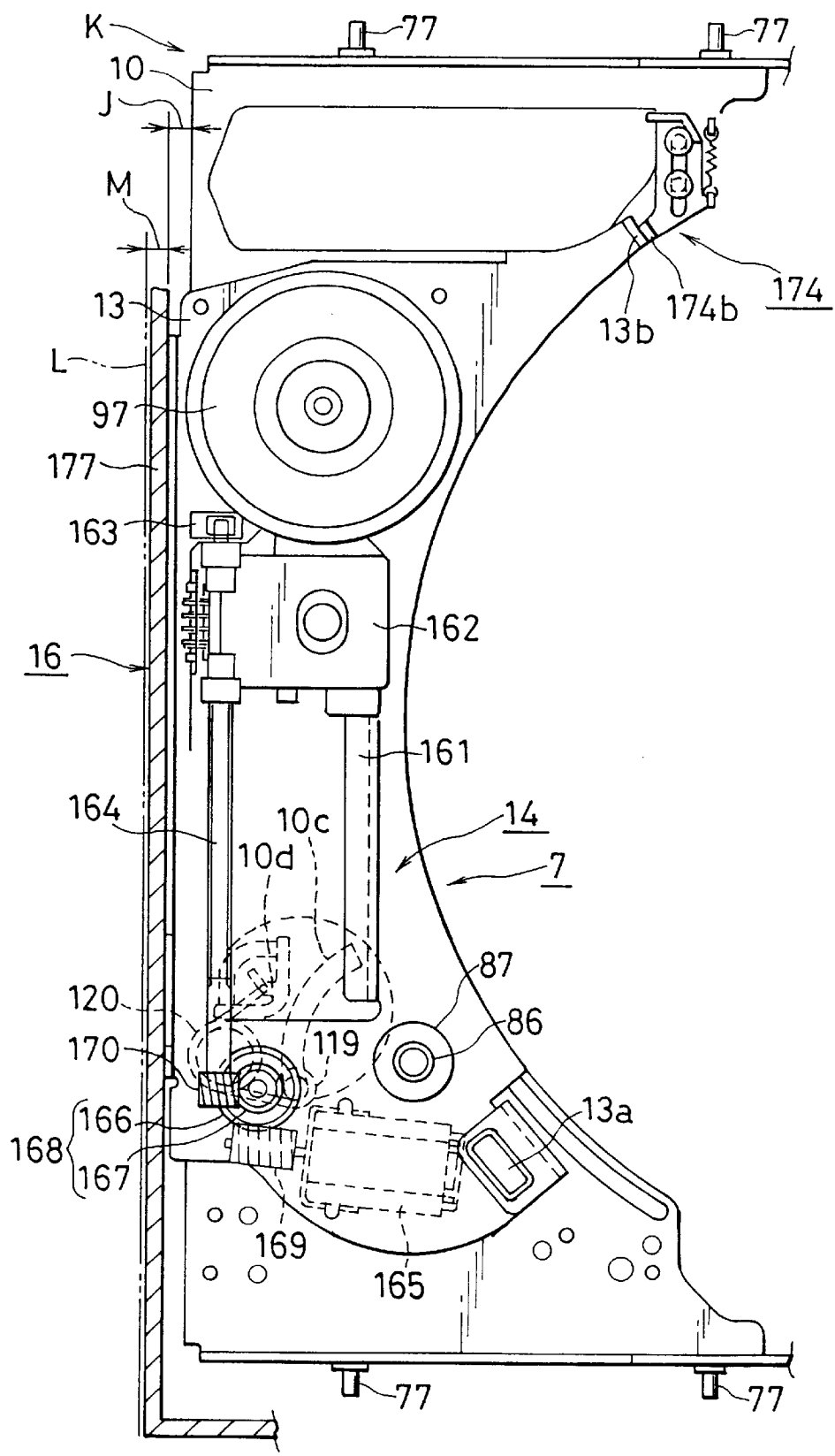
FIG. 15 is a plan view showing a pickup unit of the disc player according to the preferred embodiment of the present invention.

Here, as shown in FIG. 15, the pinching means 14 protrudes from the pickup raising/lowering stand 10 and the frame body 1 to the back side by the length "J". This seems that the fixing position of the pinching means 14 is shifted to the back side, the left direction in the FIGure, by the length "J", but actually the length of the frame body 1 is cut to be small by the length "J". The reason why the frame body 1 is reduced is as follows. Because the disc player is housed in a predetermined space in the in-dash in the cabin, the size of the depth of the disc player is required to be as small as possible. On the other hand, it is necessary to form a gap between the frame body 1 and the inner wall of a case 177 so as to house the frame body 1 in the case 177 in a state in which the frame body 1 is supported so that the frame body 1 can freely shake by means of springs as buffer means in order that vibrations due to the movement of a vehicle at the time of reproducing are not transmitted to the disc player, but no problem is caused at the time of non-reproducing even if the gap is not formed.

Figure 40:
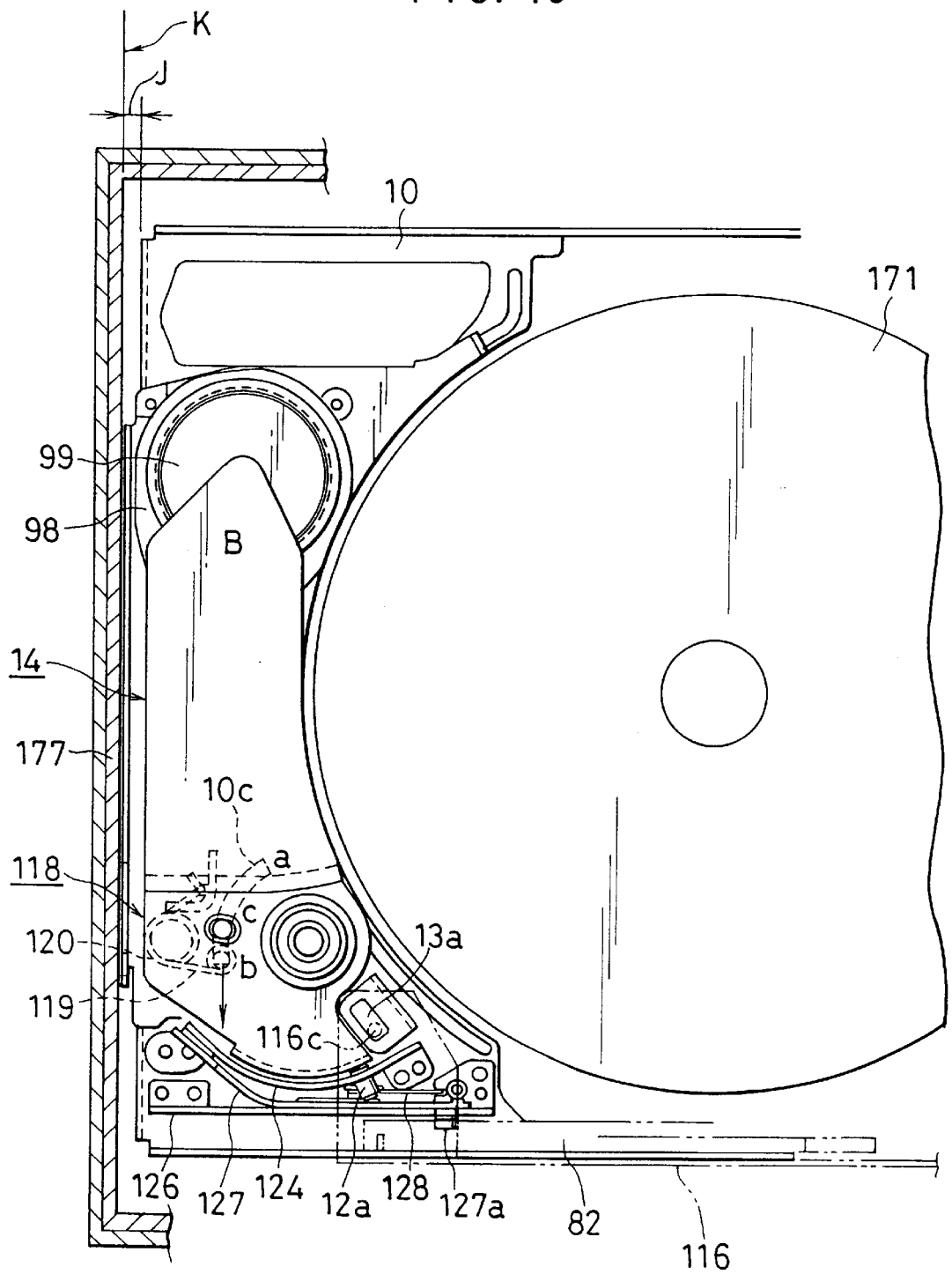
FIG. 40 is an diagrammatic view of the operation of the pinching means in a state in which the pinching means is situated at the standby position thereof, in the disc player according to the preferred embodiment of the present invention.
Figure 41:
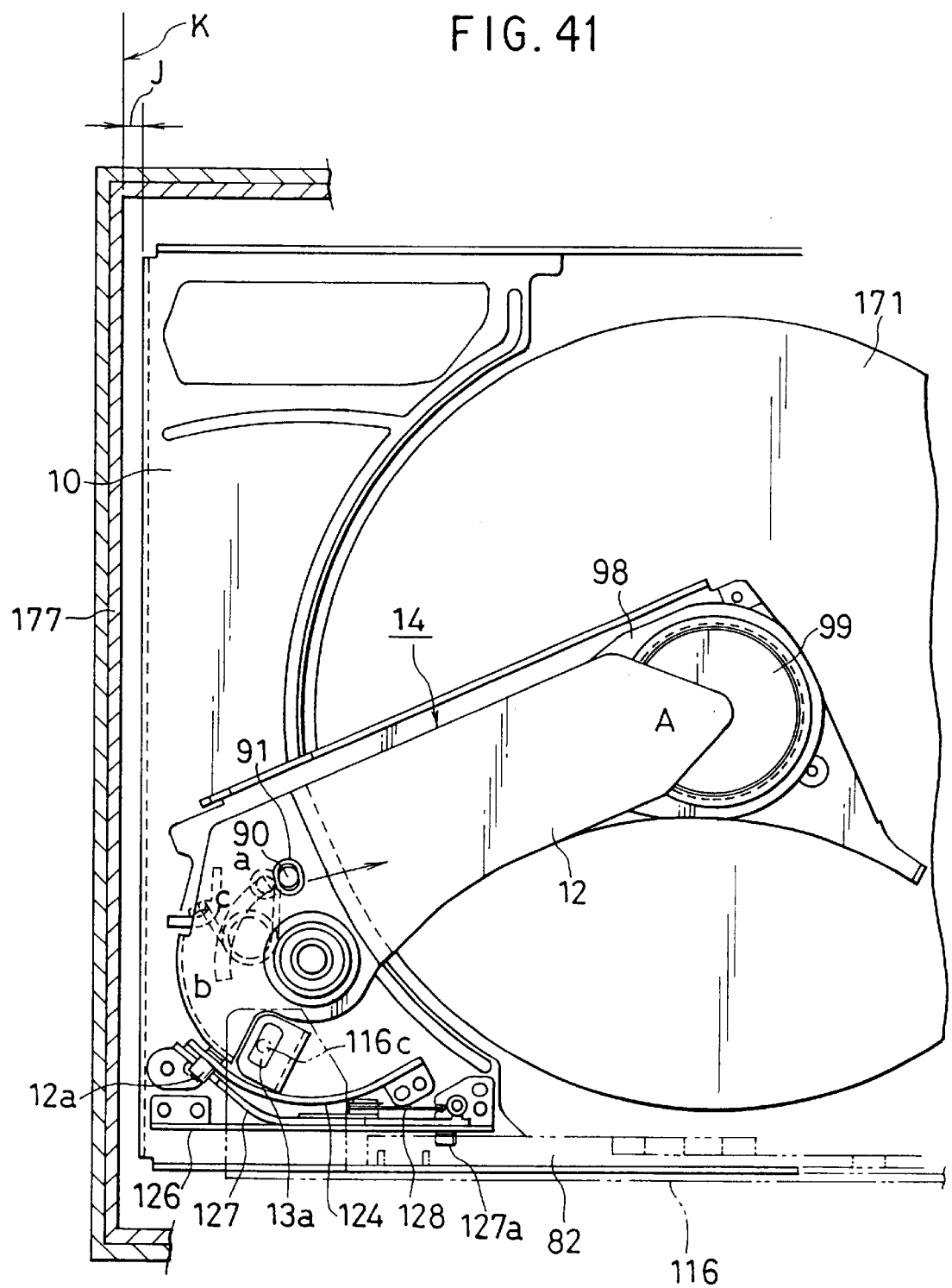
FIG. 41 is an explanatory view of the operation of the pinching means in a state in which the pinching means is situated at a playback position thereof, in the disc player according to the preferred embodiment of the present invention.

Accordingly, the preferred embodiment is structured so that the gap "J" is produced between the inner wall "K" of the case 177 and the frame body 1 at the time of reproducing as shown in FIG. 41 because the pinching means 14 is transferred to a position "A", and so that the inner wall "K" and the frame body 1 (actually only the pinching means 14) touched each other as shown in FIG. 40 at the time of non-reproducing because the pinching means 14 returns to a position "B". That is, in FIG. 15, because the frame body 1 is originally formed up to the position of the inner wall "K" where the pinching means 14 conceals itself without regard to the time of reproducing or the time of non-reproducing, an inner wall "L" has to be formed at a position outer than the position of the inner wall "K" for forming a gap "M". However, because the gap "J" should be formed only at the time of reproducing, the inner wall can be set at the position of the inner wall "K" although the inner wall is originally set at the position of the inner wall "L". Consequently, the case 177 can be reduced by the gap "M", and the occupation space of the in-dash can be reduced in comparison with that of the conventional in-dash.

③ DISC DRIVING MEANS

Figure 44:
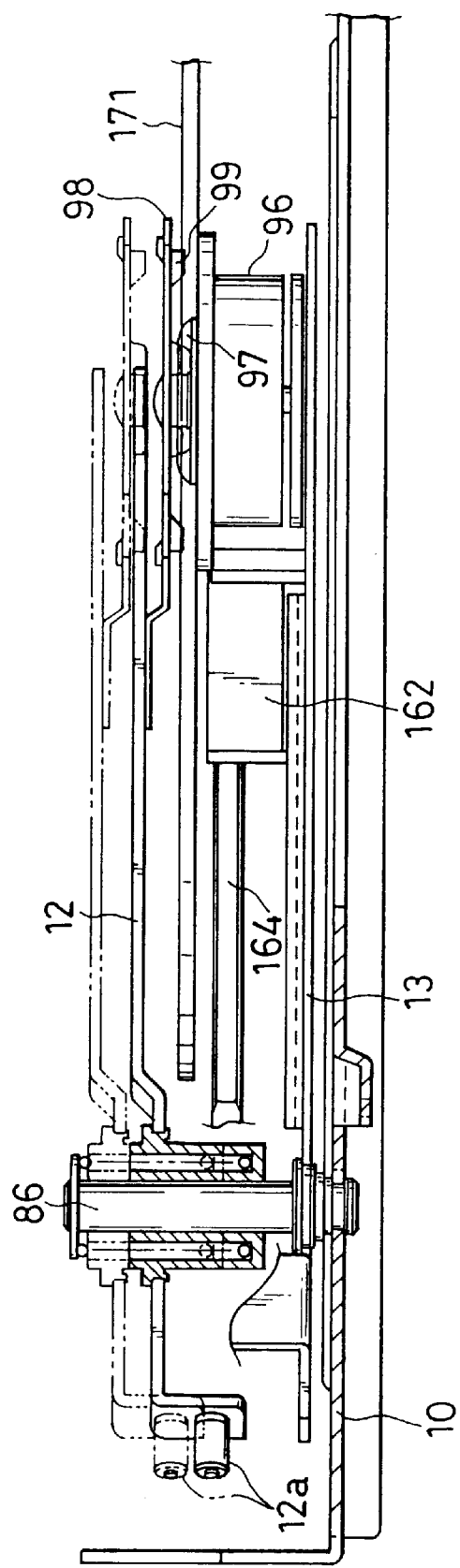
FIG. 44 is diagrammatic view of an operation of the pinching means in a state of pinching a CD after release from the retention state by the regulation means, in the disc player according to the preferred embodiment of the present invention.

The disc driving means 15 is provided on the end upper face of the lower arm 13. That is, as shown in FIG. 13, a spindle motor 96 is attached, and the turntable 97 that fits into the center hole of a CD is attached to the output shaft of the spindle motor 96. On the other hand, as shown in FIG. 44, one end of a supporting plate 98 is fixed in the vicinity of the end of the upper arm 12, and a circular hole is formed at the other end of the supporting plate 98. Then, a chucking plate 99 as a disc holding means that is made of resin, for example, and having a convex portion in a ridge shape along a circle of the under face of a disc is fitted into the hole so that the chucking plate 99 can freely rotate. The prevention of the falling out of the chucking plate 99 is performed by one end of a spring plate, not shown in the figures, the other end of which is fixed to the under face of the upper arm 12. A CD is held by the turntable 97 and the chucking plate 99.

④ PICKUP UNIT

The pickup unit 16 is also mounted on the upper face of the lower arm 13 as shown in FIG. 15. The structure of the pickup unit 16 will be described below. An optical pickup 162 is provided along the length direction of the lower arm 13 so that the optical pickup 162 can freely be transferred on a guide rail 161 formed integrally with the lower arm 13. Then, means for making the optical pickup 162 be transferred reciprocally along the guide rail 161 is provided. A screw shaft 164 is supported on the upper face of the lower arm 13 by a pair of bearing members 163 so that the screw shaft 164 can freely rotate, and the not shown female screw portion of the optical pickup 162 is screwed in the screw shaft 164. The output shaft of a scanning motor 165 fixed in the vicinity of the above-mentioned sleeve 87 is interlocked and connected with the screw shaft 164. That is, a gear 168 formed by the unification of a worm wheel 166 and a screw gear 167 to one body is supported so as to rotate feely, and a worm 169 of the output shaft is engaged with the worm wheel 166. On the other hand, a screw gear 170 attached to the screw shaft 164 is engaged with the screw gear 167.

⑤ ROTATION FORCE SUPPLYING MEANS

Figure 38A:
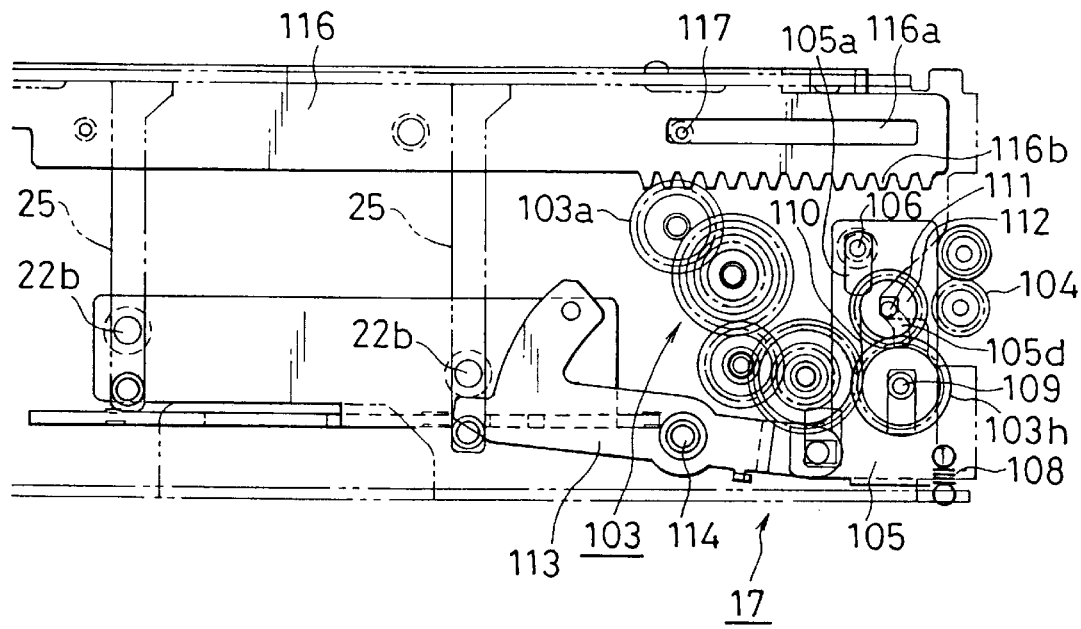
FIG. 38A is a diagrammatic view of the operation of the rotation force supplying means in a state in which the rotation force thereof is not supplied, in the disc player according to the preferred embodiment of the present invention.
Figure 38B:
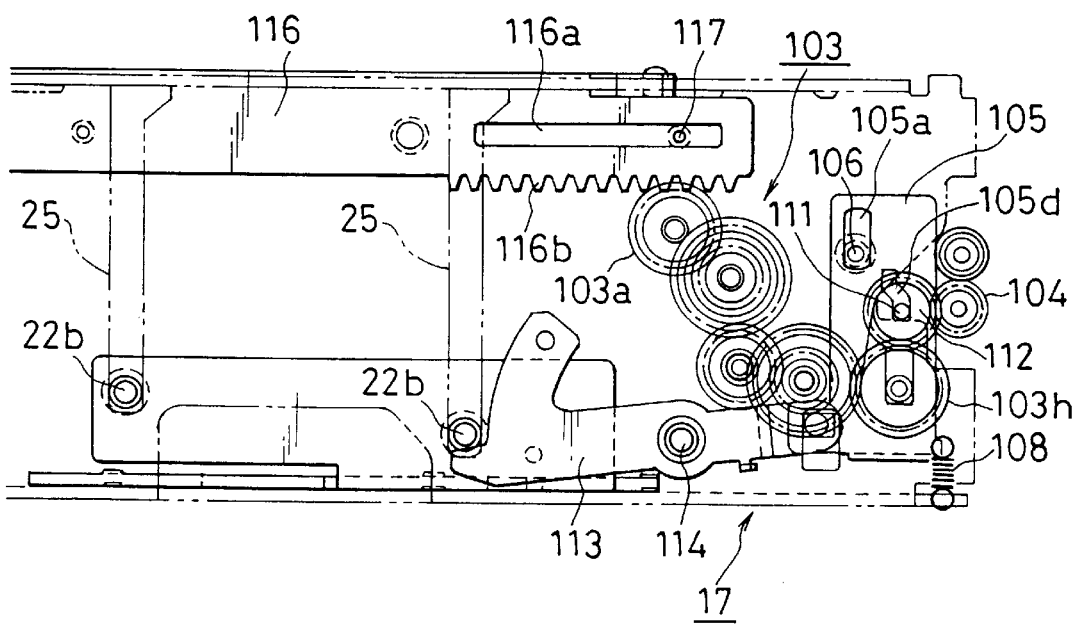
FIG. 38B is a diagrammatic view of an operation of a rotation force supplying means in a state in which the rotation force thereof is supplied, in the disc player according to the preferred embodiment of the present invention.

The structure of the rotation force supplying means 17 for rotating the pinching means 14 by the driving force of the aforesaid transferring motor 46 will be described below. A gear train 103 is provided at the inner portion of the left side plate-1b of the frame body 1 as shown in FIG. 8. In other words, the gear train 103 is composed of gears 103a to 103h. On the other hand, a gear 104 is also fixed to the left end of the aforesaid driving shaft 30. In the inner portion of the left side plate 1b, a plate 105 is provided so that it can be freely transferred to the vertical direction. That is, in the upper portion of the plate 105, a guide hole 105a elongated in the vertical direction is formed, and a guide pin 106 (refer to FIG. 38A and FIG. 38B) being inserted into the guide hole 105a is fixed to the left side plate 1b, and further a stop ring is attached to the guide pin 106. Spring hooking portions 105b, 107 are formed in the lower portion of the plate 105 and the bottom plate 1e of the frame body 1, respectively, and a return spring 108 actuating the plate 105 downward is provided interposed between them. An escape hole 105c into which a shaft 109, which is fixed to the side plate 1b, of the aforesaid gear 103h is inserted is formed on the plate 105, and the base end portion of a lever 110 is attached to the shaft 109 so that the lever 110 can freely rotate. A transfer shaft 111 piercing the lever 110 is fixed to the end of the lever 110, and a gear 112 being engaged with the gear 103h is attached to the transfer shaft 111 so that the gear 112 can freely rotate. A cam hole 105d is formed above the escape hole 105c on the plate 105, and an end of the piercing transfer shaft 111 is inserted into the cam hole 105d. In other words, when the plate 105 moves upward, the cam hole 105d moves upward. And then, the transfer shaft 111 inserted into the cam hole 105d is transferred to the front side. Consequently, the gear 112 attached to the transfer shaft 111 is also engaged to the gear 104 of the driving shaft 30. For moving the plate 105 upward, the middle portion of a lever 113 is supported in the inside of the left side plate 1b by a pin 114 so that the lever 113 can freely rotate, and one end of the lever 113 is combined in the lower portion of the plate 105 by a pin 115 so that the lever 113 can freely rotate. The other end of the lever 113 is situated in the lower portion of one, which is formed on the front side, of the pair of vertical slits 25, into which the pins 22b of the disc raising/lowering stand 22 are inserted, on the left side plate 1b. That is, when the disc raising/lowering stand 22 comes to the lowermost position to make the disc player enter into the reproducing mode thereof, the pin 22b, which is inserted into the vertical slit 25, pushes the other end of the lever 113 downward, and the gear 112 is engaged with the gear 104.

Next, the gear 103a at the uppermost position of the gear train 103 and the lower arm 13 of the pinching means 14 are interlocked and connected with each other as follows. As shown in FIG. 2, a slide bar 116 composed of a vertical portion elongated in the back-and-forth direction and a horizontal portion formed on the back side of the vertical portion integrated to the vertical portion is provided. A pair of guide holes 116a is formed in the vicinity of the both ends of the vertical portion of the side bar 116, and a pair of guide pins 117 inserted into the pair of guide holes 116a severally are fixed in the inner portion of the left side plate 1b and a stop ring is attached to the respective guide pins 117 as shown in FIG. 7. A rack 116b is formed in the lower portion on the front side of the slide bar 116 that can freely slide in the back-and-forth direction in such a way and the rack 116b is engaged with the aforesaid gear 103a. On the other hand, the upper end of an engage pin 116c protruding downward is fixed to the end of the horizontal portion on the back side of the slide bar 116. The engage pin 116c is formed integrally with the base end portion of the aforesaid lower arm 13 and is inserted with play into the elongated hole 13a in the horizontal portion extended up to the height of the upper arm 12 as shown in FIG. 13. The elongated hole 13a is formed along a straight line that passes through the center of the shaft of the sleeve 87 and extends in the radius direction of the sleeve 87 and further crosses with the outer periphery of the sleeve 87 as shown in FIG. 15.

⑥ ARM POSITIONING MEANS

Figure 17A:
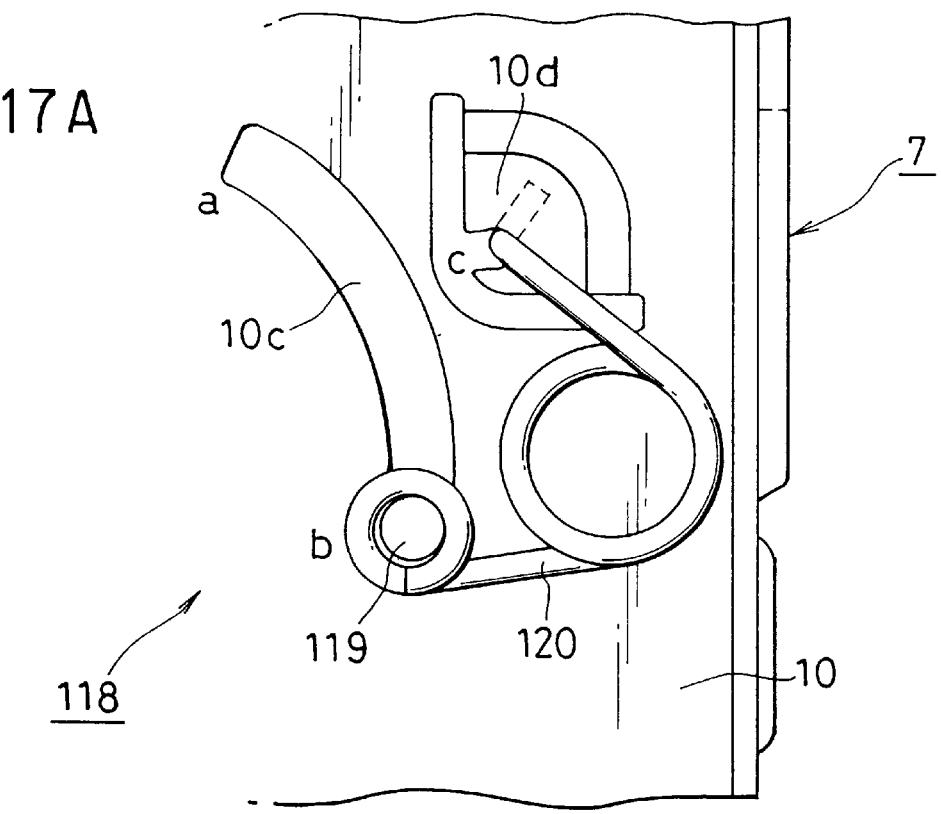
FIG. 17A is a rear side elevation of the pinching means that is positioned at a standby position of the disc player according to the preferred embodiment of the present invention.
Figure 17B:
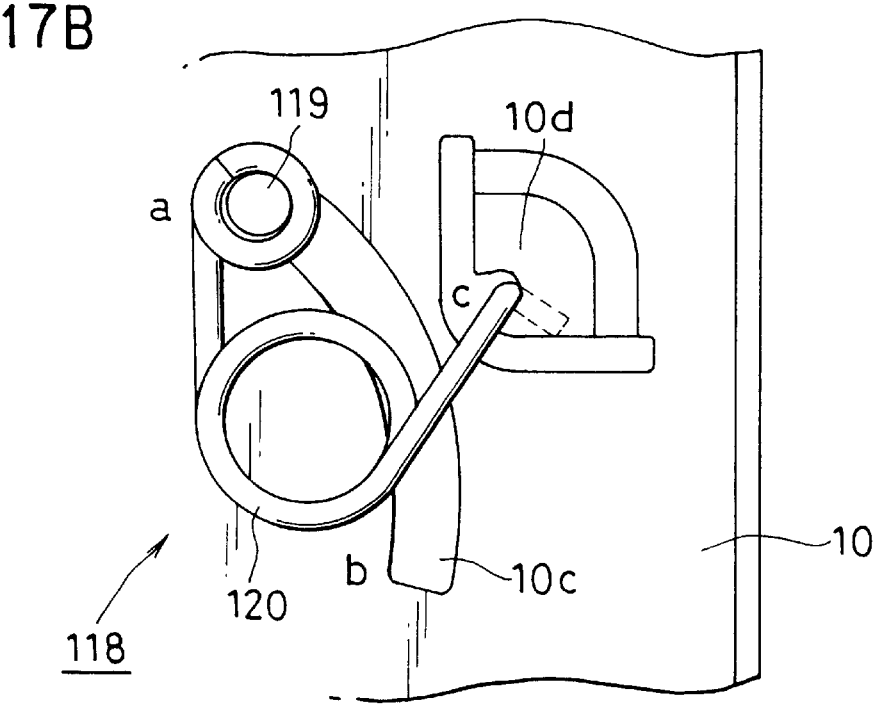
FIG. 17B is a rear side elevation of the pinching means that is positioned at a reproducing position of the disc player according to the preferred embodiment of the present invention.
Figure 18:
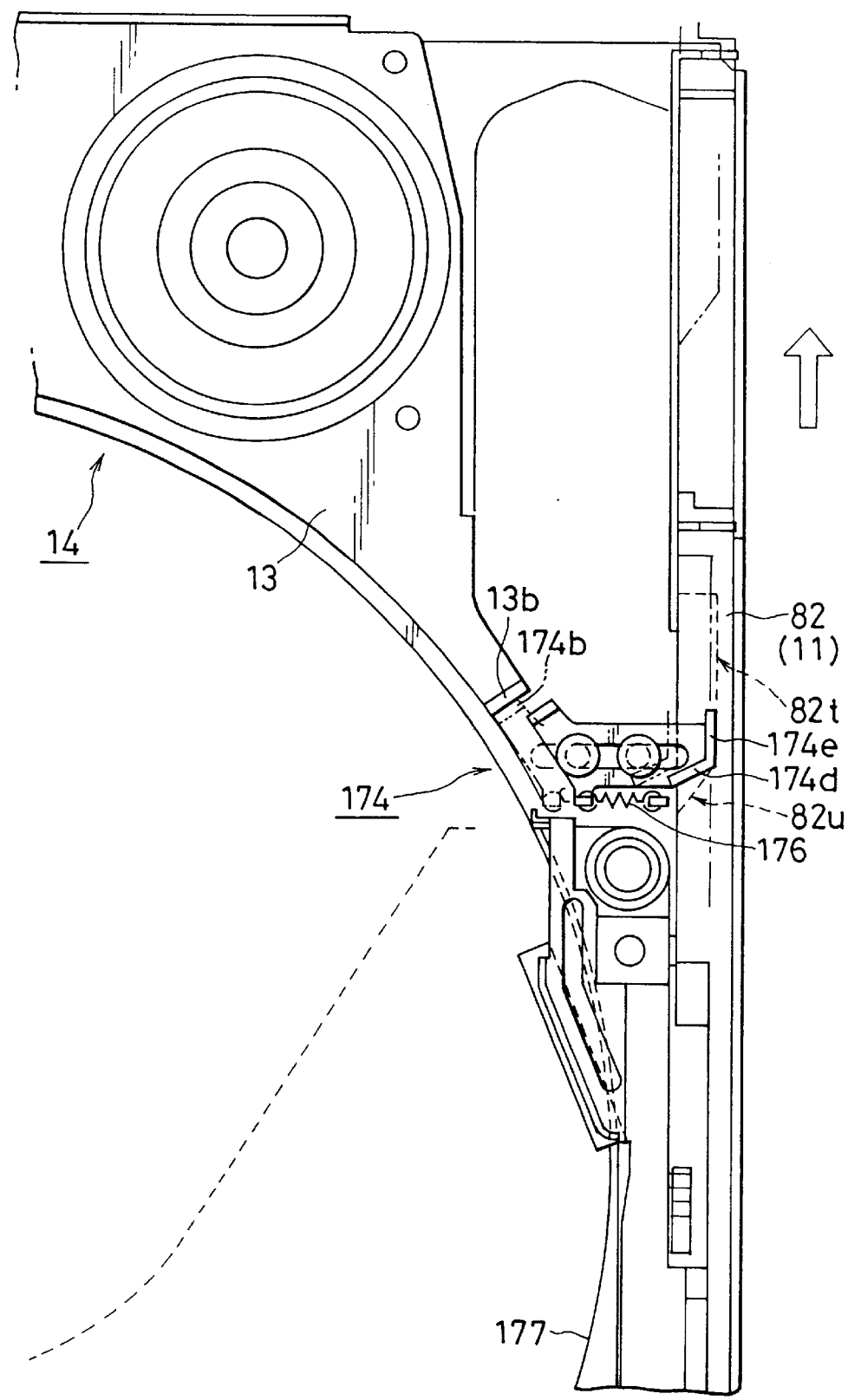
FIG. 18 is a plan view showing the vicinity of arm locking means of the disc player according to the preferred embodiment of the present invention.

A disc player has two operation modes, one of which is an insertion/discharge mode for inserting or discharging a CD into or out of the disc housing section 3, the other of which is a reproducing mode for reproducing a CD. In the former case, the pinching means 14 is situated at the position "B" as shown in FIG. 40. In the latter case, the pinching means 14 is situated at the position "A" as shown in FIG. 41. The rotation of the pinching means 14 between the position "B" and the position "A" is performed by means of the rotation force supplying means 17 as described above. However, because it is necessary to perform the positioning between a selected CD and the turntable 97 on the lower arm 13 with a high degree of accuracy, a positioning means 118 as shown in FIG. 17A and FIG. 17B is provided.

The structure of the positioning means 118 will be described below. As shown in FIG. 15, FIG. 17A and FIG. 17B, the upper end of a positioning pin 119 protruding downward is fixed in the vicinity of the hollow shaft 86 of the lower arm 13. On the other hand, an arc hole 10c is formed in the portion of the pickup raising/lowering stand 10 corresponding to the extent of the transferring of the positioning pin 119 when the pinching means 14 rotates, and the positioning pin 119 is inserted into the arc hole 10c with play. A spring hooking portion 10d is formed on the pickup raising/lowering stand 10 so that the spring hooking portion 10d protrudes downward, and both the ends of a toggle spring 120 are hooked between the hooking portion 10d and the positioning pin 119. If it is supposed that the positions occupied by the positioning pin 119 when the pinching means 14 occupies the positions "B", "A" are positions "b", "a", respectively, a position "c" being the middle point of the positions "b" and "a" is an inflection point where the direction of the movement of the positioning pin 119 changes, and the aforesaid spring hooking portion 10d is disposed at the position corresponding to the position "c".

⑦ ARM LOCKING MEANS

It is apprehended in the related art that the pinching means 14 constituting the reproducing means 7 slips out of the position "B" in FIG. 13 in its housed state due to vibrations of a moving vehicle at the time of non-reproducing. Accordingly, an arm locking means for locking the pinching means 14 at the position "B" is provided in the preferred embodiments of the present invention. The arm locking means is structured as follows. As shown in FIG. 13, the end of the lower arm 13 is elongated throughout the notched portion 10a having a shape of an arc of pickup raising/lowering stand 10, and an engaging portion 13b standing upward is formed at the tip thereof.

Figure 19:
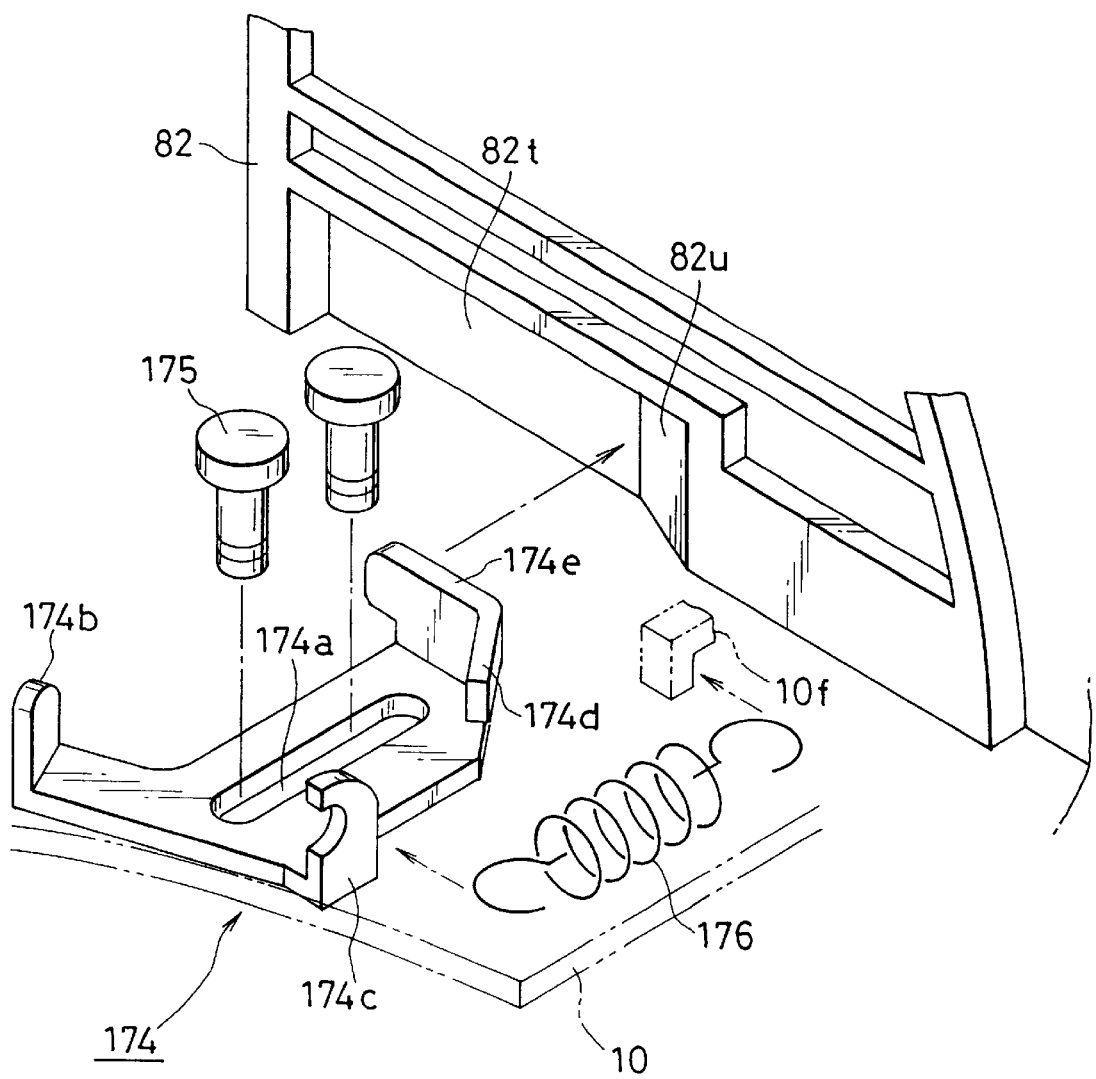
FIG. 19 is an exploded perspective view showing an arm locking means of the disc player according to the preferred embodiment of the present invention.

On the other hand, a locking member 174 for locking the lower arm 13 by touching the engaging portion 13b is provided. As shown in FIG. 19, a pair of pins having heads 175 is inserted into an elongated hole 174a formed in the locking member 174 to be combined with the pickup raising/lowering stand 10, and thereby the locking member 174 is provided so that it can freely slide in the left and right direction that is perpendicular to the sliding direction of the separation cams 82. A locking portion 174b for touching the engaging portion 13b and a spring hooking portion 174c are formed on the locking member 174, and a spring 176 as returning means for actuating the locking member 174 to the direction in which the locking portion 174b goes away from the engaging portion 13b is provided between the spring hooking portion 174c and a spring hooking portion 10f on the pickup raising/lowering stand 10. Moreover, a mechanism for pressing out the locking portion 174b to the engaging portion 13b in opposition to the actuating force of the spring 176 is provided. As a driving means for driving the locking member 174, one of the separation cams 82 as the control means 11 is used. A tapered portion 174d and a sliding portion 174e standing up in "<" form are formed in the portion of the locking member 174 opposed to the separation cam 82. On the other hand, a concave portion 82t into which the tapered portion 174d and the sliding portion 174e enter is formed in the right side separation cam 82 of the pair of separation cams 82 in FIG. 2, and a tapered face 82u is formed on the inner wall of the concave portion 82t.

(8) CD POSITIONING MEANS

Figure 16:
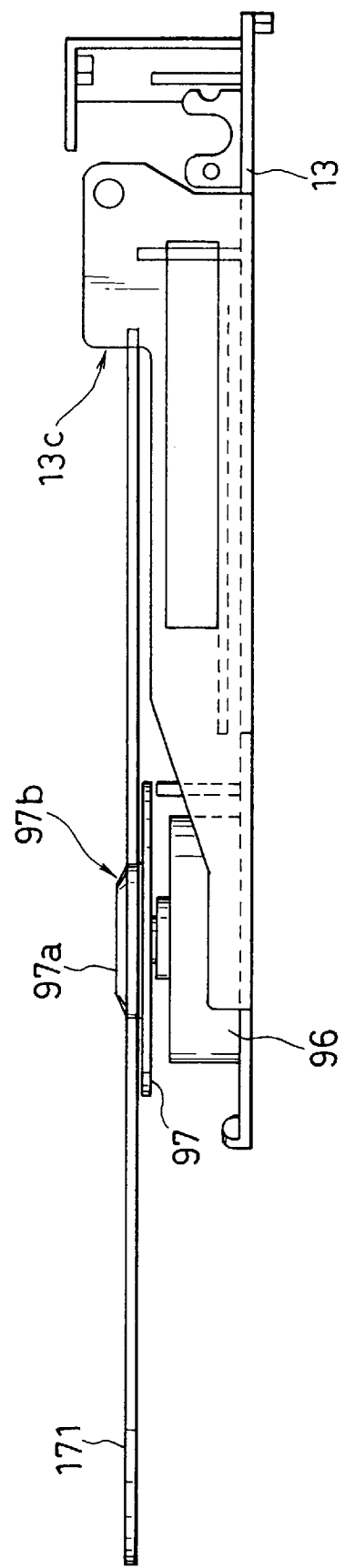
FIG. 16 is an explanatory view of a CD positioning section provided to a lower arm of the disc player according to the preferred embodiment of the present invention.

The positioning of a CD to the frame body 1 is performed by means of the positioning pins shown in FIG. 11a that are arranged in four positions in the direction of the circumference as described above. On the other hand, for the positioning of the CD to the turntable 97, as shown in FIG. 13, a CD positioning section 13c as a CD positioning means is formed at a standing portion on the base end portion side of the lower arm 13 to which the turntable 97 is attached so that the CD positioning section 13c becomes substantially perpendicular to the horizontal plane of the pickup raising/lowering stand 10. As shown in FIG. 16, the position of the CD positioning section 13c is set so that the CD 171 is positioned as the CD 171 descends along an inclined plane 97b of a truncated cone portion 97a formed on the turntable 97, and so that a small gap is formed between the CD 171 and the CD positioning section 13c when the CD 171 is actually installed. A radius in the shape of an arc is formed on the outer surface of the CD positioning section 13 for preventing the damage of the CD.

(9) REGULATING MEANS

The upper arm 12 of the aforesaid pinching means 14 is actuated downward by the aforesaid pinching spring 89, and as shown in FIG. 13, the regulation means for setting a time when the upper arm 12 moves downward by means of the actuating force of the pinching spring 89 is provided. In other words, the regulation means is structured as follows.

Figure 42A:
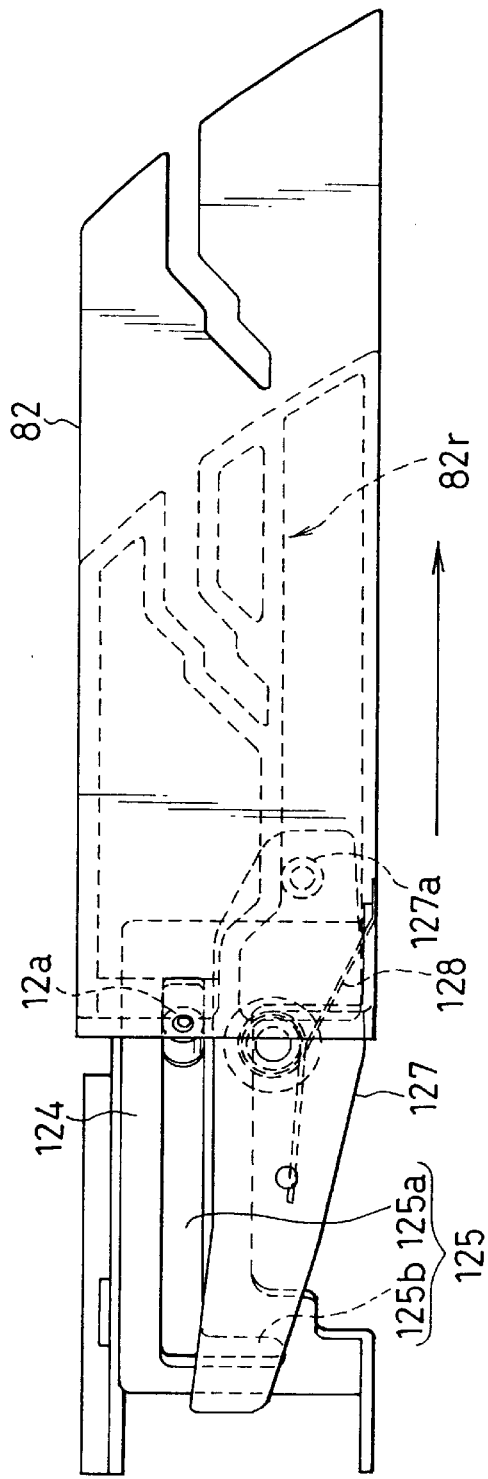
FIG. 42A and FIG. 42B are diagrammatic views of an operation illustrating the regulation means of the disc player when the pinching means is situated at the standby position, in the disc player according to the preferred embodiment of the present invention.

A cylindrical plate 124 is mounted between the aforesaid pinching means 14 and one of the separation cams 82 on the upper face of the pickup raising/lowering stand 10. The cylindrical plate 124 forms a partial cylinder that is a portion of a cylinder around the sleeve 87 as its center. As shown in FIG. 42A, FIG. 43A, FIG. 43B, a "L" shaped guide hole 125a having an horizontal portion 125a elongated in the peripheral direction and a vertical portion 125b elongated in the shaft direction is formed in the cylindrical plate 124. On the other hand, a guide pin 12a protruding to the outside in the radius direction of the sleeve 87 as the center of the radius is fixed in the base end portion of the upper arm 12, and the guide pin 12a is inserted into the guide hole 125. Consequently, because the guide pin 12a is positioned in the horizontal portion 125a of the guide hole 125 during the period of time from the pinching means 14 occupies the position "B" being the standby position to just before the pinching means 14 occupies the position "A" as the pinching means moves from the position "B" to the position "A" in FIG. 13, the upper arm 12 does not descend in spite of the imposition of the actuating force by the pinching spring 89 and the pinching means 14 holds the state of "open". On the other hand, when the pinching means 14 has reached the position "A", the guide pin 12a positions at the vertical portion 125b. Consequently, the guide pin 12a moves downward by the actuating force of the pinching spring 89, and the guide pin 12a also descends up to the lower end of the vertical portion 125b.

In order to making the pinching means 14 not begin its pinching operation immediately after the pinching means 14 has rotated to the position "A" in FIG. 13 and the guide pin 12a has rotated up to the vertical portion 125b of the guide hole 125 until an instruction is given, a first regulation means for regulating the descending of the guide pin 12a temporarily and a second regulation means for releasing the regulation and making the pinching means 14 nip a selected CD when the aforesaid separation cams 82 move forward and the selected CD and a selected tray 2 move downward to be placed on the aforesaid turntable 97 after the regulation was begun are provided. In other words, the regulation means is structured as follows. A bearing plate 126 is planted in parallel to the separation cams 82 between the aforesaid cylindrical plate 124 and one of the aforesaid separation cams 82 on the upper face of the aforesaid pickup raising/lowering stand 10 as shown in FIG. 13 and FIG. 40. The middle portion of a restriction lever 127 is supported on the inside of the bearing plate 126 so that the restriction lever 127 can freely rotate around a rotation shaft 129 as shown in FIG. 13. A pin 127a protruding to the outside is fixed on the front side of the restriction lever 127, and the back side of the restriction lever 127 is bent toward the inside to be opposed to the vertical portion 125b of the guide hole 125. Then, a spring 128 actuating the back side of the restriction lever 127 downward is provided as shown in FIG. 40. On the other hand, the pin 127a on the front side of the restriction lever 127 is inserted with play into a cam groove 82r formed at the lower portion of the inner portion of the separation cam 82 as shown in FIG. 42A. The cam groove 82r is formed only on the left side separation cam 82 of the pair of separation cams 82 shown in FIG. 2. An escape portion is formed in the upper portion on the back side of the cam groove 82r, and the escape portion is set so that the pin 127a enters in a state capable of escaping when the separation cam 82 has transferred to the front side and the pins 2c, 2d of a selected tray 2 enter into the middle stage fitting portions 82k, and so that the restriction lever 127 rotates by the spring 128 and the upper arm 12 moves downward by the actuating force of the pinching spring 89.

(G) PUSHING-OUT MEANS

Figure 28A:
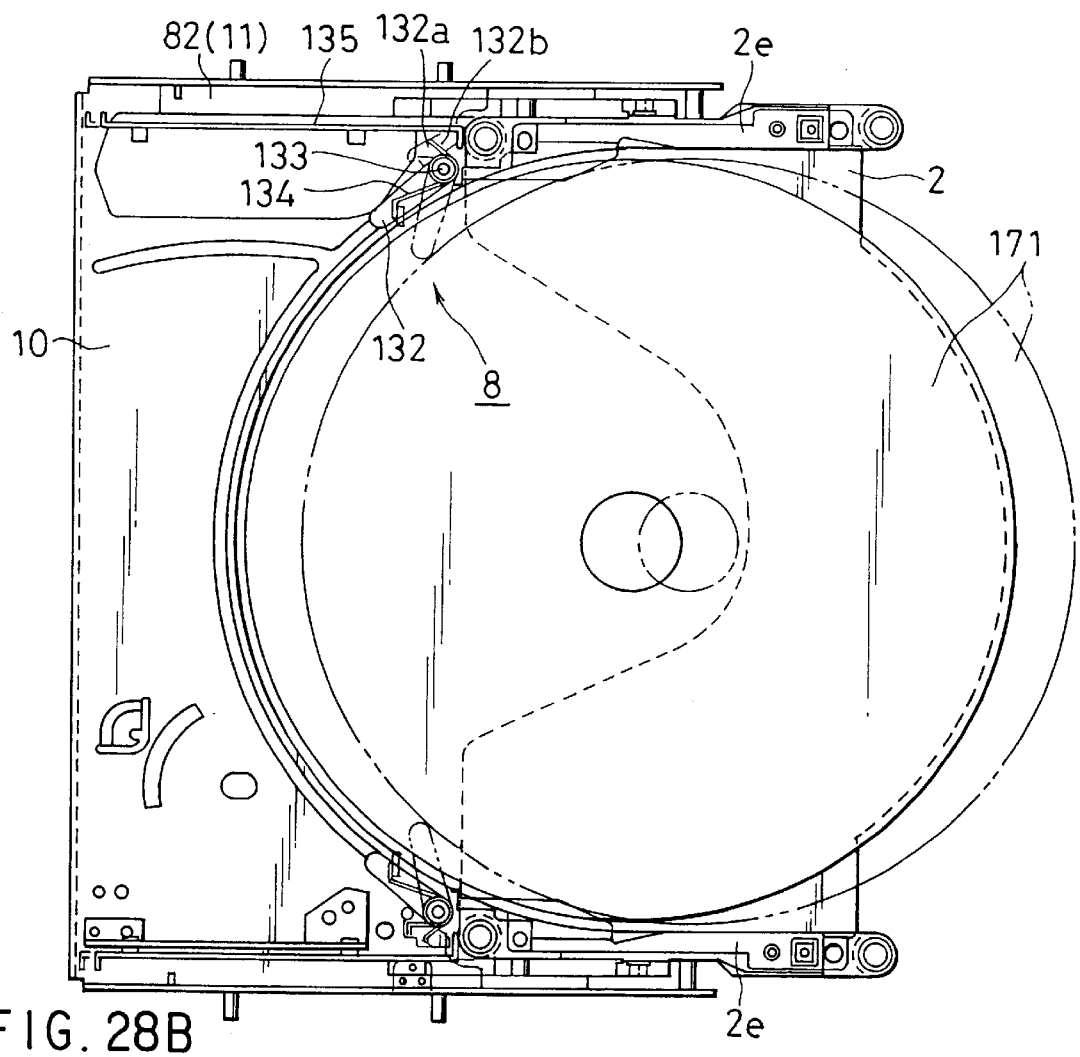
FIG. 28A is a plan view of a pushing-out means of the disc player when a CD is discharged, according to the preferred embodiment of the present invention.

A pair of pushing-out means 8 is provided on both sides of the inside of the frame body 1 as shown in FIG. 28a. The reason why the pushing-out means 8 are provided by one pair is as follows. At first, if there are other CD's up and beneath a CD to be pushed out, a lever having a low height in the up-and-down direction must be used for pushing out the CD to be pushed out without touching the other CD's. Next, the CD is positioned in the up-and-down direction by being actuated to the tray 2 by the pair of plate springs 2e. However, if some small outer force is operated on the CD, the CD inclines against the actuating force of the plate springs 2e. Then, it is apprehended that the pushing-out means in the case where it is single does not hit the CD. Accordingly, the pushing-out means 8 are provided as one pair for securely hitting the CD.

Because the pair of pushing-out means 8 has severally the same structure, only one of them will be described. As shown in FIG. 1 and FIG. 28, abusing-out lever 132 for pushing out a CD by rotating is attached to a fixed shaft 133 protruding downward from the ceiling plate id of the frame body 1 so that the pushing-out lever 132 can freely rotate about the fixed shaft 133. The height of the pushing-out lever 132 is set at the height of the opening between the aforesaid rollers 35, 36, i.e., the insertion/discharge height position. Then, the both edges of a return spring 134 as actuating means provided so as to enclose the fixed shaft 133 are hooked between a spring hooking portion 132a formed on the pushing-out lever 132 and a spring hooking portion formed on the ceiling plate 1d.

On the other hand, the pushing-out lever 132 is structured so that the separation cams 82 are transferred to the back side that is the opposite direction of the direction of the operation of the formation of spaces by the transferring of the separation cams 82 to the front side, which operation has been described above, and thereby the pushing-out lever 132 is rotated. That is, the structure is as follows. As shown in FIG. 13, a plate 135 is provided at the outside of the above-mentioned bearing plate 126 so that the plate 135 can freely slide in the back-and-forth direction by a fixed amount. In other words, a pair of guide holes 126a is formed on the bearing plate 126, and, on the other hand, guide pins 135a inserted into the respective guide holes 126a are fixed on the plate 135. The end on the front side of the plate 135 is bent to the inside to make it possible to be engaged with a press portion 132b formed integrated to the pushing-out lever 132, and on the other hand, the end on the back side of the plate 135 is bent to the outside to protrude to the rear of the separation cam 82.

(H) OPERATION MEANS

Finally, the operation means 9 will be described as follows. The operation means 9 makes it possible to insert and discharge the CD on the tray 2 at each stage by raising and lowering the disc raising/lowering stand 22 in the insertion/discharge mode, and the operation means 9 opens the aforesaid opening and shutting means 6 and makes the pushing-out means 8 operate. The operation means 9 selects a selected CD by raising and lowering the pickup raising/lowering stand 10 in a state in which the disc raising/lowering stand 22 is held at the lowermost position in the reproducing mode, and the operation means 9 makes the control means 11 operates and makes the regulation means 18 operate.

As shown in FIG. 2, an inner slider 139 and an outer slider 140 are provided on the outside of each of the side plates 1b, 1c on both sides of the frame body 1 so that the inner sliders 139 and the outer sliders 140 can freely slide. Because the sliders 139, 140 are symmetrical, only ones of one side shown in FIG. 20A to FIG. 20c will be described. Guide holes 139a, 140a are formed upward and downward in the inner slider 139 and the outer slider 140, respectively. Guide pins 158, 159 fixed to the side plates 1b, 1c are inserted into both of the guide holes 139a and the guide holes 140a, and stop rings are attached to the guide pins 158, 159. A pair of terraced slits 141 for raising and lowering the pair of pins 77 of the pickup raising/lowering stand 10, which protrudes from the vertical slits 78, at six steps are formed on the back side of the inner slider 139. On the front side of the inner slider 139, a pair of terraced slits 142 for raising and lowering the pair of pins 22b of the disc raising/lowering stand 22, which protrude from the vertical slits 25, at six steps are formed, and floor slits 143 for holding the disc raising/lowering stand 22 at the lowermost position and raising and lowering only the pickup raising/lowering stand 10 in the reproducing mode are successively formed under the respective terraced slits 142. On the other hand, only the slits into which the pair of pins 22b of the disc raising/lowering stand 22, which are long pins, enter are formed in the outer slider 140. That is, a pair of quadrilateral slits 144 for the insertion/discharge mode, which are for raising and lowering the pair of pins 22b in the terraced slits 142, a pair of horizontal line slits 145 for the reproducing mode, which are for holding the pins 22b at the lowermost position in the floor slits 143, and switching slits 146 inclining about 45° for switching the positions of the pair of pins 22b between the pair of terraced slits 142 and the floor slits 143 by raising and lowering the pins 22b in conformity with the tapered surfaces 146a, 146b by sliding the outer slider 140 into either direction are formed so as to communicate with each other. Because, if both of the positions in the up-and-down direction of the slits 145 for the reproducing mode are made to be equal, both the slits 145 overlap each other to communicate with each other, the heights of the slits 145 for the reproducing mode, the slits 144 for the insertion/discharge mode, the floor slits 143, the terraced slits 142, and the pins 22b to be inserted into the aforesaid slits differ from each other.

The upper portion of the back side of the outer slider 140 is bent at right angles to the inside to form a projection portion 140b. For making it possible that the projection portion 140b is transferred with the outer slider 140, an escape notch 139b and an escape slit 147 are formed on the back side of the inner slider 139 and the side plate 1b, respectively. In order that the separation cams 82 can be slid integrally with the outer sliders 140 regardless of the height position of the separation cams 82 moving upward and downward along with the pickup raising/lowering stand 10, as shown in FIG. 2, an engage groove 82s is formed along the vertical direction on the back side of each of the separation cams 82, and the projection portions 140b are fit into the engage grooves 82s so that the projection portions 140b can freely slide in the direction limited by the groove. Moreover, on the front side of the outer slider 140 on the left side, an engaging portion 140c is formed by being bent to under the bottom plate 1e of the frame body 1. The engaging portion 140c presses the aforesaid press portion 70c to the back side when the outer slider 140 slides to the back side, and the engaging portion 140c opens the shutter 64 in opposition to the actuating force of the return spring 69.

Next, a driving mechanism for making the inner sliders 139 and outer sliders 140 on both of the right side and the left side synchronize to slide at a same time will be described. As shown in FIG. 2 and FIG. 8, two linking shafts 148, 149 are supported by two pairs of bearings on the back side under the bottom plate 1e of the frame body 1 so that the linking shafts 148, 149 can freely rotate. Pinions 150, 151 are fixed to the both ends of the respective linking shafts 148, 149, and these pinions 150, 151 are engaged with racks 139c, 140d formed in the lower portions on the back side of the inner sliders 139 and the outer sliders 140, respectively. Gears 152, 153 are fixed to the linking shafts 148, 149, respectively. Operation motors 154, 155 are respectively interlocked and connected with the gears 152, 153. In other words, the structure is as follows. The operation motors 155, 154 are attached at the upper and the lower positions in the inside of the aforesaid bearing plate 126 disposed on the right side on the back side in the frame body 1. The output shafts of the motors 155, 154 are interlocked and connected with the gears 152, 153 through two sets of speed reduction means 156, 157, respectively.

Next, the operation of the aforesaid disc player will be described.

(I) A WHOLE CONFIGURATION OF OPERATION

An operation of the disc player is composed of three steps of operation: the insertion of a CD to the disc housing section 3, the discharge of a CD from the disc housing section 3, and the reproducing of a CD by selecting and reproducing one sheet of CD among the CD's stocked in the disc housing section 3.

(J) INSERTION OF A CD

Figure 21:
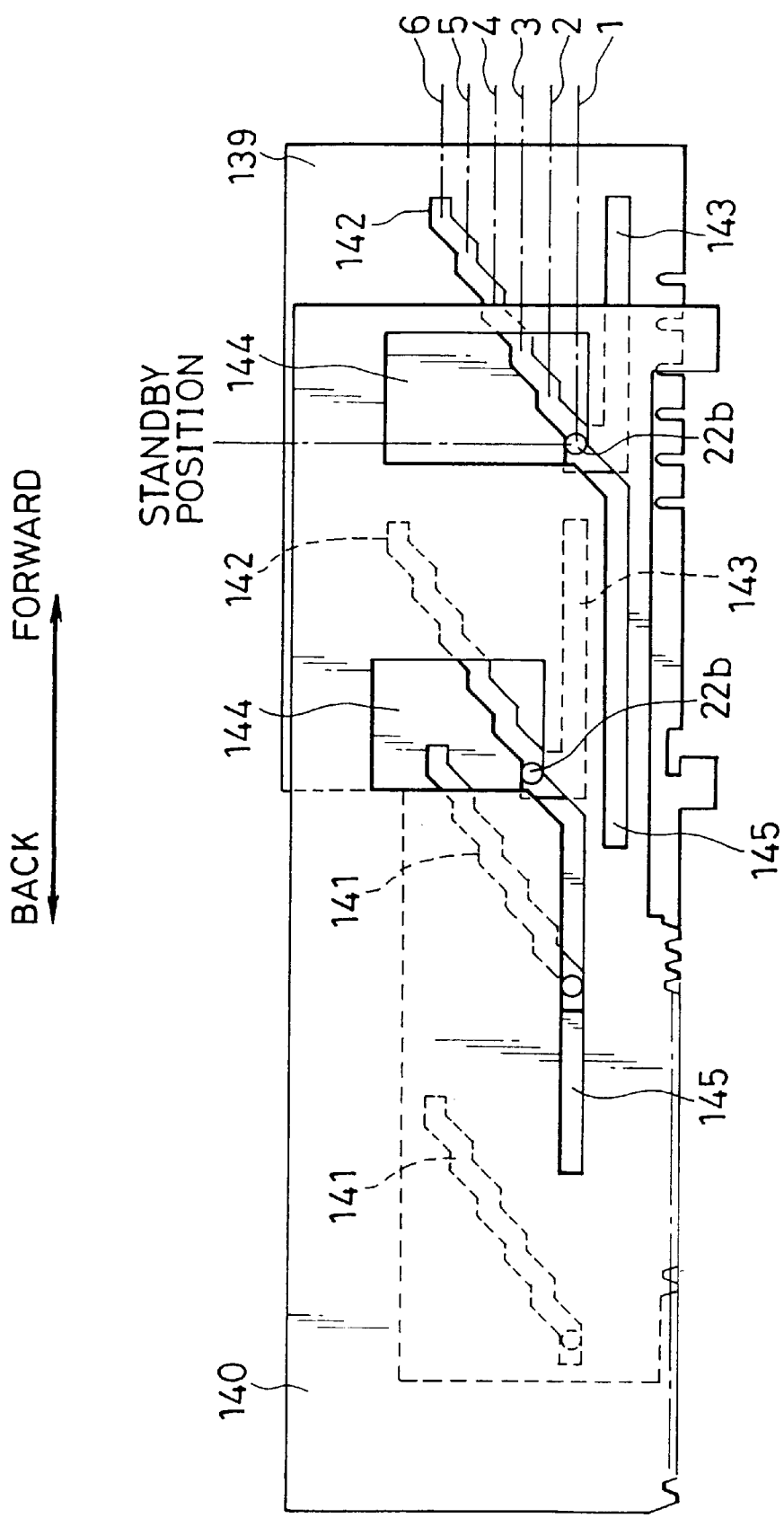
FIG. 21 is an explanatory view of the operation of operation means of the disc player in the state of an insertion/discharge mode, the view showing a mode switching position of the disc player according to the preferred embodiment of the present invention.
Figure 22A:
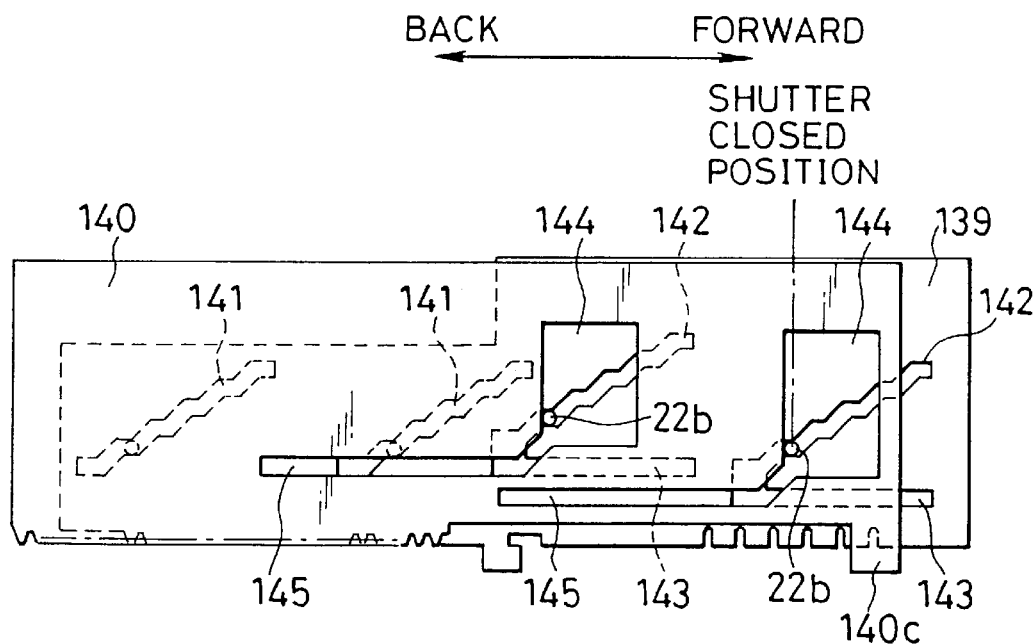
FIG. 22A is an explanatory view of an operation of an operation means in a standby mode of a second CD from the top when the CD is inserted or discharged in the disc player according to the preferred embodiment of the present invention.

In case of insertion of a CD into the disc housing section 3, a number among numbers assigned to the trays 2 (one of the numbers from 1 to 6 is assigned to each of the trays 2 from the top to the bottom in order) is selected, and, for example, a button of "2" among number buttons, not shown in the figures, is pressed, and then an insertion button, also not shown in the figures, is pressed. The sliding movement of the pair of inner sliders 139 by the transmission of the rotation of the output shaft of the operation motor 154 to the speed reduction means 156 and the linking shaft 148 and the sliding movement of the pair of outer sliders 140 by the transmission of the rotation of the output shaft of the operation motor 155 to the speed reduction means 157 and the linking shaft 149 are separately and independently performed. If the buttons are pushed when the pair of pins 22b enter into the pair of slits 144 for the insertion/discharge mode of the outer sliders 140 and, for example, as shown in FIG. 21, the pairs of pins 22b are situated at the mode switching positions in the insertion/discharge mode, then the pairs of pins 22b are raised up to the second step from the bottom of the terraced slits 142 by the moving back of the inner sliders 139 as shown in FIG. 22a, and the disc raising/lowering stand 22 is also raised together with the pins 22b, and consequently the CD on the tray 2 at the second step from the top is set at the insertion/discharge height position. Incidentally, in this case, the pickup raising/lowering stand 10 is also raised simultaneously, but the ascent is an accompanying movement and is not necessary and indispensable. When the inner sliders 139 are further moved back, then the pickup raising/lowering stand 10 is raised together with the pins 22 and the trays 2 that are from the third tray 2 to the sixth tray 2 are successively located at the insertion/discharge height position.

Next, when the outer sliders 140 moves back until the pins 22 reach the middle positions in the back-and-forth direction of the slits 144 for the insertion/discharge mode from the standby mode shown in FIG. 22A, because the engaging portion 140c of an outer slider 140 presses the press portion 70c shown in FIG. 2 under the bottom plate 1e to the back side, the movement of the back-and-forth sliding plate 70 is transmitted to the left and right sliding plate 66 through the lever 72 and the left and right sliding plate 66 is transferred to the left side in opposition to the actuating force of the return spring 69. Consequently, the shutter 64 moves upward and the insertion/discharge aperture 4 is released as shown in FIG. 26b.

Figure 27:
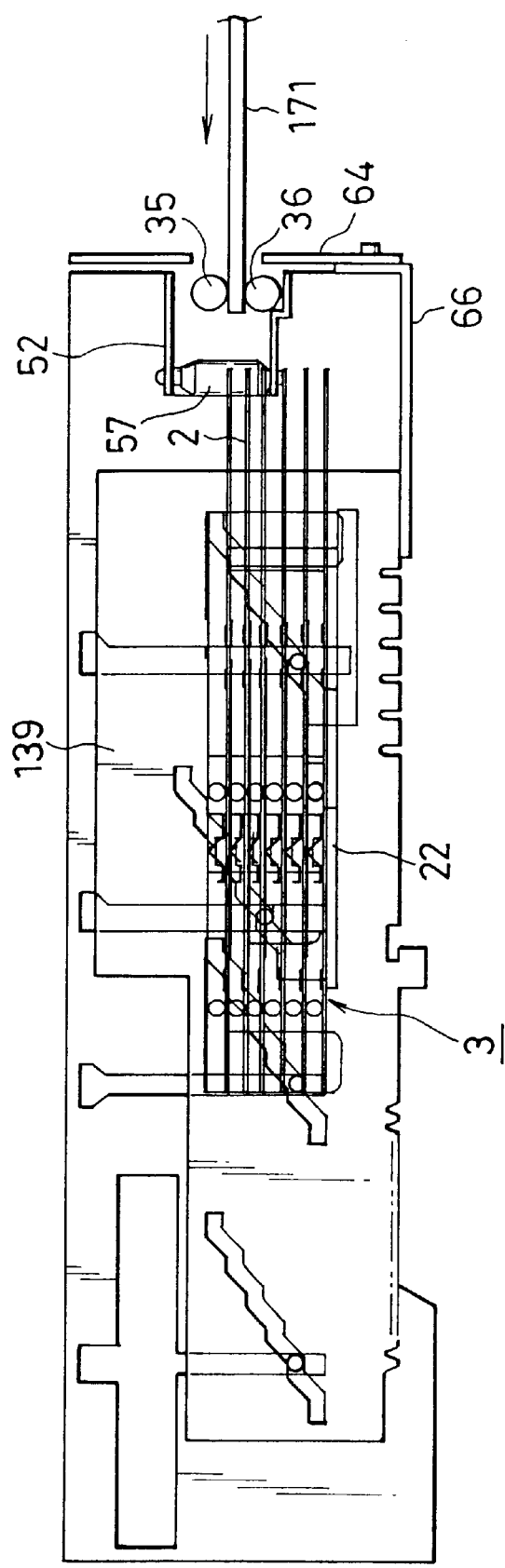
FIG. 27 is a side elevation cross sectional view of the disc player when a CD is inserted, according to the preferred embodiment of the present invention.

In conformity with the aforesaid operation, the shutter 64 is opened. Because the tray 2 at the second step from the top is situated at the insertion/discharge height position, as shown in FIG. 26A, when the CD 171 is tried to be inserted into the opening between the upper and the lower rollers 35, 36, a sensor, not shown in the figures, disposed at the center on this side of the shutter 64 detects the CD 171 and the transferring motor 46 begins to rotate. Because the rotation force of the transferring motor 46 is transmitted to the roller 36 through the gears, as shown in FIG. 27, the CD 171 is bit between the roller 36 and the roller 35, which is pressed to the roller 36 by the spring 38, and the CD 171 is inserted on the tray 2 at the second step from the top by the rotation of the rollers 35, 36. However, because the CD 171 is not inserted beyond the position where the CD 171 leaves the rollers 35, 36, the CD 171 is pushed in by the residual several millimeters by means of the pair of vertical rollers 57, which are pressed to the center direction by the pushing-in spring 60. The CD 171 is held on the tray 2 by the holding portions 2f of the pair of plate springs 2e on the tray 2. When the CD 171 left the rollers 35, 36, a limit switch, not shown in the figures, operates to stop the rotation of the transferring motor 46, and the outer sliders 140 move forward to the standby position shown in FIG. 21. Consequently, the press portion 70c, which has been pressed to the rear side, is released, and the shutter 64 is closed by the operation of the return spring 69.

When the pairs of pins 22b occupy the other height positions (steps 1 and 3 to 6 from bottom) of the terraced slits 142, a CD can be inserted by the operation that is the same as in the description above.

(K) DISCHARGE OF CD

Figure 22B:
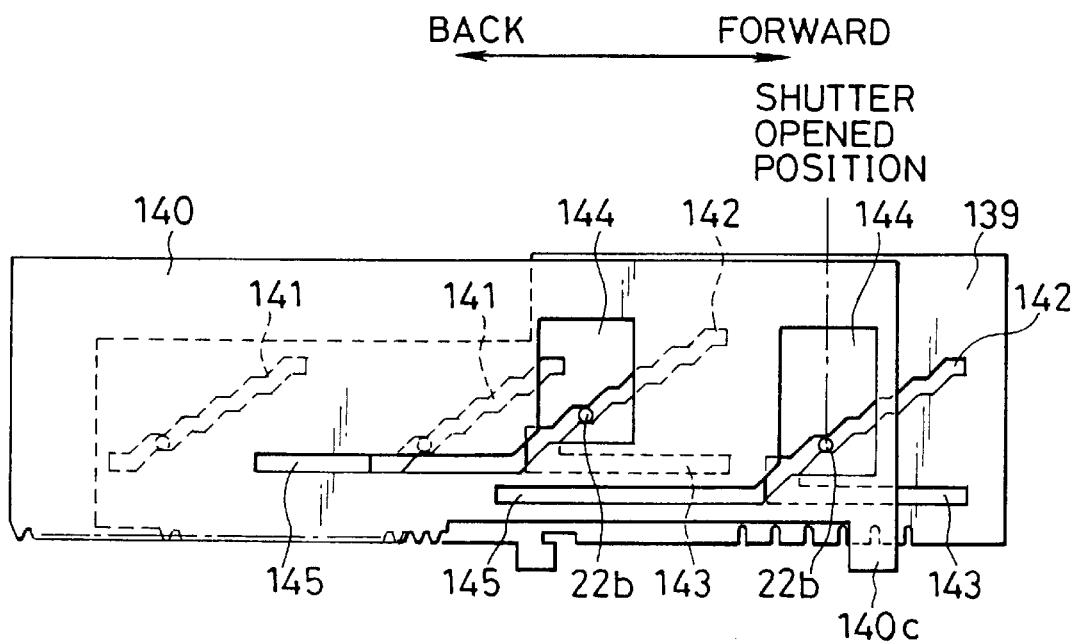
FIG. 22B is an explanatory view of the operation of the operation means in a state in which a shutter of the disc player is opened when the second CD from the top is inserted or discharged, according to the preferred embodiment of the present invention.

In a case in which a CD is discharged from the disc housing section 3, for example, the number button "2" is pushed, and the discharge button is then pushed. Then, in a similar way to the time of insertion, the pins 22b move from, for example, the switching position of the insertion/discharge mode shown in FIG. 21 to the standby mode shown in FIG. 22A, and the CD on the tray 2 at the second stage from the top is set at the insertion/discharge height position. Then, similarly to the aforesaid, the shutter 64 opens when the outer sliders 140 move back until the pins 22b reach the position of FIG. 22B. The operation up to this step is the same as that at the time of the insertion of a CD.

Figure 23:
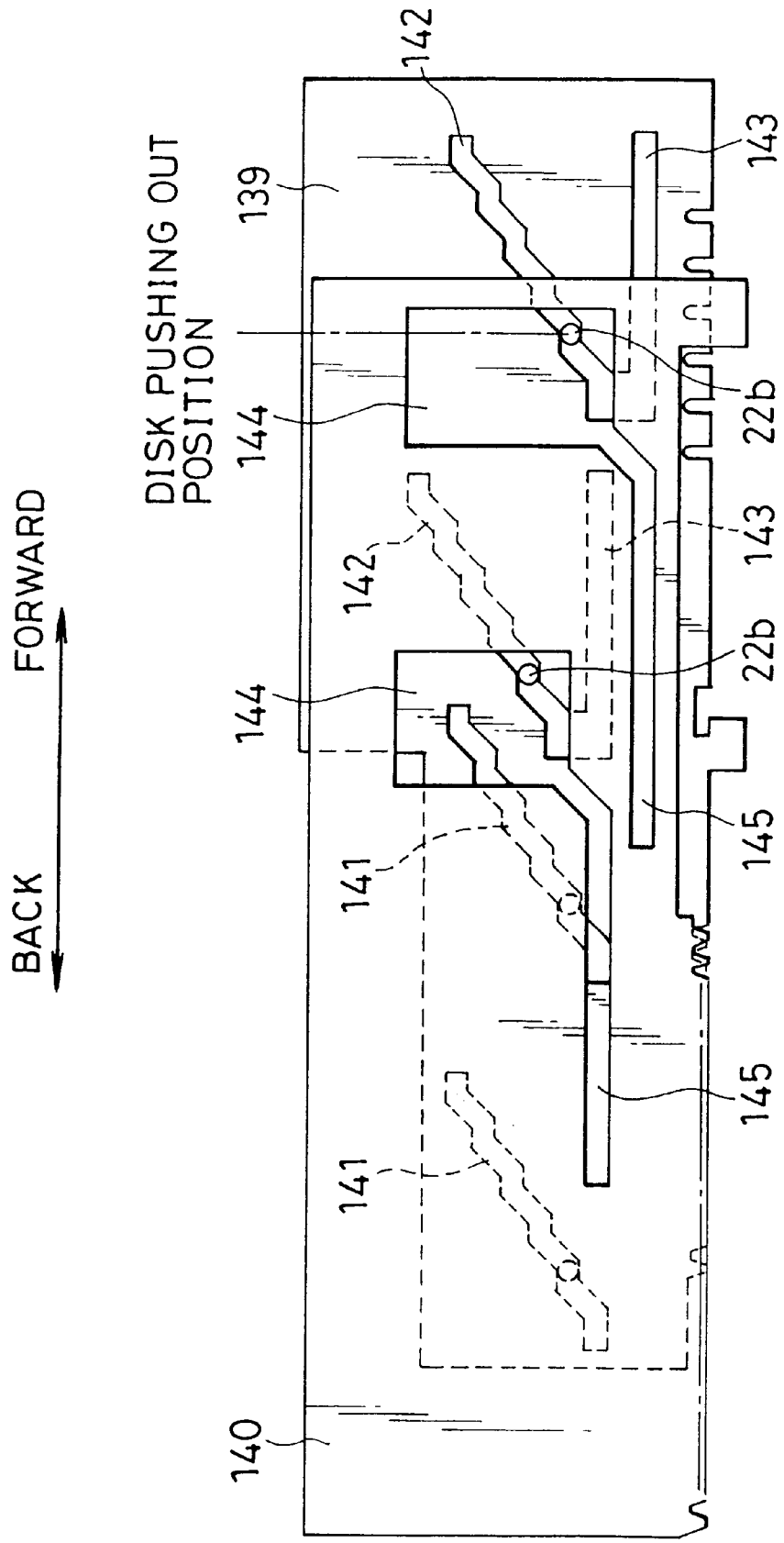
FIG. 23 is an explanatory view of the operation of the operation means in a state in which a pushing-out bar of the disc player is rotated when the second CD from the top is discharged, according to the preferred embodiment of the present invention.
Figure 28B:
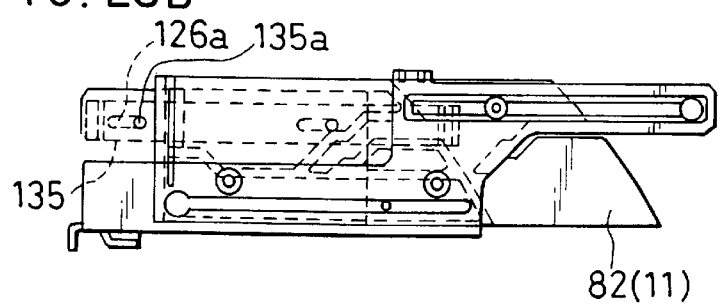
FIG. 28B is a front elevation of a pushing-out means when a CD is discharged, in the disc player according to the preferred embodiment of the present invention.
Figure 29:
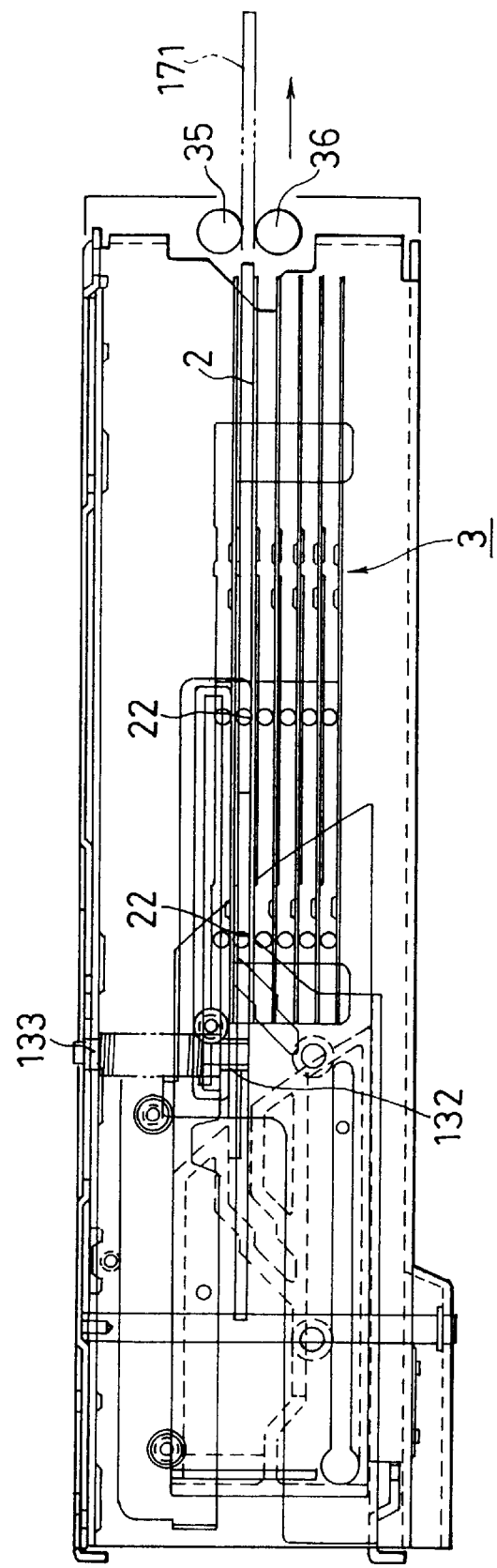
FIG. 29 is a side elevation cross sectional view of the pushing-out means when a CD is discharged, in the disc player according to the preferred embodiment of the present invention.

Next, when the outer sliders 140 further move back until the pins 22b reach on the front side of the slits for the insertion mode 144 as shown in FIG. 23, the separation cams 82 interlocking with the outer sliders 140 by means of the projection portions 140b on the rear side of the outer sliders 140 move back as shown in FIG. 28A and FIG. 28B, and the back faces of the separation cams 82 push the rear side of the plates 135 to move them back. Then, the front sides of the plates 135 push the press portions 132b of the pushing-out levers 132 to the back side, and then the pushing-out levers 132 rotate to push out both sides of the CD 171 at the second stage from the top. At this time, there is a case in which the CD 171 pressed by the plate springs 2e inclines against the actuating force of the plate springs 2e. In the case where the pushing-out lever is single, it is apprehended that the pushing-out lever is dislocated from the outer peripheral surface of the CD 171 to make it impossible to discharge the CD 171. However, because a pair of pushing-out levers is provided in the present preferred embodiment, it is apprehended that the pushing-out levers are dislocated from the outer peripheral surface of a CD. Because the transferring motor 46 rotates at the same time of the pushing of the discharge button and the rollers 35, 36 have already been rotating, the pushed-out CD 171 is discharged by being put between the rollers 35, 36 as shown in FIG. 29. For preventing the falling of the CD 171 at time of discharge, a limit switch, not shown in the figures, detects a portion of the CD 171 on the back side when the portion is put between the rollers 35, 36 to stop the rotation of the transferring motor 46. After this, the CD 171 is manually pulled out from the pair of rollers 35, 36. When the not shown sensor detects the pulling out of the CD 171, the outer sliders 140 move forward, and the pins 22b return from the positions shown in FIG. 23 to the position of the standby mode shown in FIG. 22A.

Furthermore, because the force, which is imposed on the plates 135 by the separation cams 82, to the back side is eliminated, the pushing-out levers 132 rotate by means of the actuating force of the return springs 134 to return to the original positions indicated by solid lines in FIG. 28A, and continuously the shutter 64 is closed similarly to the case after the insertion of a CD.

When the pairs of pins 22b occupy the other height positions, namely steps 1 and 3 to 6 from the bottom, of the terraced slits 142, a CD can be discharged by the operation that is the same as that described above.

(L) REPRODUCING (PLAYBACK) OF CD

Figure 20A:
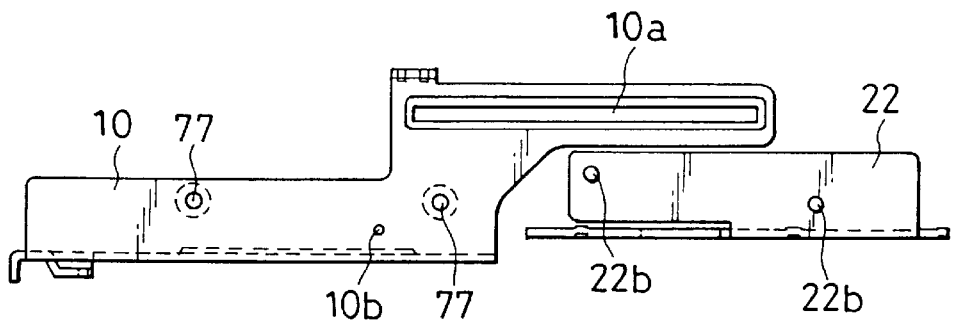
FIG. 20A is a front elevation showing a pickup raising/lowering stand and a disc raising/lowering stand of the disc player according to the preferred embodiment of the present invention.
Figure 20B:
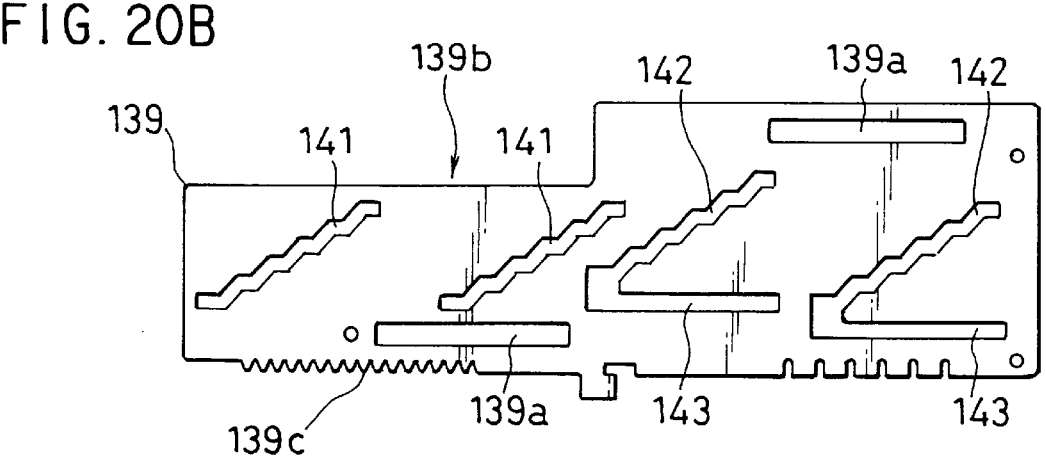
FIG. 20B is a front elevation showing an inner slider of the disc player according to the preferred embodiment of the present invention.
Figure 20C:
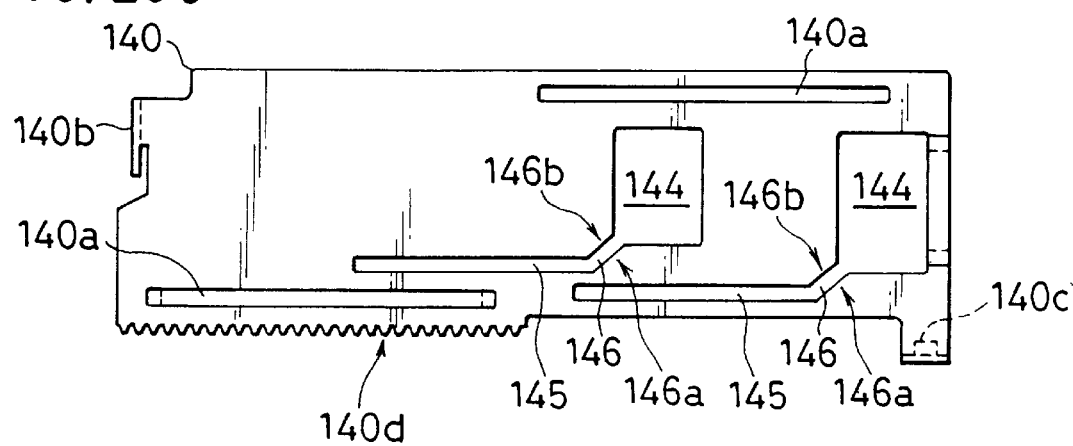
FIG. 20C is a front elevation showing an outer slider of the disc player according to the preferred embodiment of the present invention.
Figure 24A:
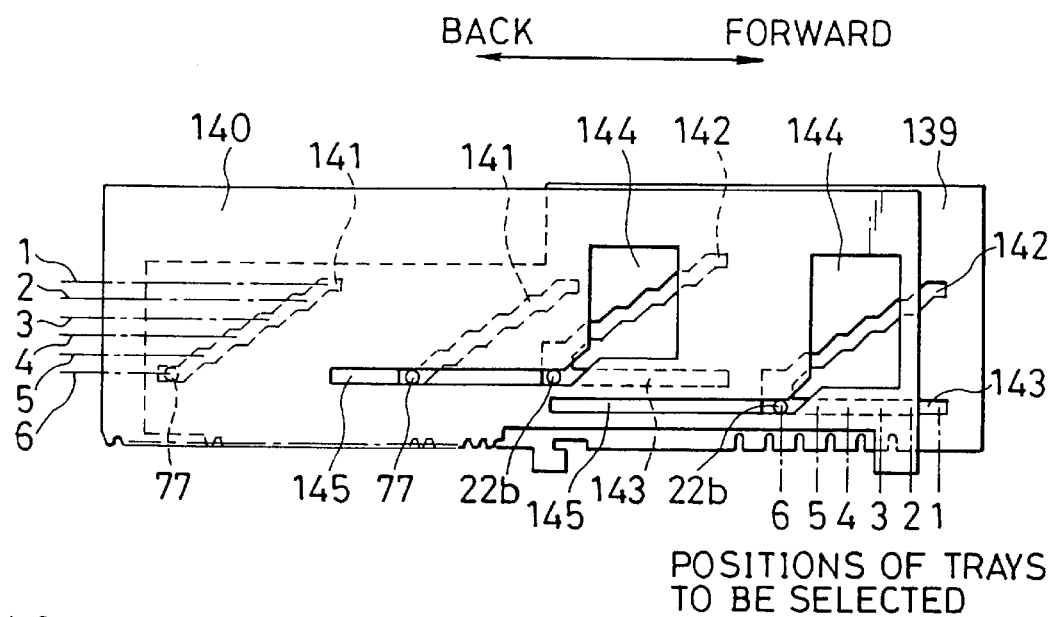
FIG. 24A is an explanatory view of an operation of an operation means in the state of a reproducing mode for performing a reproducing of a CD in a case in which a sixth CD from the top is reproduced, in the disc player according to the preferred embodiment of the present invention.

For reproducing a CD, for example, a button "2" among the number buttons having numbers of CD's to be selected and the reproducing button are pushed. Thereupon, the inner sliders 139 move forward from the aforesaid state shown in FIG. 22A to lower the pins 22b to the lowermost position of the slits for the insertion/discharge mode 144 as shown in FIG. 21 to reach the mode switching positions, and then the outer sliders 140 move forward. Thereupon, as shown in FIG. 20C, the upper tapered surfaces 146b of the switching slits 146 are pushed to lower the pins 22b to be transferred to the floor slits 143 of the inner sliders 139, and the pins 22b are transferred into the slits for the reproducing mode 145 of the outer sliders 140 at the same time to switch the mode of the disc player to the reproducing mode thereof as shown in FIG. 24A. In this switching, the pairs of pins 77 of the pickup raising/lowering stand 10 remain staying at the lowermost positions of the terraced slits 141. The positions of the pins 22b at this time are switching positions to the insertion/discharge mode in the reproducing mode. When the outer sliders 140 are moved back from this state, the lower tapered surfaces 146a of the switching slits 146 are pushed to raise the pins 22b, and the pins 22b can return to the mode switching positions in the aforesaid insertion/discharge mode shown in FIG. 21.

Figure 24B:
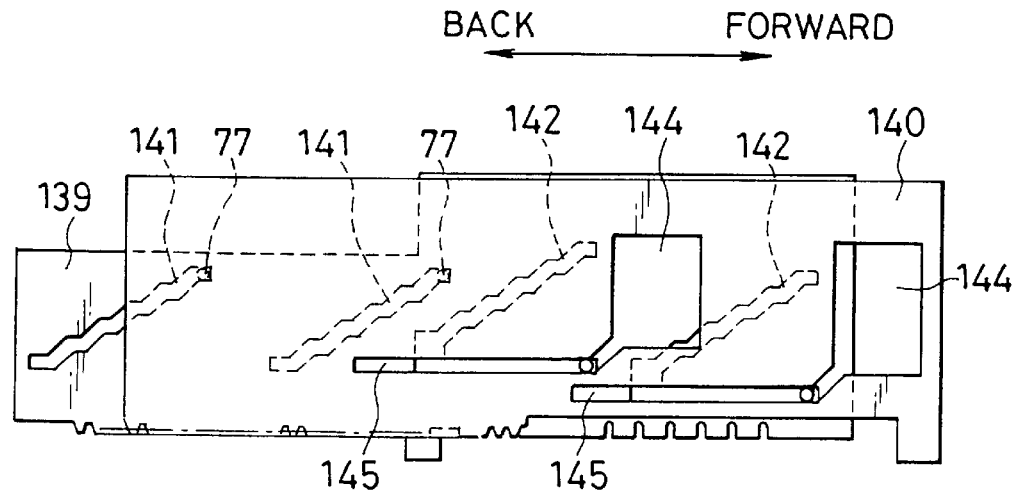
FIG. 24B is an explanatory view of an operation of the operation means in the state of a reproducing mode for performing the reproduction (playback) of a CD in a case where a first CD from the top is reproduced, in the disc player according to the preferred embodiment of the present invention.

The positions of the pins 22b to the outer sliders 140 shown in FIG. 22A are not only the mode switching positions but also a CD selecting mode for selecting a CD to be reproduced by changing only the height of the pickup raising/lowering stand 10. That is, when only the inner sliders 139 are moved back from the positions shown in FIG. 24A, the pairs of pins 22b seem to move forward in the floor slits 143 relatively, but actually the pins 22b are held at the lowermost positions of the vertical slits 25, and consequently the disc raising/lowering stand 22 does not move from the lowermost reproducing position, but the other pairs of pins 77, although they cannot be seen by being hided by the outer sliders 140, seem to be relatively raised in conformity with the terraced slits 141, however they actually ascend in the vertical slits 78 by stages. That is, when the pairs of pins 22b are situated at respective positions of the positions numbered with the numerals 1–6 of the floor slits 143, the pairs of pins 77 are raised along each stage numbered with the numerals 1–6 in the up-and-down direction up to the height in accordance with the movement amounts of the inner sliders 139 by the moving back of the inner sliders 139 to become the state capable of reproducing the CD having the numeral in the up-and-down direction. FIG. 24A shows the state capable of reproducing the CD having the numeral 6, and FIG. 24B shows the state capable of reproducing the CD having the numeral 1.

Figure 25A:
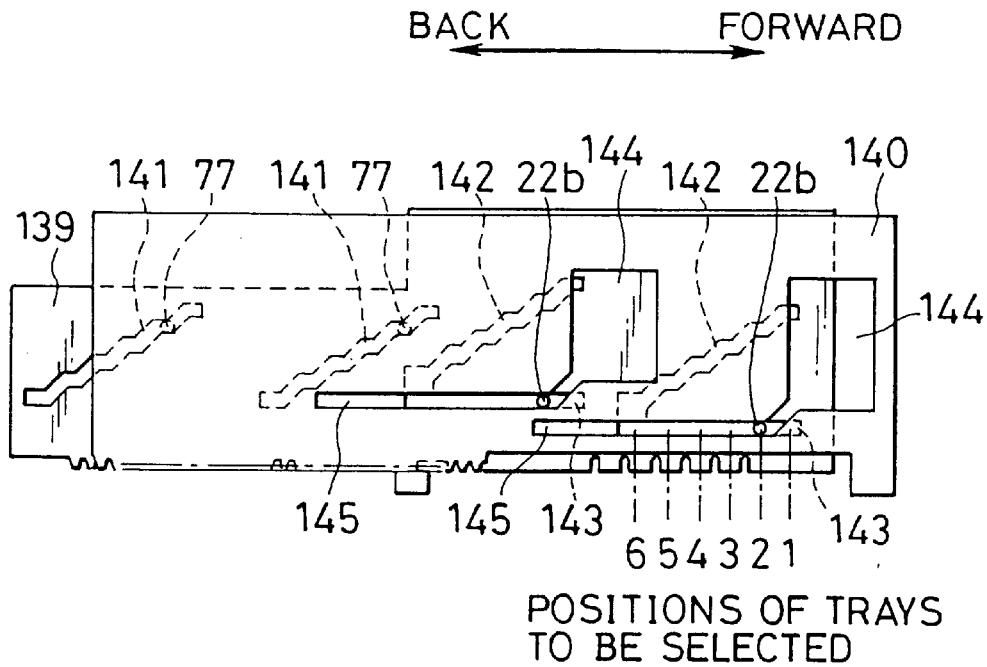
FIG. 25A is an explanatory view of an operation of the operation means when pins are in a standby state at "D" positions when a second CD from the top is reproduced, in the disc player according to the preferred embodiment of the present invention.

Here, as described above, because the CD having the numeral 2 has been selected, the pairs of pins 77 rise up to the position at the second stage from the top as shown in FIG. 25A. The CD to be reproduced enters in a state, in which the CD can be reproduced, by the aforesaid operation, and the subsequent operation is the same whatever numeral of a CD is selected, namely the selected CD operates by the movements of the outer sliders 140 and the driving of the transferring motor 46.

Figure 31A:
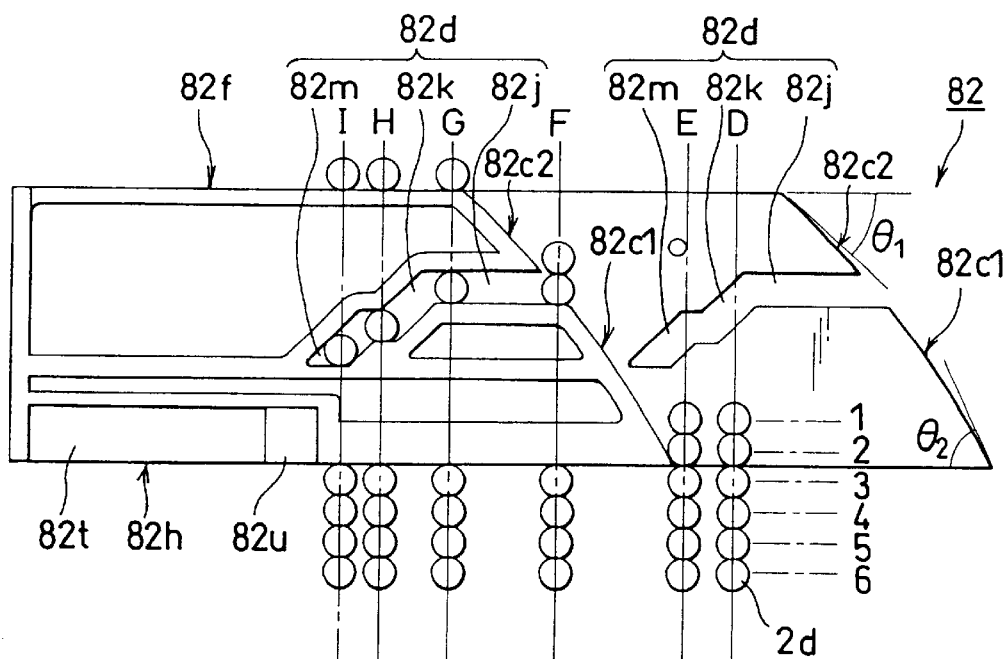
FIG. 31A is an explanatory view showing an operation of another separation cam and especially a relation of between a separation cam and amovement of trays, in the disc player according to the preferred embodiment of the present invention.
Figure 31B:
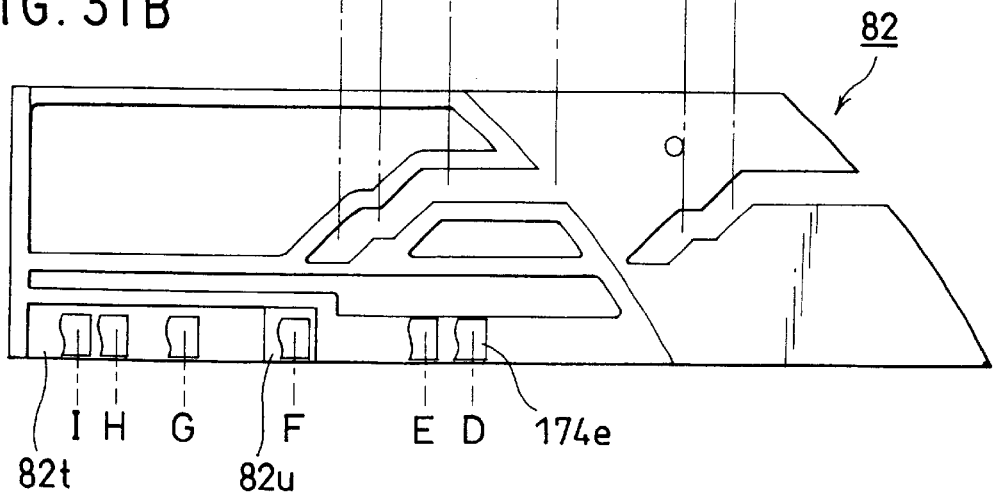
FIG. 31B is an explanatory view showing the operation of the other separation cam and especially the relation between the separation cam with an arm locking means, in the disc player according to the preferred embodiment of the present invention.
Figure 32:
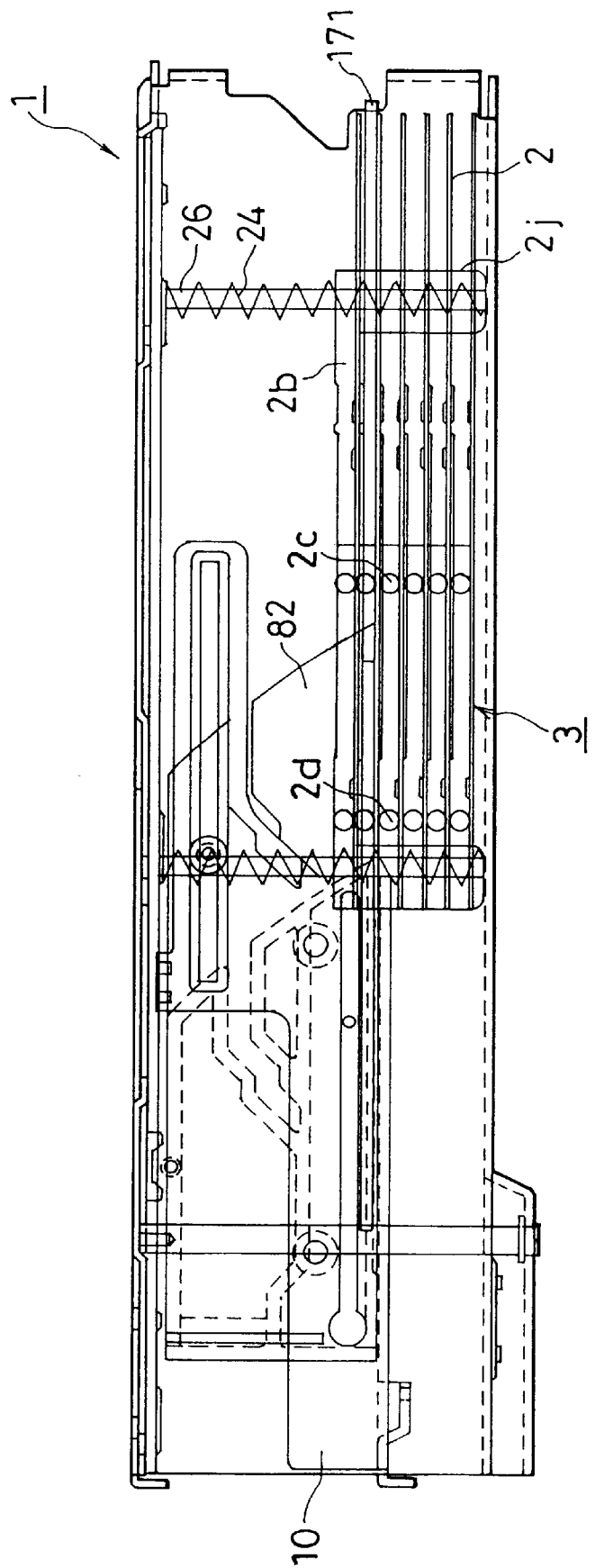
FIG. 32 is a side elevation showing a state before a separation cam begins separation of trays of the disc player according to the preferred embodiment of the present invention.
Figure 33:
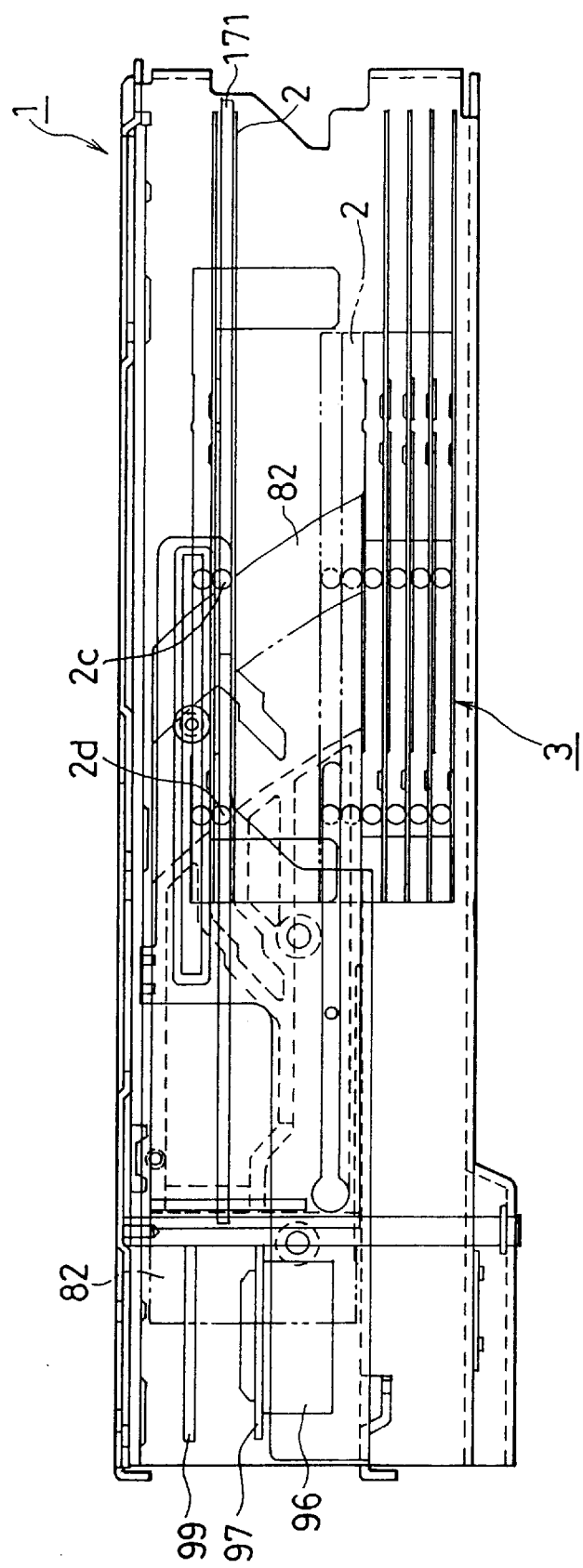
FIG. 33 is a side elevation of a disc player,showing a state in which trays are separated into two portions by a separation cam, according to the preferred embodiment of the present invention.
Figure 34:
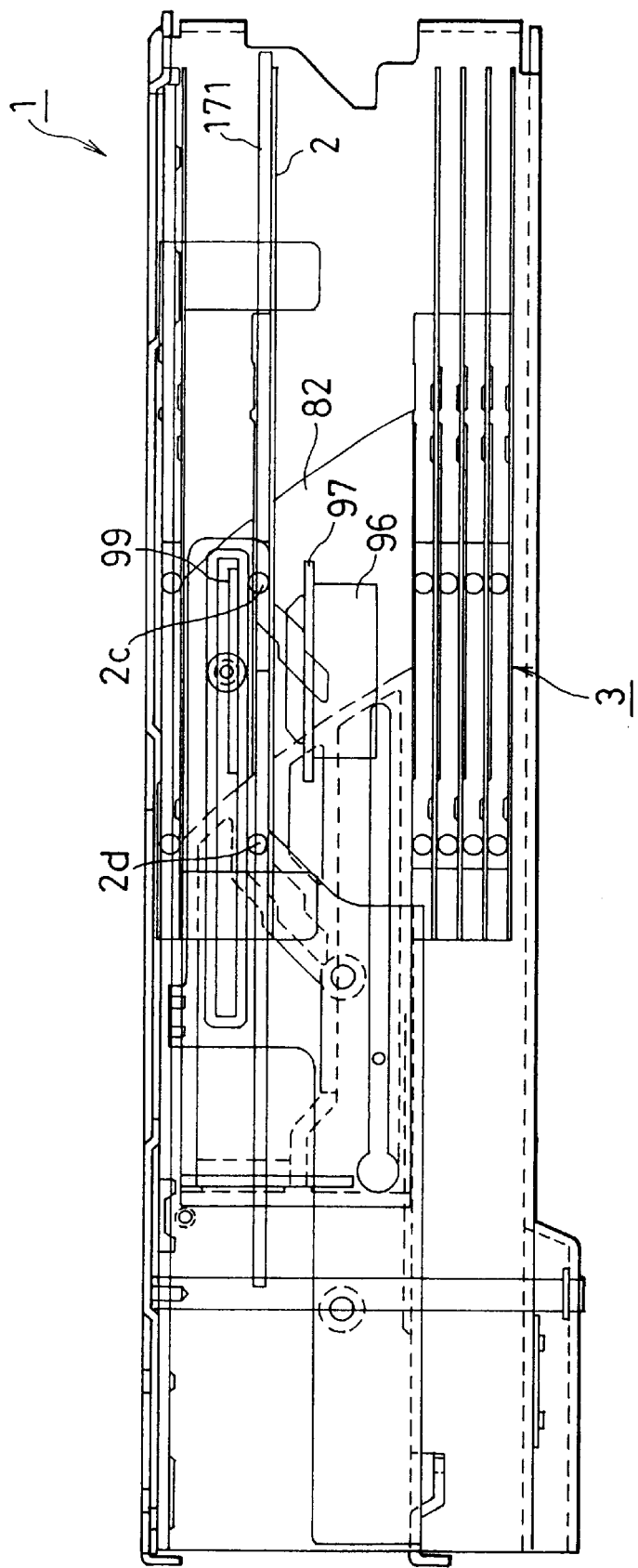
FIG. 34 is a side elevation of a disc player, showing a state in which trays are separated into three portions by a separation cam, according to another preferred embodiment of the present invention.

The operation after the standby mode of FIG. 25A in which the CD at the second stage has been selected for reproduction will be described below. When the pins 22b occupy the positions "D" in the outer sliders 140 shown in FIG. 25B, namely the disc player is in the state shown in FIG. 25B, the state is a standby state, and the separation cams 82 are at the position shown in FIG. 32. When the outer sliders 140 move forward and the pins 22b reach at the positions "E" as a first step, the separation cams 82 move forward and the lower ends on the back side of the separation cams 82 enter between the pins 2d of the trays 2 at the second stage and the third stage from the top as shown in FIG. 30A and FIG. 31A. As for the pins 2c, the lower ends on the front side enter between ones of the trays 2 at the second stage and the third stage, and the successive operation of the pins 2c is similar to that of the pins 2d. When the pins 22b reach the positions "F" as a second step, the pins 2d of the tray 2 at the second stage from the top slide on the first separation control portions $82c_1$ to be placed on the upper stage fitting portions 82j, and the upper ends of the separation cams 82 enter between the pins 2d of the trays 2 at the first stage and the second stage from the top to be in the state of FIG. 33. When the pins 22b reach the positions "G" as a third step, the pins 2d of the tray 2 at the first stage from the top slide on the second separation control portions $82c_2$ to be placed on the upper faces 82f of the separation cams 82. Consequently, when the pins 22b reach the positions "G" at the third step, spaces are formed above and below the selected tray 2 at the second stage from the top as shown in FIG. 34. Moreover, by the transfer of the separation cam 82 on the right side of FIG. 2, the sliding portion 174e of the locking member 174 actuated by the spring 174 shown in FIG. 19 slides on the tapered face 82u to enter into the concave portion 82t as shown in FIG. 31B, and consequently the locking portion 174b is separated from the engaging portion 13b of the lower arm 13 to release the locking of the pinching means 14.

Figure 25B:
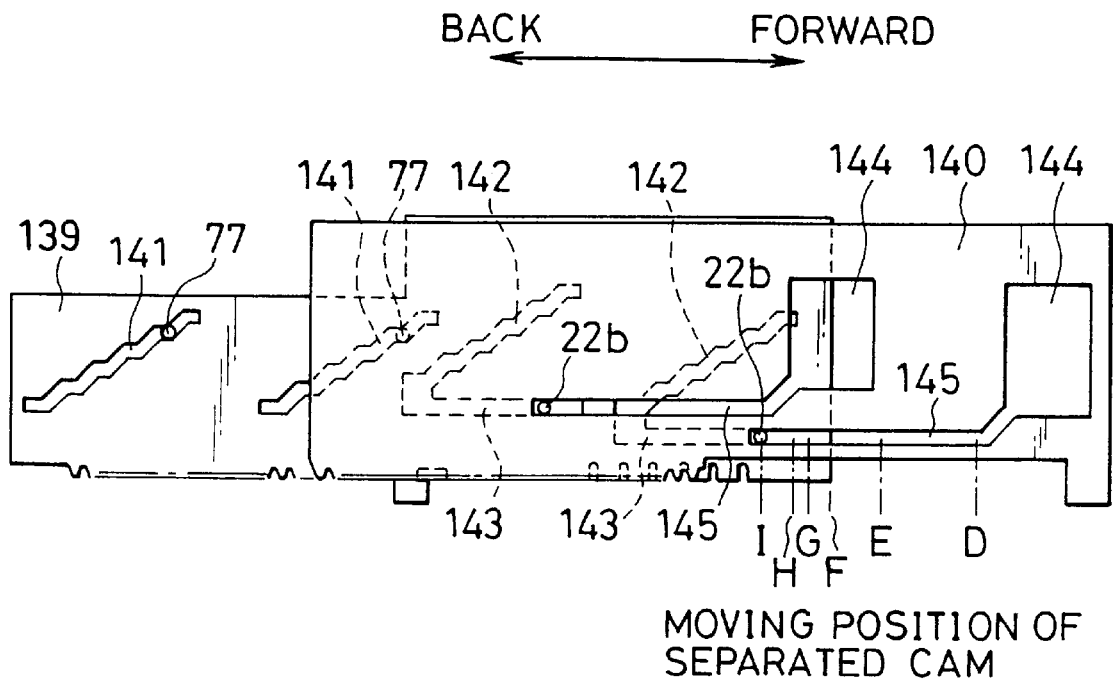
FIG. 25B is an explanatory view of the operation of the operation means when the pins are in a reproducing state at "I" positions when the second CD from the top is reproduced, in the disc player according to the preferred embodiment of the present invention.
Figure 39:
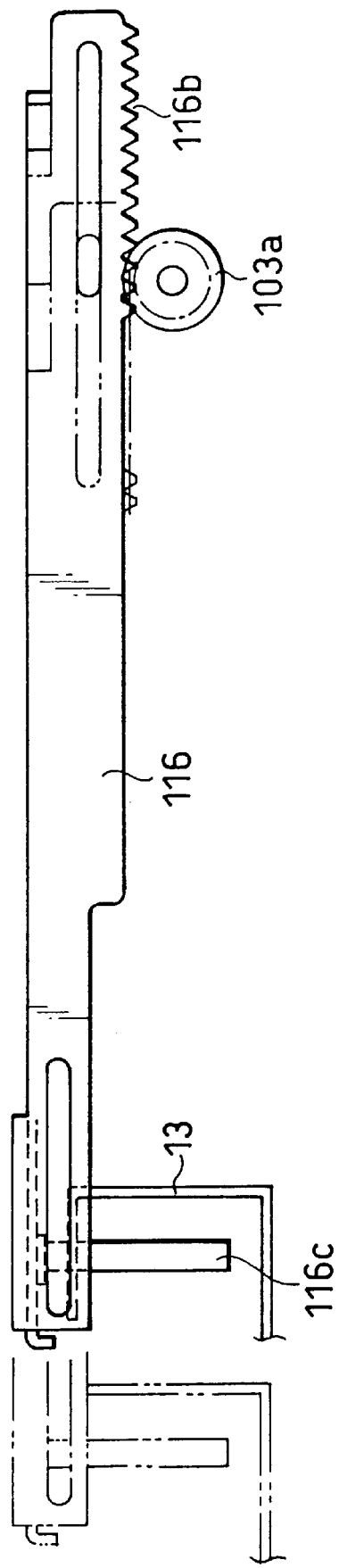
FIG. 39 is a diagrammatic view of an operation of a pinching means in a state in which a rotation force is supplied to the pinching means, in the disc player according to the preferred embodiment of the present invention.

When a sensor, not shown in the figures, detects the arrival of the pins 22b to the positions "G" of FIG. 25B, the transferring motor 46 begins to rotate. Because the pairs of pins 22b have entered into the floor slits 143 to be in a sate of pushing the lever 113 of the rotation force supplying means 17 downward at the time of the switching to the reproducing mode as described above, from the state of FIG. 38A, the lever 113 has rotated counterclockwise around the pin 114, and the plate 105 has moved upward, and then the lever 110 has rotated clockwise around the shaft 109, and consequently the state shown in FIG. 38B, in which the gear 112 is also engaged with the gear 104 while the gear 112 is engaged with the gear 103h, has already been realized. Consequently, the rotation of the transferring motor 46 is transmitted to the slide bar 116 having the rack 116b through the driving shaft 30 and the gear train 103, and the slide bar 116 moves back as shown in FIG. 39. Thereupon, because the engage pin 116c in the lower portion on the back side of the slide bar 116 is inserted into the elongated hole 13a with play, the pinching means 14 rotates toward the front side. When the positioning pin 119 shown in FIG. 17A has passed the position "c" that is an inflection point, the actuating force of the toggle spring 120 operates in the opposite direction to rotate the positioning pin 119 up to the position "a" as shown in FIG. 17B. Then, as shown in FIG. 34, the chucking plate 99 and the turntable 97 enter into the above and below spaces of the selected CD 171 together with the upper arm 12 and the lower arm 13. If the operation is shown by the plan views, the operation is shown as the transferring from the state shown by FIG. 40 to the state shown by FIG. 41. The rotation of the transferring motor 46 is stopped by means of a not shown limit switch for detecting the rotation of the pinching means 14.

Figure 35:
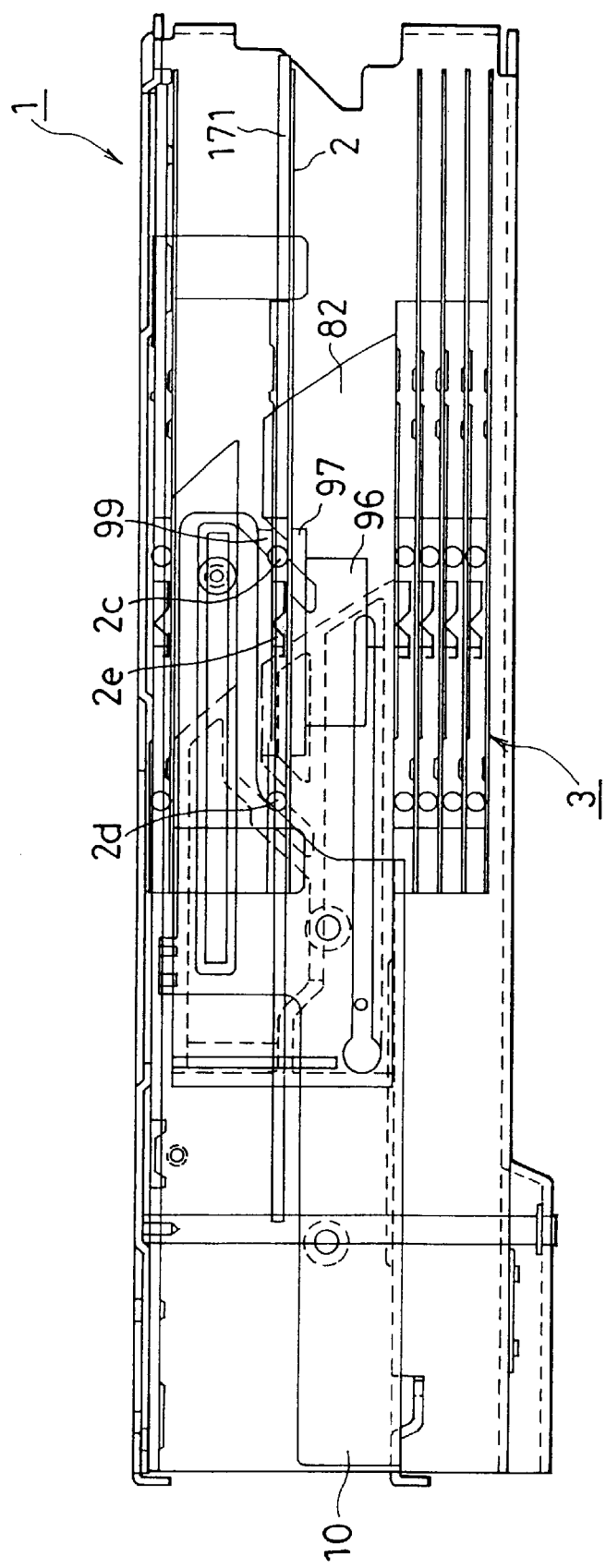
FIG. 35 is a side elevation of the disc player, showing a state in which a selected CD is placed on a turntable of the disc player and pinched by a pinching means after trays have been separated into three portions and only a selected tray has moved downward, according to the other preferred embodiment of the present invention.
Figure 42B:
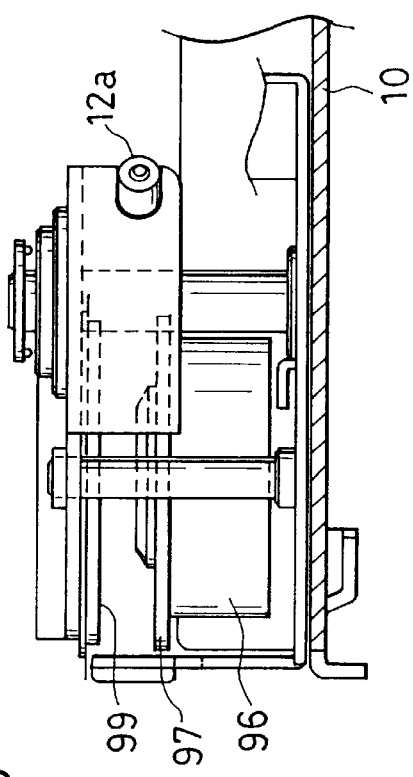

As a fourth step, when the outer sliders 140 have moved forward until the pins 22d reach the position "H" of FIG. 25B, the pins 2d of the selected tray 2 are lowered into the middle stage fitting portions 82k. Then, the selected tray 2 and the selected CD are lowered to be placed on the turntable 97 as shown in FIG. 35. The separation cams 82 move forward together with the outer sliders 140 at nearly the same time of the lowering of the selected tray 2, and thereby the regulation means 18 operates. And, the upper arm 12 of the pinching means 14 is lowered by the operation of the pinching spring 89 to pinch the selected CD 171 between the turntable 97 and the chucking plate 99. That is, the operation of pinching will be described in detail as follows. When the pins 22b are located at the positions "G" and the pinching means 14 occupies the standby positions "B", as shown in FIG. 42A and FIG. 42B, the guide pin 12a is situated in the horizontal portion 125a of the guide hole 12. When the pinching means 14 occupies the reproducing positions "A", as shown in FIG. 43A, the guide pin 12a is transferred to the vertical portion 125b of the guide hole 125. However, as shown in FIG. 30B, because the pin 127a cannot escape to the escape portion of the cam groove 82r of one of the separation cams 82, the guide pin 12a cannot descend by being prevented by the back side of the restriction lever 127. Next, when the pins 22b are transferred to the positions "H", the separation cams 82 also move forward. Thereby, as shown in FIG. 30B and FIG. 43B, it becomes possible that the pin 127a escapes to the escape portion of the cam groove 82r, and the pin 127a of the restriction lever 127 actuated by the spring 128 moves upward toward the escape portion of the cam groove 82r of the separation cam 82, and then the end on the back side of the restriction lever 128 moves downward. Consequently, the upper arm 12 that has been actuated by the pinching spring 89 descends as shown in FIG. 44 to pinch the selected CD 171 as described above.

The rotation center of the pinching means 14 is positioned with high accuracy on the bottom plate 1e by the insertion of the fulcrum 92 planted on the bottom plate 1e into the hollow shaft 86 being the rotation center of the pinching means 14, and because the positioning pin 119 is held by the toggle spring 120 in a state in which the positioning pin 119 is pressed to the pickup raising/lowering stand 10, the turntable 97 and the chucking plate 99 can be positioned on a locus in the circumference direction with high accuracy. On the other hand, because the guide posts 23 for guiding the tray 2 on which the CD 171 is placed are also planted on the bottom plate 1e similarly to the fulcrum 92, the CD 171 is also positioned on the bottom plate 1e with high accuracy. Moreover, as shown in FIG. 11, the CD 171 is positioned to the frame body 1 with high accuracy by means of the positioning rods 61a, 61b, 62a, 62b, 172, 173 that position four positions on a circumference of the CD 171 and the pair of vertical rollers 57. Moreover, by the existence of the CD positioning section 13c, which is shown in FIG. 16 and formed at the standing portion of the lower arm 13, the relative positioning of the CD 171 with the lower arm 13, or the turntable 97, is performed. Consequently, the upper portion of the truncated cone portion 97a of the turntable 97 surely enters into the hole of the selected CD 171 when the CD 171 descends, and the CD 171 is surely attached to the turntable 97. In such a way, the center of the CD to be reproduced, the center of the turntable 97 and the center of the chucking plate 99 agree with each other with high accuracy, and the pinching of the CD 171 can surely be performed.

Figure 36:
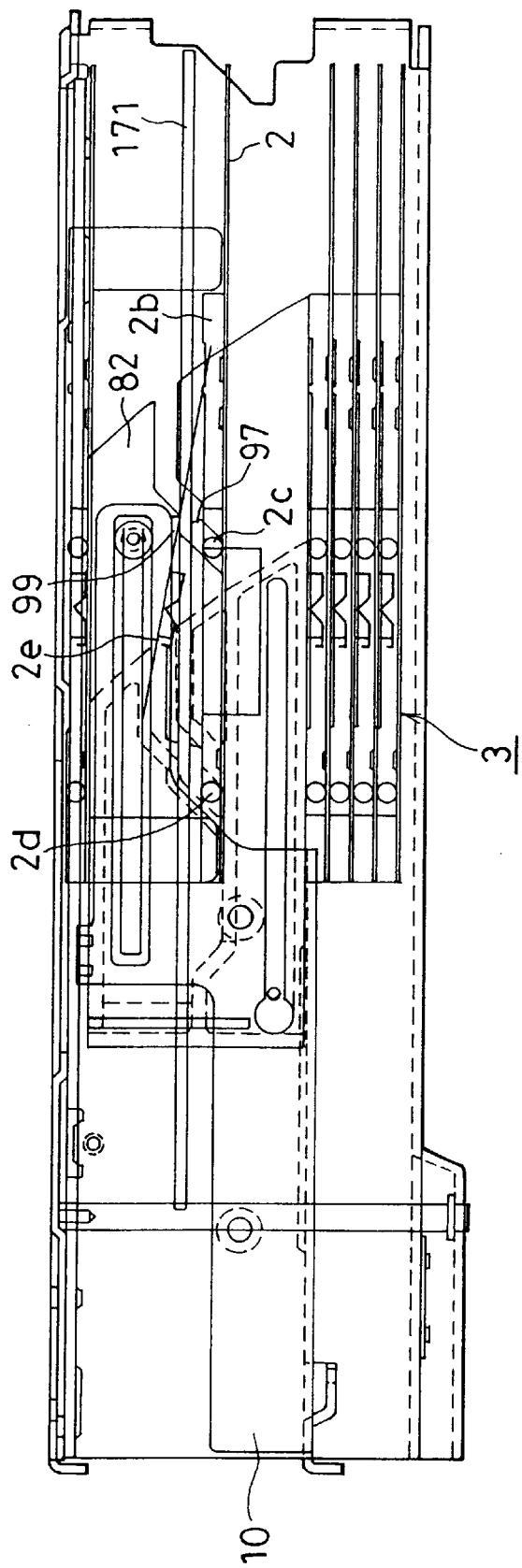
FIG. 36 is a side elevation of the disc player, showing a state in which only a selected tray is separated from a selected CD by moving downward after the selected CD is pinched by the pinching means, according to the preferred embodiment of the present invention.
Figure 37:
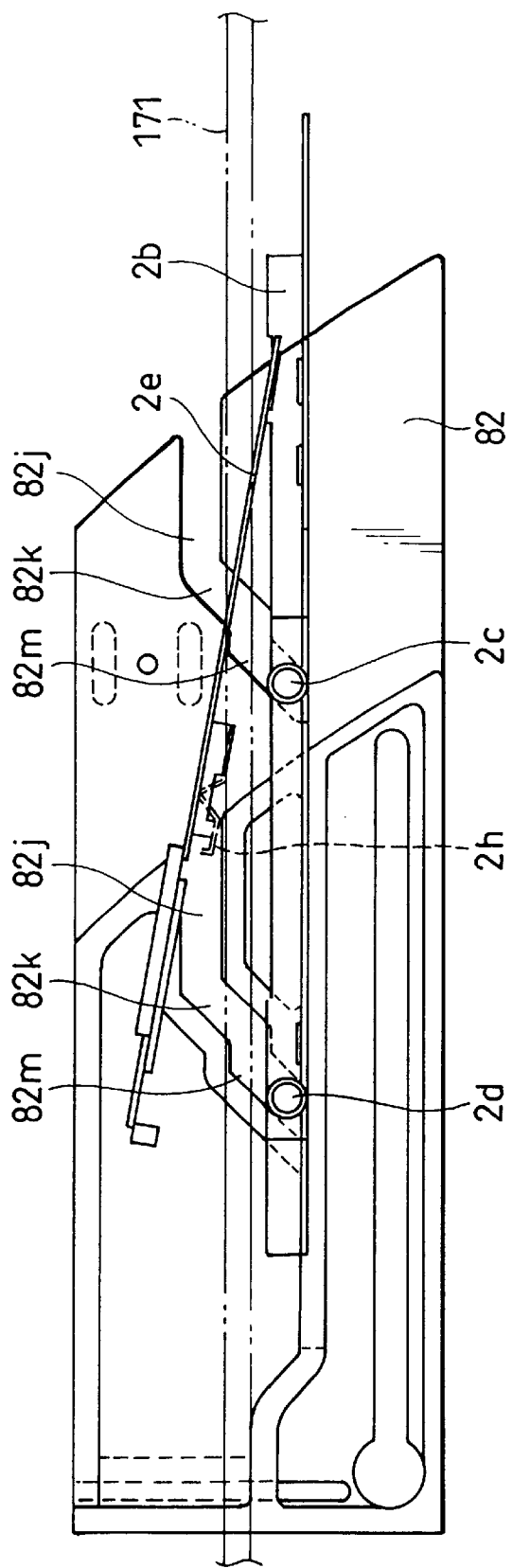
FIG. 37 is a diagrammatic view illustrating a state in which a selected CD is released by raising a plate spring of a selected tray at a time of reproducing (playback), in a disc player according to the preferred embodiment of the present invention.

When the outer sliders 140 have moved forward until the pins 22 reach the positions "I" of FIG. 25B as a last fifth step, as shown in FIG. 30A and FIG. 31A, the pins 2d of the selected tray 2 descend up to the lower stage fitting portions 82m, and the selected tray 2, which has been touched to the selected CD 171 till then, descends as shown in FIG. 36 to be separated from the selected CD 171. At the same time, as shown in FIG. 37, the receiving portions 2h, which have been pressing the selected CD 171, of the plate springs 2e are pushed upward by being pressed by the under faces of the upper stage fitting portions 82j on the back side of the separation cams 82 to release the selected CD 171. At this time, the trays 2 at heights lower than that of the selected tray 2 are pressed by the under faces 82h of the separation cams 82, and the trays 2 at heights higher than that of the selected tray 2 are actuated downward by the coil springs 24. Consequently, the vibrations of the trays 2 owing to the influence of the vibrations of a vehicle can be prevented.

As described above, after the selected CD has been pinched by the pinching means 14, the reproducing of the CD is performed in a state in which the pinching means 14 is held at the position "A" as shown in FIG. 41. When the spindle motor 96 rotates at first, the CD rotates by means of the turntable 97. Next, when the scanning motor 165 of the pickup unit 16 rotates, the rotation is transmitted to the screw shaft 164 to transfer the optical pickup 162 from the inner portion to the outer portion in the radial direction of the CD along the screw shaft 164 and thereby the reproducing of the CD is performed. During the reproducing, as shown in FIG. 41, because the pinching means 14 occupies the position "A", the pinching means 14 is separated from the inner wall "K" of the case 177 to be in a floating state in the case 177. Consequently, the pinching means 14 does not receive the vibrations of a running vehicle directly, and thereby the reproducing can appropriately be performed.

After the reproducing of the CD has been performed, the screw shaft 164 rotates inversely to return the optical pickup 162 to the original position. Then, the rotation of the scanning motor 165 stops, and the rotation of the spindle motor 96 also stops. After that, the outer sliders 140 move back through the processes reverse to the aforesaid processes, and the separation cams 82 also move back. Then, when the pin 127a returns to the position "G" from the position "H" as shown in FIG. 30B, the pin 127a of the restriction lever 127, which was situated at the position shown in FIG. 43B, is dislocated from the escape portion of the cam groove 82r in one of the separation cam 82 as shown in FIG. 43A to move downward, and the back side of the restriction lever 127 moves upward. Consequently, the guide pin 12a protruding from the pinching means 14 to the outside is pushed up along the vertical portion 125b of the guide hole 125, and the pinching means 14 becomes a rotatable state. After this, a not shown sensor detects the ascending of the guide pin 12a, and the transferring motor 46 rotate in the inverse direction of the aforesaid direction to rotate the pinching means 14 to the backside. Then, when the positioning pin 119, which occupied the position "b" in FIG. 17B, passes the position "c" being an inflection point, the actuating force of the toggle spring 120 operates in the opposite direction, and the positioning pin 119 rotates up to the position "b" to return the pinching means 14 to the position "B" being the standby position. The rotation of the transferring motor 46 stops by means of a not shown limit switch for detecting the rotation of the pinching means 14. Because the pinching means 14 is actuated by the toggle spring 120 to the back side even if it is situated at the standby position "B", the pinching means 14 does not receive the influence by the vibrations of a vehicle. After this, because the locking member 174 runs on the tapered surface 82u owing to the transfer of the separation cams 82f, the locking member 174 is transferred against the actuating force of the spring 176. Consequently, the locking portion 174b touches the engaging portion 13b to lock the pinching means 14 in order that the pinching means 14 does not rotate. When the outer sliders 140 have moved back and the pins 22b have returned up to the standby positions "D", the separation cams 82 also move back, and then all of the trays 2 from the first to the third stages descend. Thus the trays 2 return to the state of FIG. 32 in which the six sheets of the trays 2 are not separated. At this time, because the pinching means 14 projects to the left side from the frame body 1 to touch the inner wall "K" of the case 177 as shown in FIG. 40, the frame body 1 is not in the floating state capable of swinging freely, but receives the vibrations of a vehicle. However, because it is non-reproducing time, the state does not cause any problems.

In case of reproducing CD's other than the CD at the second stage from the top, from the state shown in FIG. 25A, the inner sliders 139 are moved forward or moved back, so that the pins 22b are relatively transferred to any one position among the positions where numerals 1, 3, 4, 5 and 6 attached to the inner slider 139 in FIG. 25A. And then, the outer sliders 140 are slid so that the positions D–I on the outer slider 140 shown in FIG. 25B are fitted to the pins 22b in order, so that a same procedure as that of the aforesaid description can be repeated.

In the case where the selected CD to be reproduced occupies the insertion/discharge height position in FIG. 11A and FIG. 11B, the positioning by the positioning pins 61a, 61b, 62a, 62b should be performed. However, the pair of vertical rollers 57 supplies the places of the positioning pins 61a, 61b, 62a, 62b. Although, before and after the reproducing of a CD, the CD is transferred upward and downward, there is no chance of interference between the CD and the vertical rollers 57 because tapered surfaces 57a are formed on both ends of the vertical rollers 57 as shown in FIG. 12.

Incidentally, in the present preferred embodiment, a case where a disc recording and/or reproducing apparatus is applied to a disc player for reproducing sounds is described. However, the disc recording and/or reproducing apparatus may be applied to an apparatus for recording sounds, an apparatus for recording and reproducing sounds, or an apparatus for recording and/or reproducing images without being limited to the sounds. Moreover, the case where the direction of the superimposition of trays is the vertical direction is shown, however the direction of the superimposition of trays may be the horizontal direction. Moreover, a disc having the size of twelve cm is used, however a disc having other sizes such as a size of eight cm may be adopted.

Figure 4B:
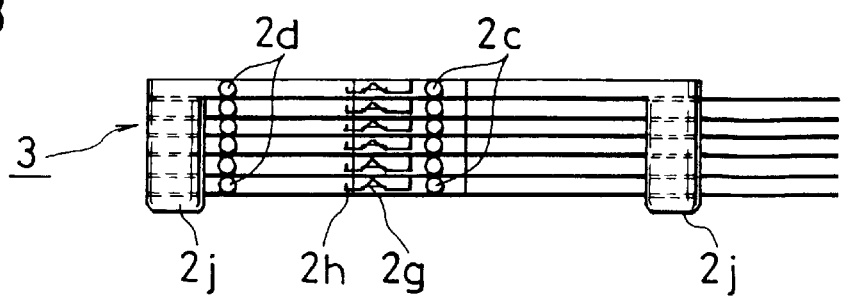
FIG. 4B is a front elevation of the disc housing section of the disc player according to the preferred embodiment of the present invention.

Moreover, in the present preferred embodiment, the number of trays constituting the disc housing section is set to be six, however, the number of trays may be five or less or seven or more. Moreover, one sheet of tray shown in FIG. 3A and FIG. 4 is used in the present preferred embodiment, however, a pair of placing pieces formed by cutting the portions indicated by two-dot chain lines to leave only both the end portions, on which the outer periphery portion of a CD is placed, of the aluminum plate 2a and remove the center portion of the aluminum plate 2a may be used.

Although the invention has been described in its preferred form with a certain degree of particularity, many changes and variations are possible therein. It is therefore to be understood that the present invention may be practiced than as specifically described herein without departing from the scope and the spirit of the invention.

What is claimed is:

1. A disc recording and/or reproducing apparatus, comprising:
    a plurality of stacked disc placing means for placing at least one disc;
    a pair of pushing-out means for pushing out a disc at a position of insertion and/or discharge from one of said plurality of disc placing means having placed said disc at said position of insertion and/or discharge; and
    a pair of position controlling means for controlling insertion, discharge and/or support of the disc, one of said pair of position controlling means being provided on either side of each of said plurality of disc placing means,
    wherein each of said pair of pushing-out means is engaged with each of said position controlling means.

2. The disc recording and/or reproducing apparatus according to claim 1, further comprising:
    pressing means for returning said pair of pushing-out means to an original position after said pushing-out means has pushed out the disc.

3. A disc exchanging mechanism comprising:
    a plurality of stacked disc placing means for placing a disc;
    a plurality of a pushing-out means for pushing out a disc at a position of insertion and/or discharge from one of said plurality of disc placing means having placed said disc at said position of insertion and/or discharge; and
    a pair of a position controlling means for controlling insertion, discharge and/or support of the disc, one of said pair position controlling means being provided on either side of said disc placing means,
    wherein each of said plurality of pushing-out means is engaged with each of said pair of position controlling means.

4. The disc exchanging mechanism according to claim 3, further comprising:
    pressing means for returning said pushing-out means to an original position after said pushing-out means has pushed said disc.

5. A disc recording and/or reproducing apparatus, comprising a pushing/pulling means for pushing/pulling a disc to/from a disc recording and/or reproducing apparatus and including a pair of vertically arranged rollers that contact a circumferential edge of the disc and a pair of levers that contact the circumferential edge of the disc, so that vectors of resultant forces applied by said pushing/pulling means pass through an axial center of said disc.

6. A disc exchanging mechanism comprising a pushing/pulling means for pushing/pulling a disc to/from a disc recording and/or reproducing apparatus and including a pair of vertically arranged rollers that contact a circumferential edge of the disc and a pair of levers that contact the circumferential edge of the disc, so that vectors of resultant forces applied by said pushing/pulling means pass through an axial center of said disc.

* * * * *